United States Patent [19]

Leonard et al.

[11] Patent Number: 5,413,539
[45] Date of Patent: May 9, 1995

[54] CONTROL SYSTEM FOR CONTROLLING ENGAGEMENT OF AN AUTOMATIC TRANSMISSION TORQUE CONVERTER CLUTCH

[75] Inventors: Allan S. Leonard, Westland; Kenneth G. Walega, Allen Park; David M. Garrett, Rochester Hills; Thomas L. Greene, Plymouth; John A. Daubenmier, Canton; Bruce J. Palansky, Livonia; Lawrence H. Buch, Farmington Hills, all of Mich.

[73] Assignee: Ford Motor Company, Dearborn, Mich.

[21] Appl. No.: 187,440

[22] Filed: Jan. 26, 1994

Related U.S. Application Data

[62] Division of Ser. No. 926,627, Aug. 10, 1992, Pat. No. 5,305,663.

[51] Int. Cl.⁶ .............................. F16H 61/06
[52] U.S. Cl. ........................ 475/63; 475/65
[58] Field of Search ................ 475/62, 63, 65

[56] References Cited

U.S. PATENT DOCUMENTS

| | | | |
|---|---|---|---|
| 4,296,651 | 10/1981 | Iwanaga et al. | 74/869 |
| 4,345,489 | 8/1982 | Müller et al. | 74/752 A |
| 4,347,765 | 9/1982 | Leonard et al. | 74/869 |
| 4,509,124 | 4/1985 | Suzuki et al. | 364/424.1 |
| 4,680,992 | 7/1987 | Hayasaki et al. | 74/869 |
| 4,691,597 | 9/1987 | Leorat et al. | 74/869 |
| 4,742,732 | 5/1988 | Hiramatsu | 74/866 |
| 4,747,056 | 5/1988 | Yamamoto et al. | 364/424.1 |
| 4,757,886 | 7/1988 | Brown et al. | 192/3.3 |
| 4,760,761 | 8/1988 | Nishikawa et al. | 74/867 |
| 4,836,055 | 6/1989 | Suzuki | 74/866 |
| 4,843,920 | 7/1989 | Hayasaki et al. | 74/869 |
| 4,846,021 | 7/1989 | Hamano et al. | 74/866 |
| 4,894,780 | 1/1990 | Simonyi et al. | 364/424.1 |
| 4,982,622 | 1/1991 | Yamamoto et al. | 74/866 |
| 4,998,604 | 3/1991 | Vukovich et al. | 192/3.3 |
| 5,010,990 | 4/1991 | Yoshimura et al. | 192/3.3 |
| 5,022,284 | 6/1991 | Shimei | 74/844 |
| 5,024,125 | 6/1991 | Baba | 74/866 |
| 5,029,087 | 7/1991 | Cowan et al. | 364/424.1 |
| 5,032,993 | 7/1991 | Hasegawa et al. | 364/424.1 |
| 5,058,460 | 10/1991 | Hibner et al. | 192/109 F |
| 5,060,769 | 10/1991 | Yoshimura et al. | 192/3.29 |
| 5,070,747 | 12/1991 | Lentz et al. | 477/65 |
| 5,083,481 | 1/1992 | Smith et al. | 74/869 |
| 5,095,775 | 3/1992 | Ueki | 74/867 |
| 5,115,897 | 5/1992 | Yoshimura et al. | 477/65 |
| 5,201,252 | 4/1993 | Prüss | 74/869 |
| 5,211,079 | 5/1993 | Runde et al. | 364/424.1 |
| 5,283,738 | 2/1994 | Schwab et al. | 364/424.1 |
| 5,291,979 | 3/1994 | Iizuka | 192/3.3 |
| 5,318,159 | 6/1994 | Kashiwabara | 477/169 |
| 5,323,320 | 6/1994 | Hathaway et al. | 364/424.1 |

*Primary Examiner*—Dirk Wright
*Attorney, Agent, or Firm*—Roger L. May; Frank G. McKenzie

[57] ABSTRACT

An electronically controlled multiply ratio transmission for an automotive vehicle powertrain having a hydrokinetic torque converter with a bypass clutch, solenoid operated shift valves under the control of an electronic microprocessor that receives signals from an output shaft speed sensor, an engine speed sensor, a driver controlled drive range selector position, an engine throttle position sensor, and other powertrain operating variables, the bypass clutch having a controlled slip characteristic.

14 Claims, 57 Drawing Sheets

| GEAR | | SOLENOID STATES | | CLUTCH, BAND, OWC | | | | | | | RATIO |
|---|---|---|---|---|---|---|---|---|---|---|---|
| | | SS1 | SS2 | B1 | B2 | C1 | C2 | C3 | C4 | C5 | C6 | |
| 1 | M | ON | OFF | | X | X | | | X | | | 2.400 |
| | D | | | | | X | | | X | | | |
| 2 | M | OFF | OFF | X | | X | | | OR X | X | X | 1.467 |
| | D | | | | | X | | | ↓ | X | X | |
| 3 | | OFF | ON | | | X | | X | | X | OR | 1.000 |
| 4 | | ON | ON | X | | | | X | ↓ | X | OR | .667 |
| R | | ON | OFF | | X | | X | | | | | -2.000 |
| N | | ON | OFF | | | | | | | | | |
| P | | ON | OFF | | | | | | | | | |

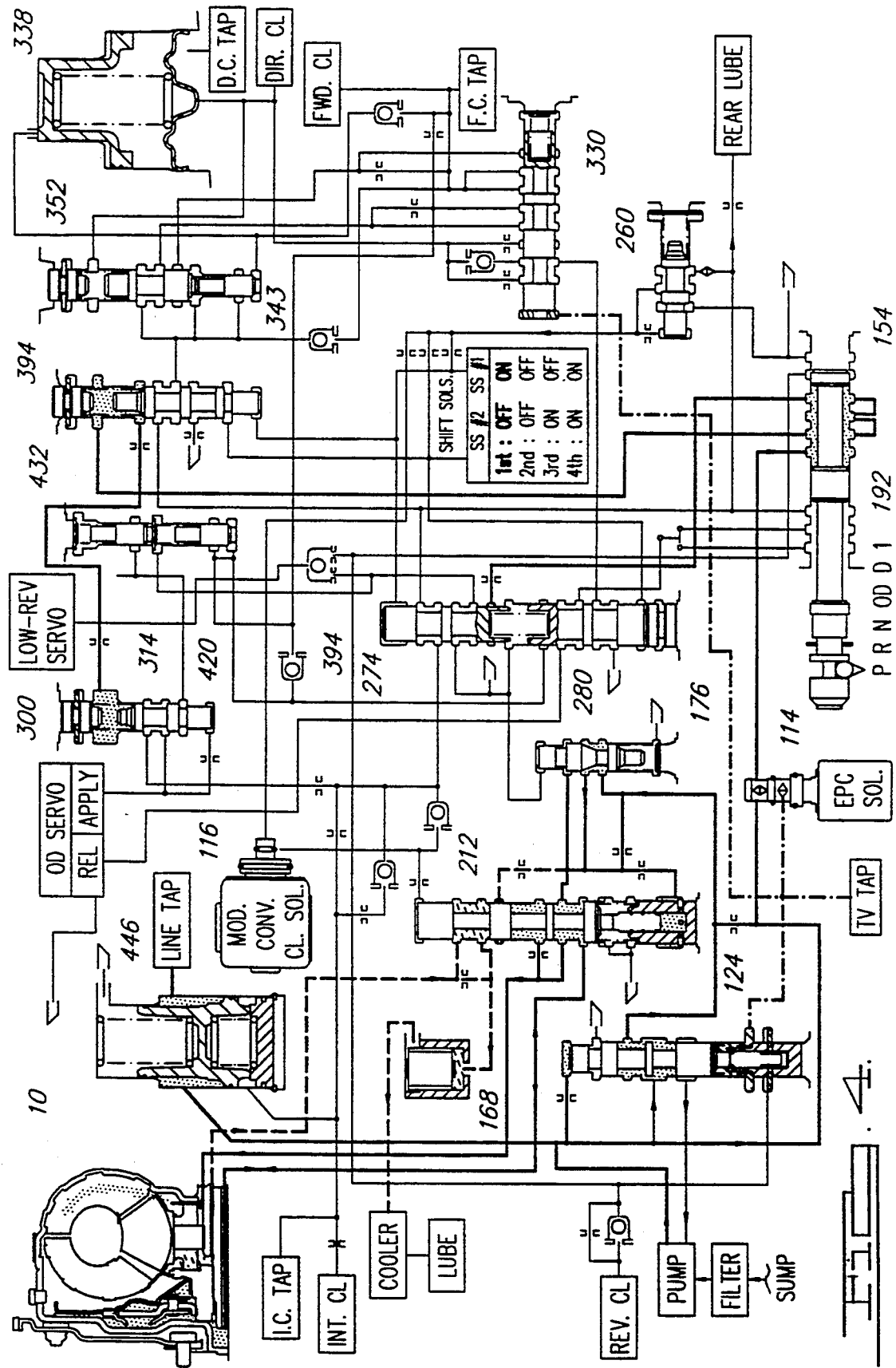

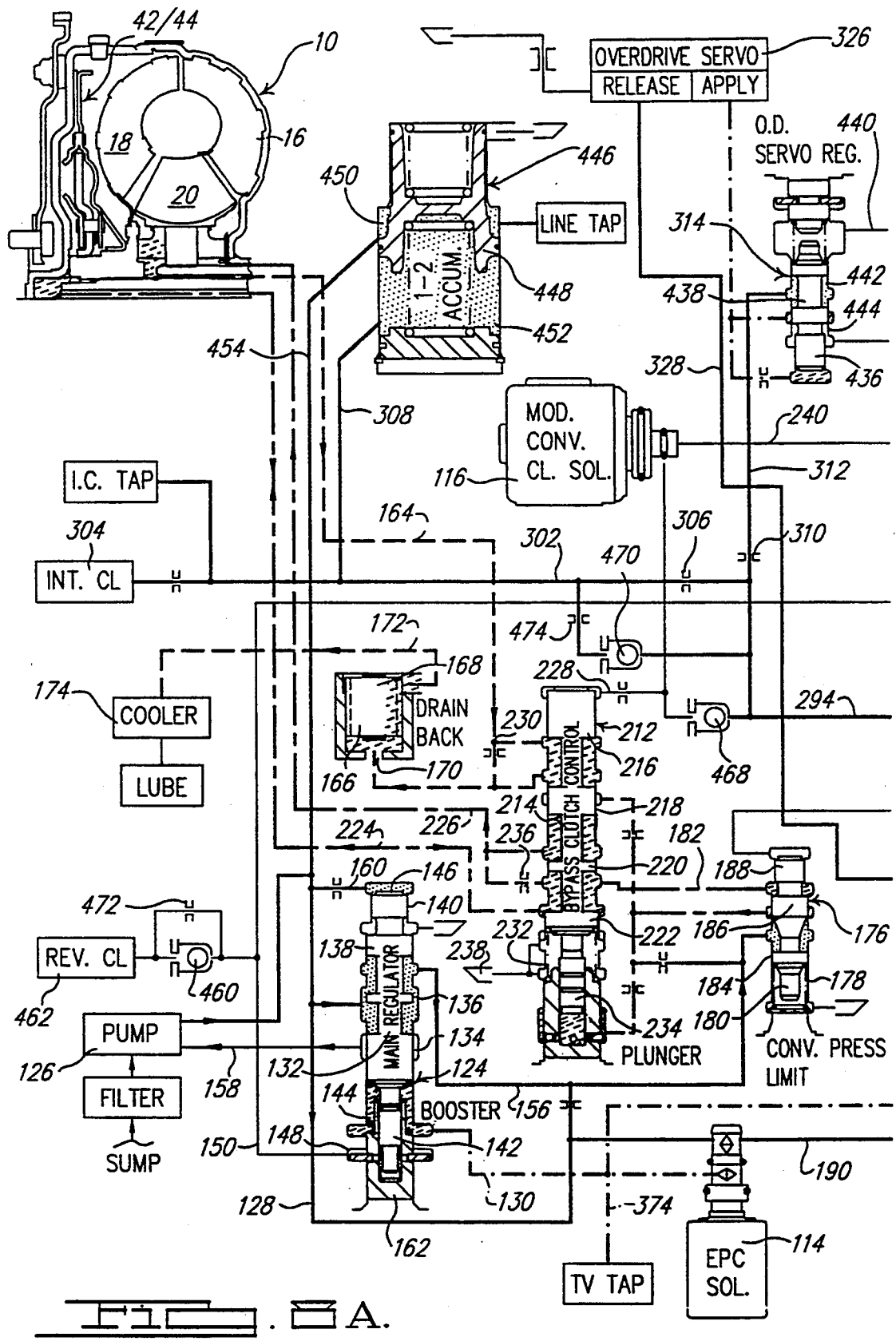

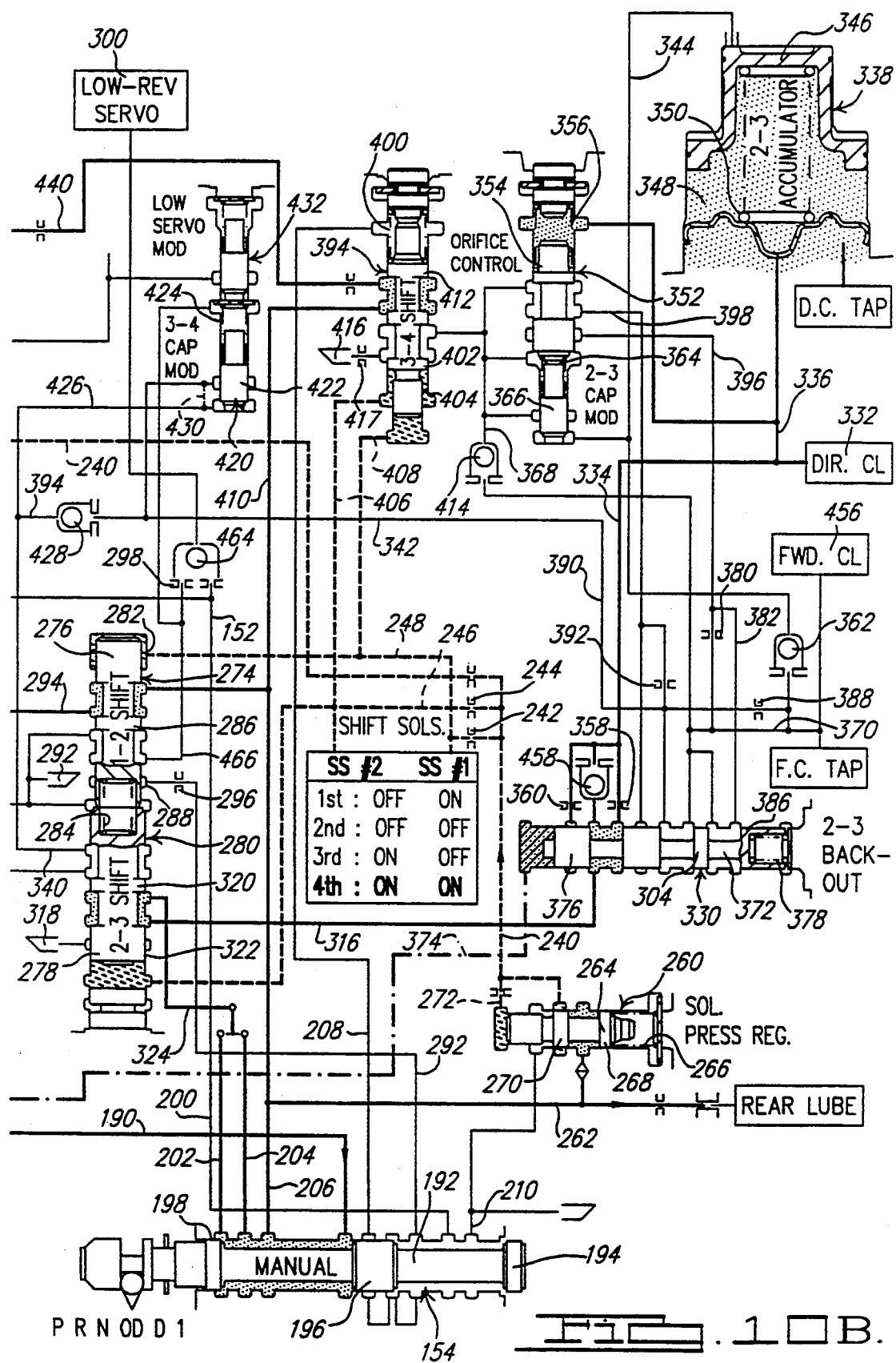

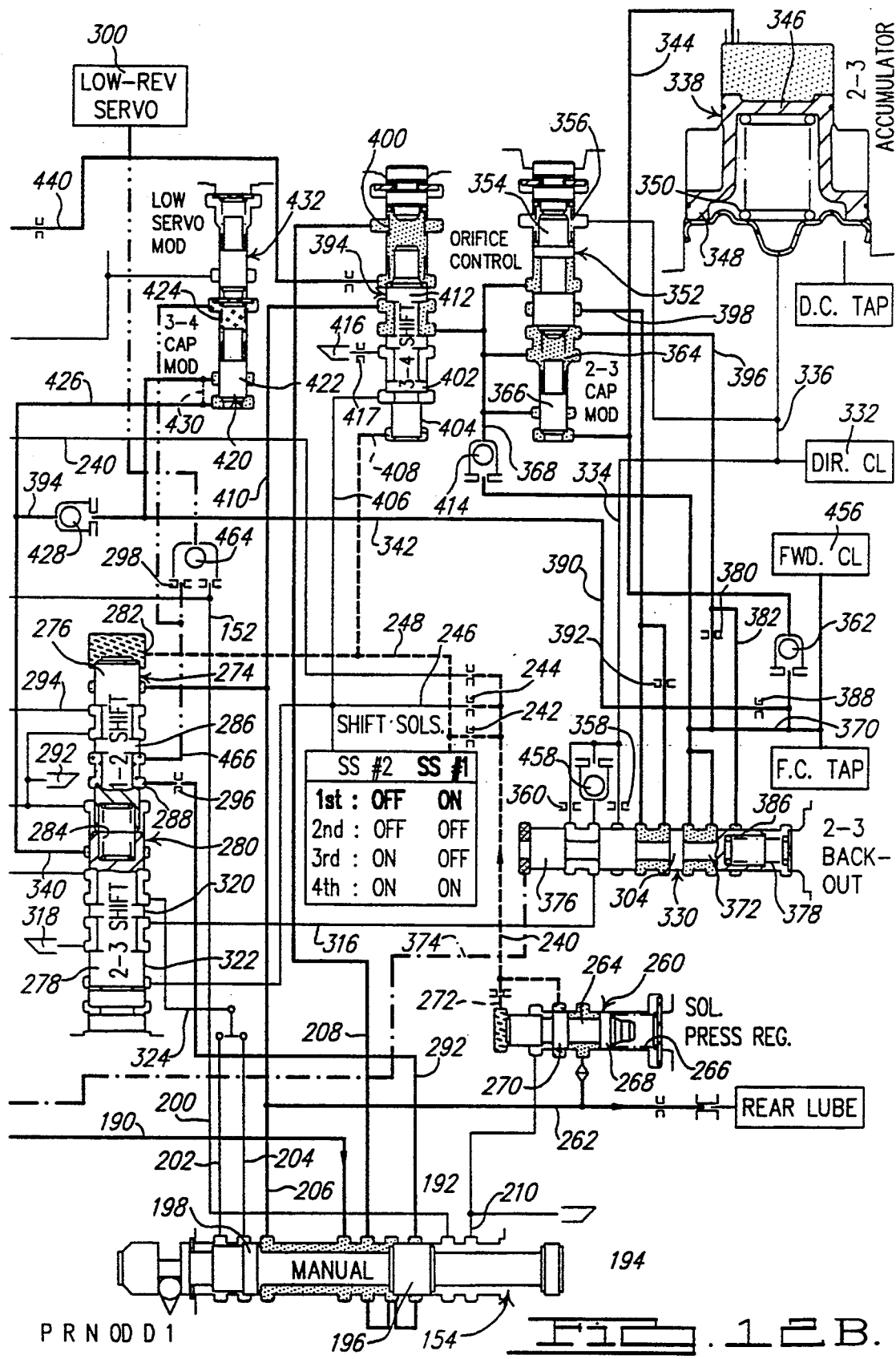

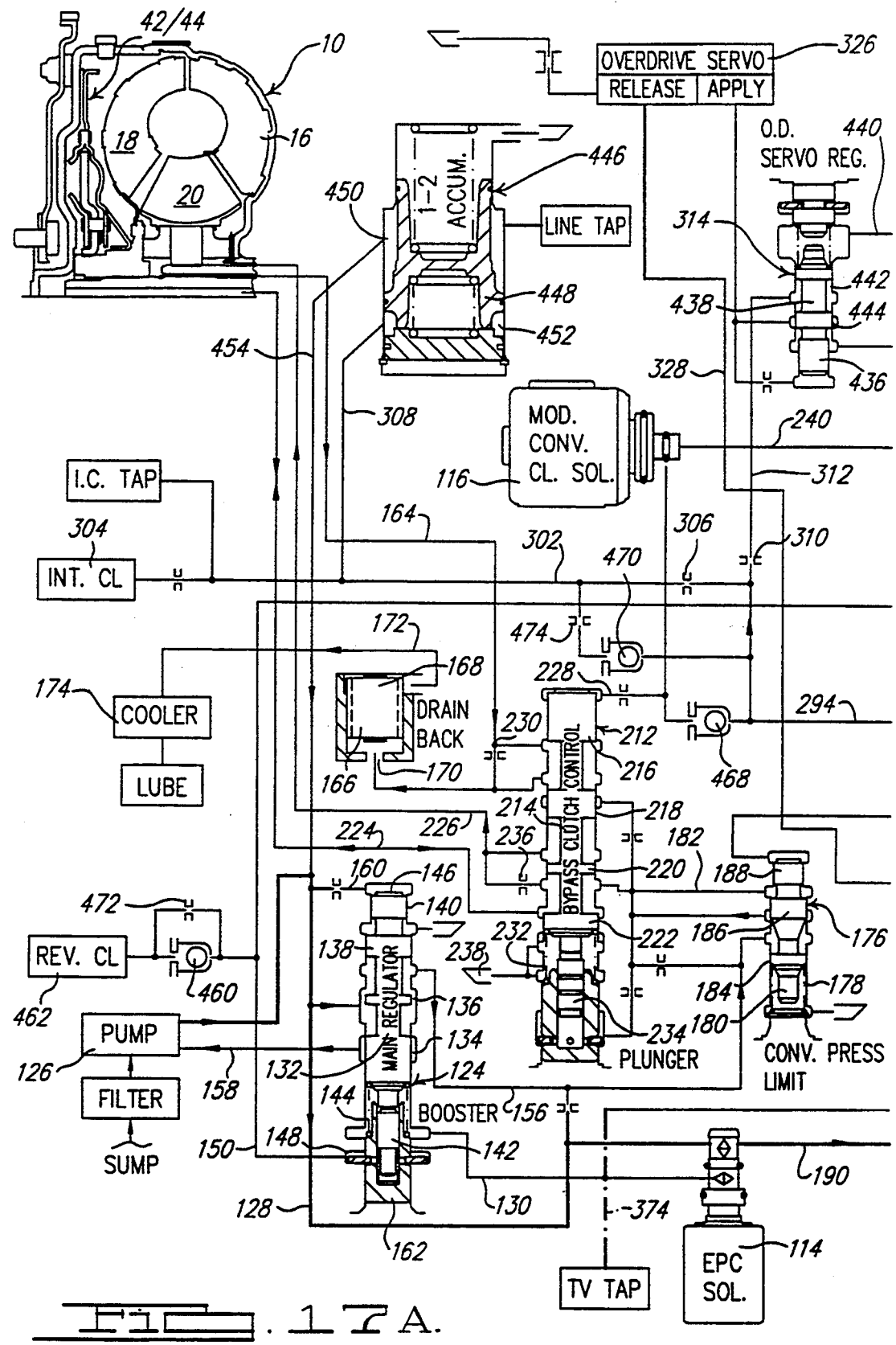

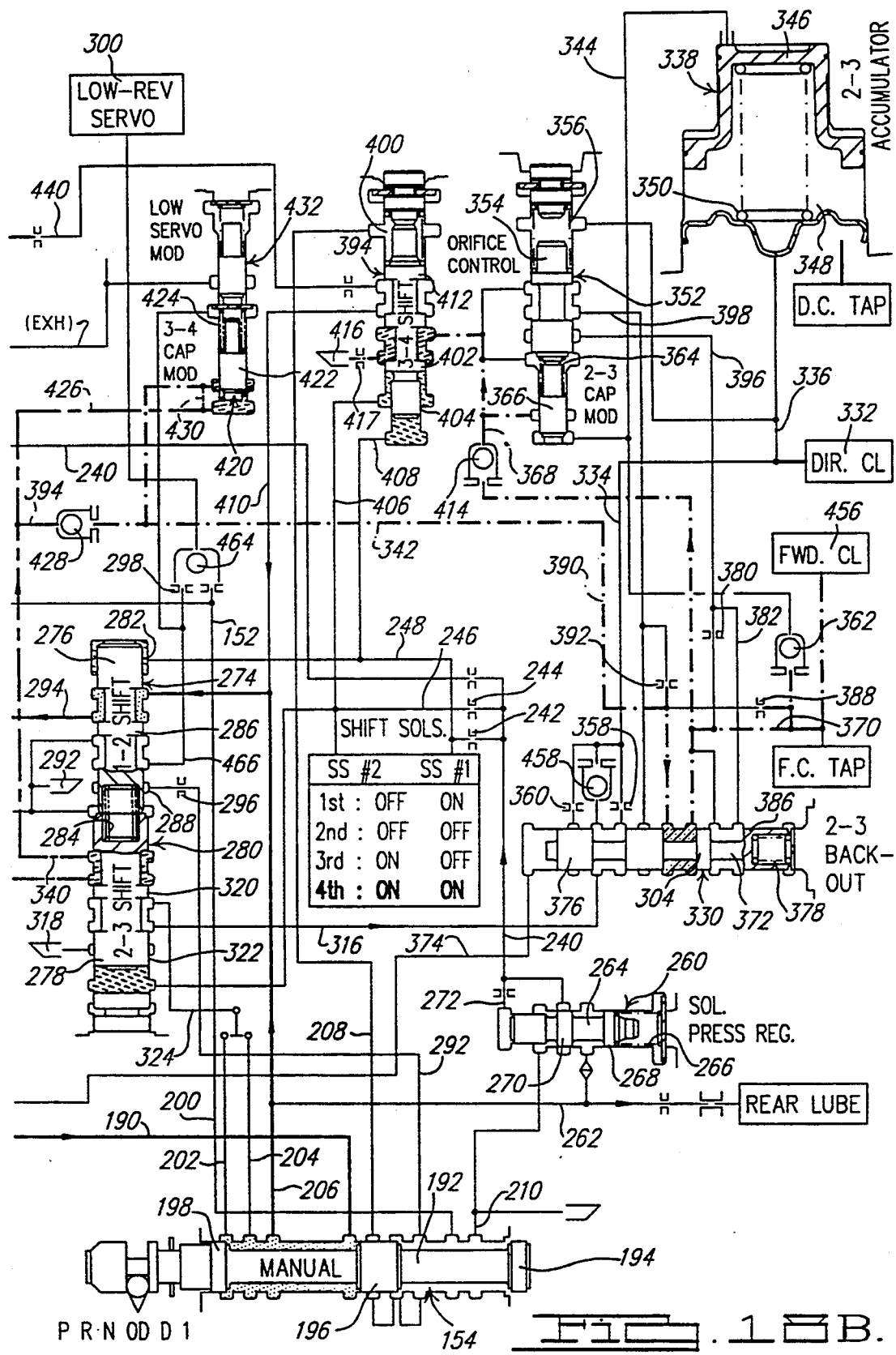

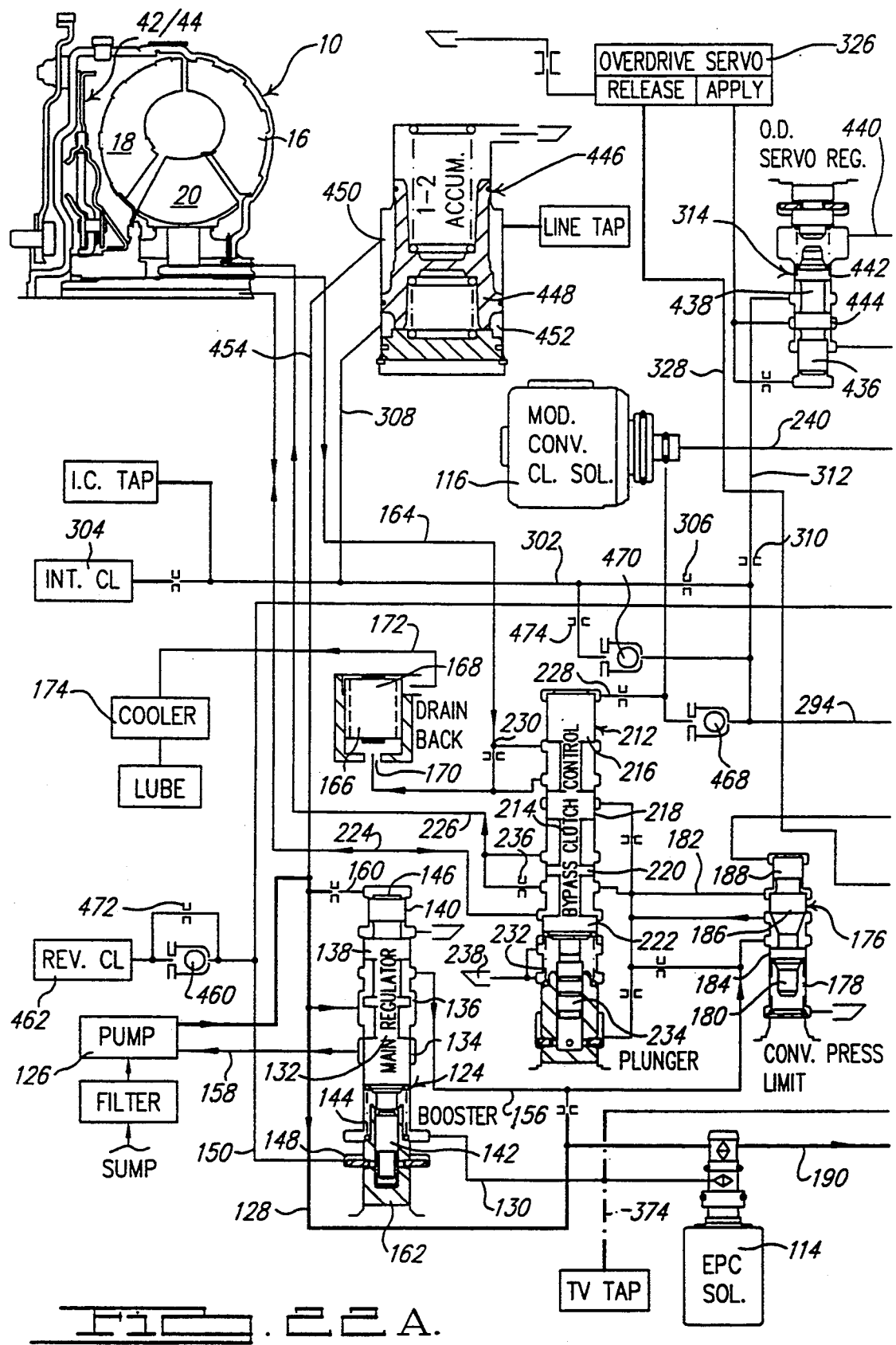

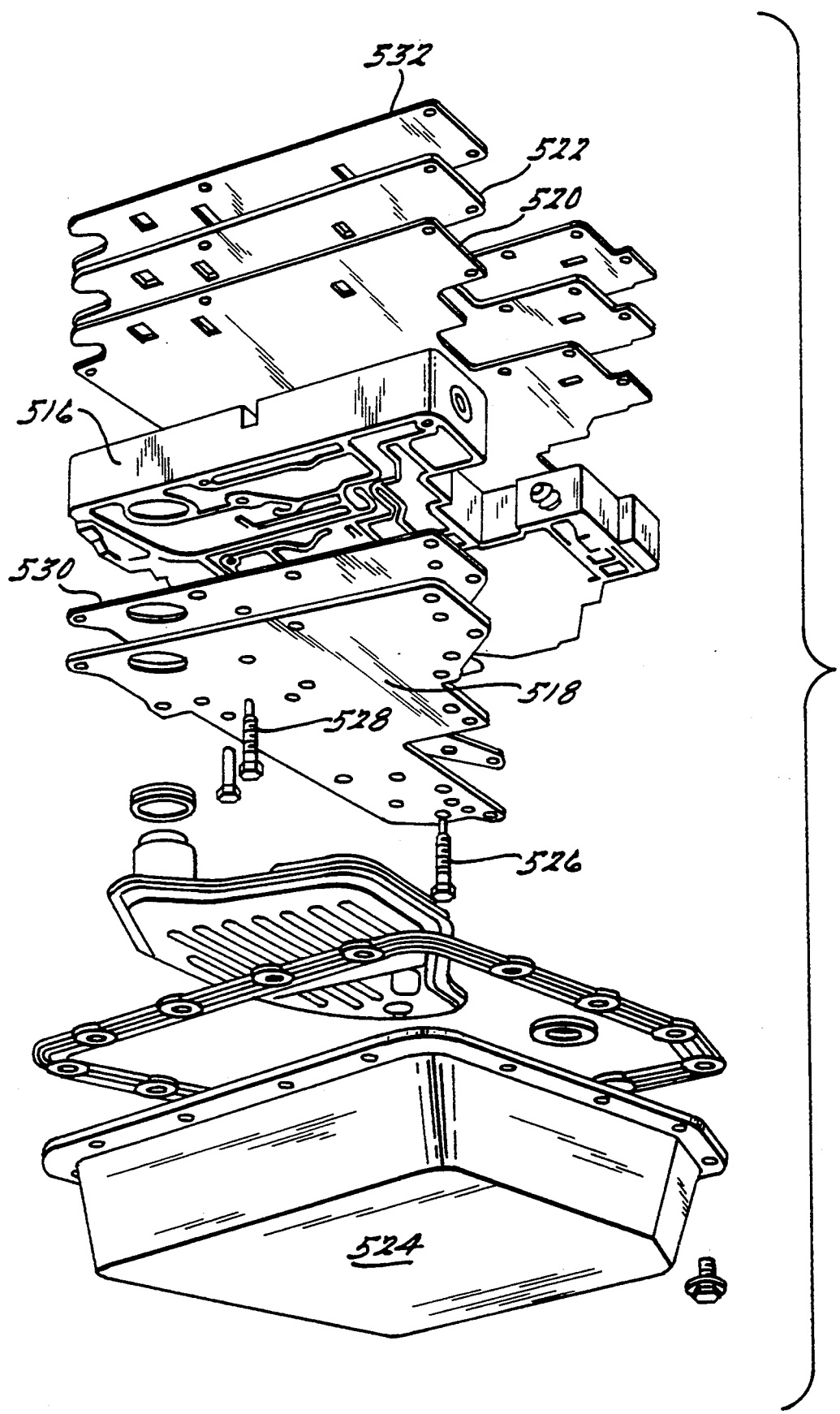

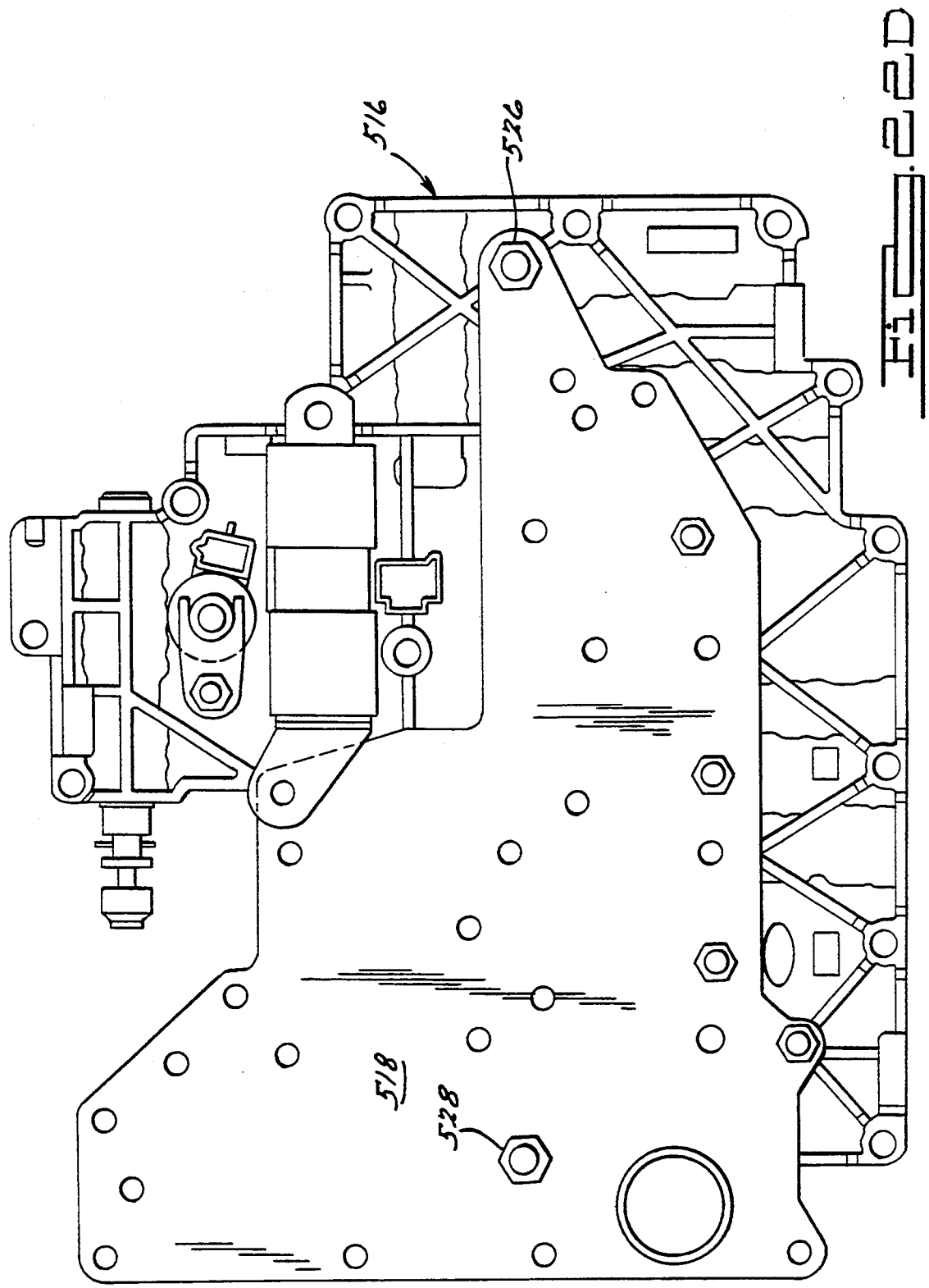

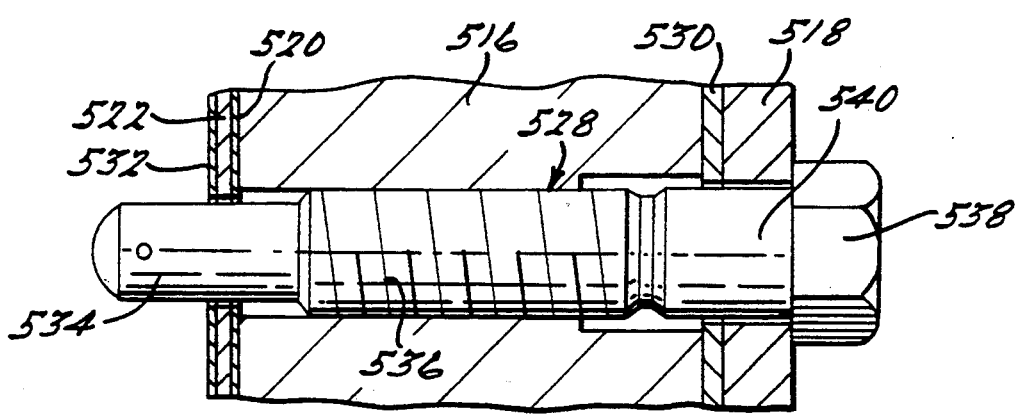
Fig. 22E.
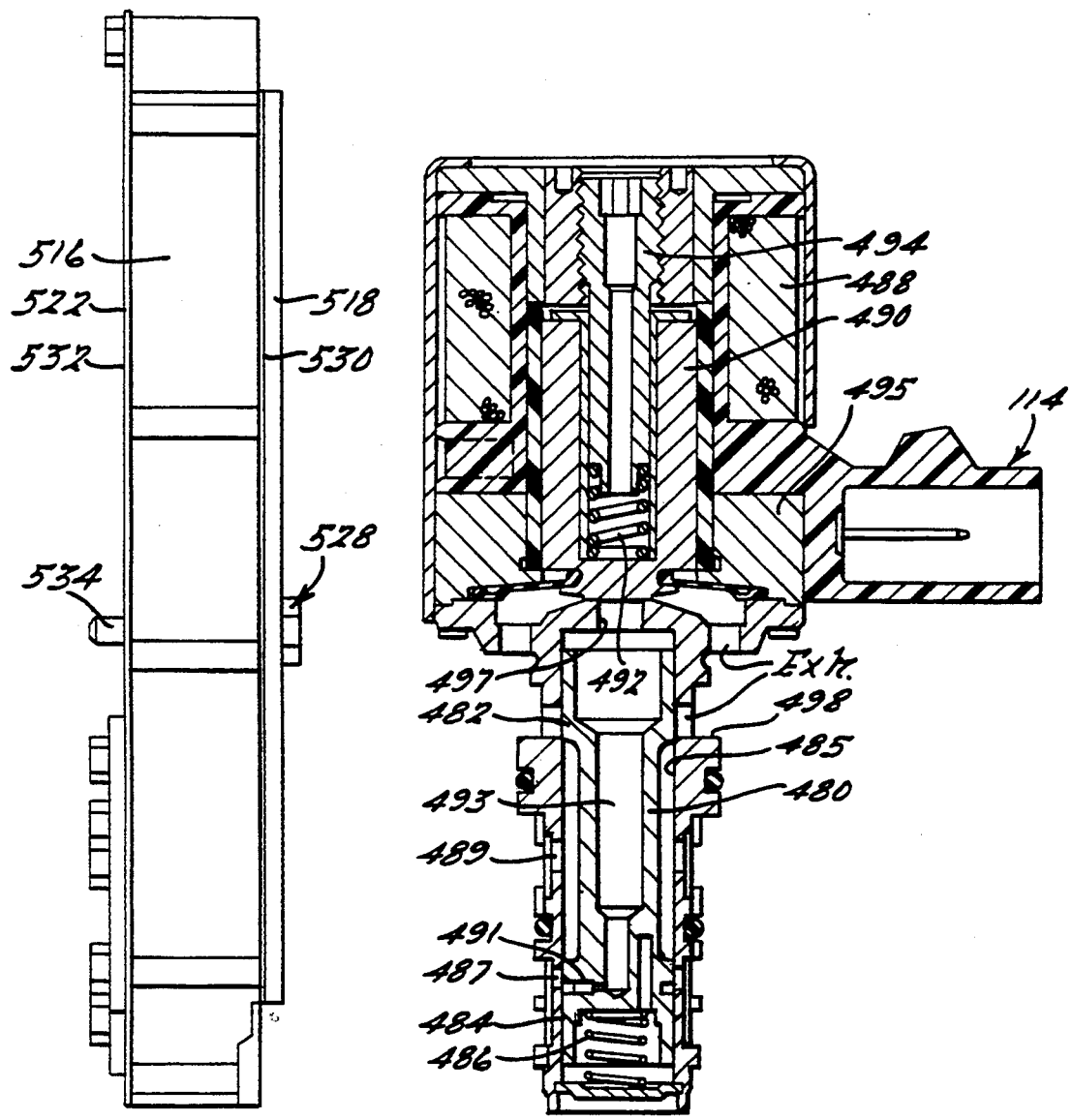
Fig. 22F.
Fig. 22S.

| Manual Valve | Gear | Engine Breaking | SOLENOIDS | | | FRICTION ELEMENTS | | | | | | |
|---|---|---|---|---|---|---|---|---|---|---|---|---|
| | | | SS1 | SS2 | MLUS | O/D BAND | L/R BAND | FWD CL | REV CL | DIR CL | INT CL | M/B CL |
| OD | 1 | NO | ON | OFF | EC | ER | HR | EA | HR | ER | ER | ER |
| | 2 | NO | OFF | OFF | EC | ER | HR | EA | HR | ER | EA | EC |
| | 3 | YES | OFF | ON | EC | ER | HR | EA | HR | EA | EA | EC |
| | 4 | YES | ON | ON | EC | EA | HR | ER | HR | EA | EA | EC |
| | 4 | NOT ALLOWED BY STRATEGY | | | | | | | | | | |
| D | 1 | NO | ON | OFF | XOFF | HR | HR | EA | HR | ER | ER | ER |
| | 2 | NO | OFF | OFF | EC | HR | HR | EA | HR | ER | EA | EC |
| | 3 | YES | OFF | ON | EC | HR | HR | EA | HR | EA | EA | EC |
| | 4 | NOT ALLOWED BY HYDRAULICS | | | | | | | | | | |
| 1 | 1 | YES | ON | OFF | EC | ER | EA | HA | HR | HR | ER | ER |
| | 2 | YES | OFF | OFF | EC | EA | ER | HA | HR | HR | EA | ER |
| | 3 | NOT ALLOWED BY HYDRAULICS | | | | | | | | | | |
| | 4 | NOT ALLOWED BY HYDRAULICS | | | | | | | | | | |
| R | R | YES | XON | XOFF | XOFF | HR | HA | HR | HA | HR | HR | HR |

LEGEND:
- EC = Electronically Controlled
- EA = Electronically Applied
- ER = Electronically Released
- HA = Hydraulically Applied
- HR = Hydraulically Released
- XON = Solenoid On – No Functional Effect
- XOFF = Solenoid Off – No Functional Effect
- SS1 = Shift Solenoid 1
- SS2 = Shift Solenoid 2
- MLUS = Modified Lockup Solenoid (PWM)
- O/D BAND = Overdrive Band
- L/R BAND = Low/Reverse Band
- FWD CL = Forward Clutch
- REV CL = Reverse Clutch
- DIR CL = Direct Clutch
- INT CL = Intermediate Clutch
- M/B CL = Modulated Bypass Clutch

FIG. 23.

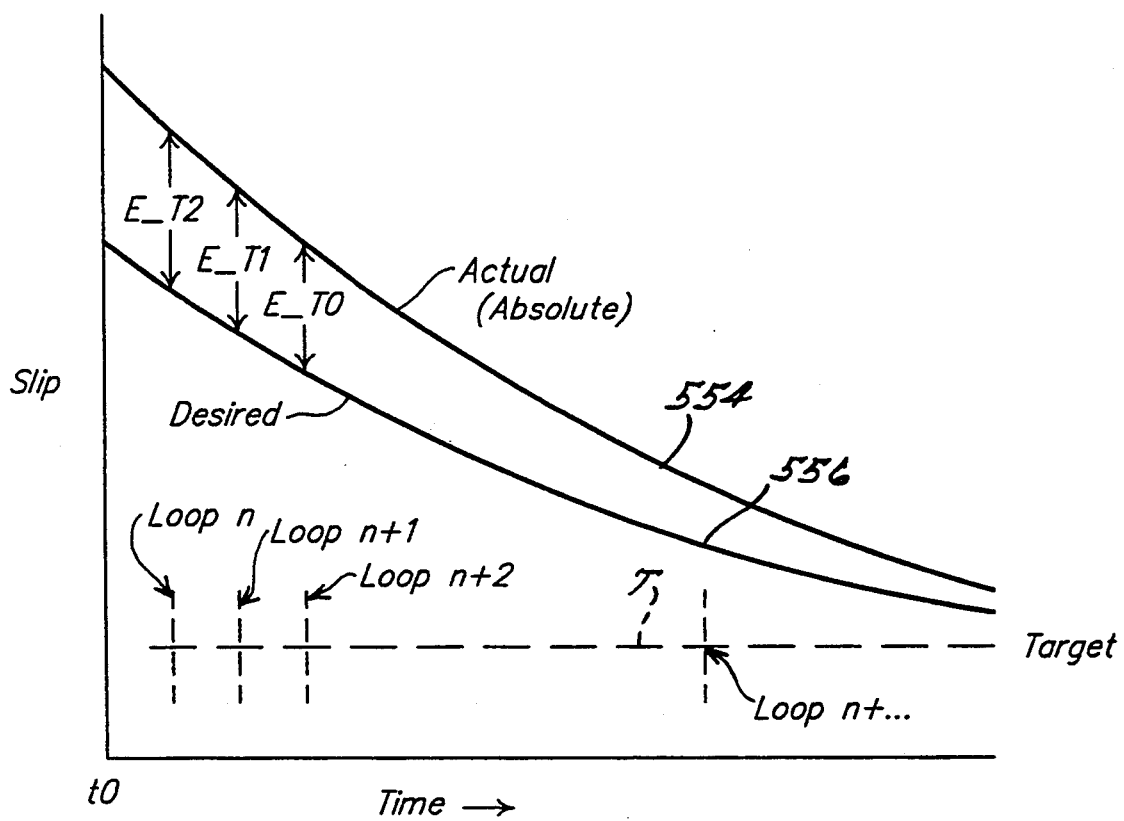
Prior Art
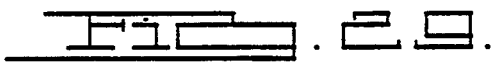

CONTROL SYSTEM FOR CONTROLLING ENGAGEMENT OF AN AUTOMATIC TRANSMISSION TORQUE CONVERTER CLUTCH

Cross-Reference To Related Application

This application is a division of U.S. Ser. No. 07/926,627, filed Aug. 10, 1992, entitled "AUTOMATIC TRANSMISSION CONTROL SYSTEM", now U.S. Pat. No. 5,305,663.

TECHNICAL FIELD

Our invention relates to automotive vehicle drivelines and particularly to improvements in a multiple ratio hydrokinetic transmission mechanism with a hydraulic control valve system that is under the control of an electronic microprocessor.

BACKGROUND OF THE INVENTION

Our invention relates to automatic controls for effecting ratio changes in a hydrokinetic power transmission mechanism of the kind disclosed in U.S. Pat. No. 4,934,216, which is assigned to the assignee of the present invention. The transmission of the '216 patent includes a hydrokinetic torque converter having an impeller and a turbine situated between an engine crankshaft and a compound planetary gear system, the latter having torque input elements adapted to be clutched to the turbine of the torque converter and output elements adapted to be connected to the traction wheels through a differential and axle mechanism. The transmission of the '216 patent is adapted particularly to be used in a vehicle driveline having a forward engine and rearward traction wheels. It is contemplated, however, that the principles of the present invention can be applied to a transaxle transmission of the type disclosed in U.S. Pat. No. 5,081,886, which also is assigned to the assignee of this invention.

Other examples of prior art transmissions capable of being adapted to incorporate the improvements of our invention are described in U.S. Pat. Nos. 4,978,328 and 5,083,481. These also are assigned to the assignee of this invention.

The transmission of the present invention comprises fluid pressure operated clutch and brake servos that control the relative motion of the elements of the planetary gearing to establish four forward driving ratios, including an overdrive ratio and a single reverse ratio. A hydrokinetic torque converter, which forms a hydrokinetic torque flow path from the engine crankshaft to the input elements of the gearing, includes a turbine and an impeller arranged in a toroidal fluid flow circuit. It includes also a friction bypass clutch adapted to connect the impeller to the turbine to establish a mechanical torque flow path in parallel with respect to the hydrokinetic torque flow path of the converter.

Prior art U.S. Pat. No. 5,029,087 discloses an electronic control strategy for effecting a controlled slip in a torque converter bypass clutch whereby the bypass clutch is actuated by modulated converter clutch solenoid pressure from a clutch solenoid valve to effect varying clutch capacity so that the resulting controlled slip results in an actual slip that approaches a target slip determined by the operating parameters of the driveline. That controlled slip strategy has features that are common to the control strategy for the bypass clutch of the present invention, as will be explained.

In that prior art bypass clutch design, the actual converter slip is continuously monitored by the processor as the engine speed and the turbine speed are detected by engine speed and turbine speed sensors. A desired slip is calculated by the processor during each background control loop and that value is subtracted from the actual slip to detect a slip error. The slip error, in turn, is used to calculate a duty cycle for the clutch solenoid valve so that the error is reduced and the desired slip, together with the actual slip, approach a target value. The magnitude of the target value is a value stored in computer memory. The target slip that is fetched from memory depends upon the operating variables of the driveline. In this manner, the desired slip and the actual slip approach the target value asymptotically.

The bypass clutch strategy of such prior art designs will provide for a continuous slip to eliminate transient torque fluctuations and noise, vibration and harshness during steady-state operation. The non-conformance of the desired slip to the target value due to the asymptotic approach of the desired slip with respect to the target value fetched from memory tends to make calibration of the driveline, particularly the bypass clutch, more difficult. The precise desired slip that is required by the processor to satisfy a particular driveline condition is not available because the desired slip versus time relationship will float relative to the target value during its asymptotic approach to the target. Furthermore, the continuous slipping that is characteristic of such bypass clutch strategy during steady state operation may cause bypass clutch friction surface durability concerns.

BRIEF DESCRIPTION OF THE INVENTION

The improved bypass clutch control strategy of the present invention overcomes possible shortcomings, described above, with respect to the prior art control strategy for a modulated bypass torque converter clutch wherein the actual slip or the desired slip approach a target slip value asymptotically. The improved control strategy of the present invention makes it possible to compute the desired slip in a bypass clutch controller of the kind previously described so that at the beginning of the bypass clutch operating mode, the desired slip is made equal to the actual slip that is measured by the engine speed sensor and the output shaft speed sensor or turbine speed sensor. Having determined the desired slip by setting it equal to the actual measured slip, a ramp modifier is fetched from the computer memory so that the desired slip will decrease over time at a prescribed rate that depends upon the value for the modifier that is fetched from memory. That modifier is dependent upon the gear ratio that is called for by the transmission shift control strategy. Thus, the slope of the ramp for the desired slip over time will be a unique ramp for each gear ratio. The desired slip then will approach the target value until it matches the target value, the latter being fetched from memory in the same manner described above with respect to the control system of prior art U.S. Pat. No. 5,029,087.

After the desired slip and the target value are equal, one with respect to the other, the actual slip then will continue to decay until it too reaches the target value. It continues to decay toward a value corresponding to the target value as long as there is an error in the slip as measured by the difference between the actual slip and the desired slip. When the speed and load conditions dictate, the target slip value becomes zero and the control strategy will initiate a hardlock mode whereby the slip will be ramped again down to a zero slip using the same control technique that is used to determine desired slip at the initiation of the engagement of the bypass clutch. That is, a slip modifier value again is fetched from the ROM portion of the memory, the value of the modifier depending upon the gear ratio in place. When the converter is in the hardlock mode, a direct mechanical connection is established between the engine and the torque input element or turbine shaft.

Provision is made also in the improved control strategy for the bypass clutch of the present invention for interrupting the hardlock mode during ratio shifts. The beginning of the shift is detected by measuring a change in speed ratio. This signals the interruption of the hardlock mode and the beginning of an open loop converter control. During the time interval for the open loop converter control, the converter clutch actuating pressure is reduced by a multiplier fetched from memory, thereby reducing the torque transmitting capacity of the clutch so that transient torque fluctuations in the driveline are absorbed by the converter during a shift interval. The termination of the shift is detected by continuously monitoring the speed ratio. When the speed ratio change (delta speed ratio) is large enough to indicate the end of the shift, the control strategy will cause the bypass clutch for the converter to reenter the hardlock mode or the slipping, closed loop control mode, as appropriate. This occurs as the absolute slip becomes stabilized at zero RPM. After that occurs, the duty cycle again is ramped up to its maximum value corresponding to full bypass clutch engagement if the controller calls for operation of the clutch in the hardlock mode.

The bypass clutch for the hydrokinetic torque converter is capable of being modulated to effect a controlled slip, as explained above, before the "hardlock" mode occurs. This is done, as explained, by means of a bypass clutch control valve under the control of a modulated converter clutch solenoid valve.

The duty cycle of the modulated converter clutch solenoid valve is determined by a microprocessor so that the absolute slip for any operating condition will approach over time the target slip that is obtained from the memory portion of the microprocessor to satisfy the instantaneous operating demands. This tends to develop heat because of the energy loss, during the slipping mode. If the temperature of the transmission fluid is above a predetermined value, the microprocessor software will trigger a maximum duty cycle for the modulated converter clutch solenoid so that the converter clutch will assume a fully engaged condition to avoid slipping until the temperature reaches a value less than the predetermined maximum.

According to another feature of the invention, we have provided a simplified assembly procedure for assembling the valve body to the transmission casing which includes the use of dowel bolts that align the gaskets, the cover plates for the valve body and the valve body itself with respect to the transmission case to which the valve body is secured, thereby providing precise registry of the stacked elements of the control valve body and its associated gaskets and cover plates. This improves the reliability of the assembly and simplifies the assembly procedure.

These and other improvements will become apparent from the following particular description, which will refer to the figures of the drawings.

BRIEF DESCRIPTION OF THE DRAWINGS

FIG. 4 shows in schematic form the elements of a valve circuit for the present invention.

FIGS. 6A and 6B show a schematic valve diagram of the valve system of the invention wherein the valve elements are positioned for neutral, closed throttle, open converter operation.

FIGS. 8A and 8B show a schematic valve diagram of the valve elements in their positions corresponding to overdrive, second gear, part throttle, open converter operation.

FIGS. 9A and 9B show a valve circuit diagram with the valve elements in the positions they assume during overdrive, third gear operation with the bypass clutch control valve in the position it assumes when the converter is in its slipping mode. The 2-3 back-out valve position mainly depends upon whether the throttle is open or closed.

FIGS. 10A and 10B show a valve circuit diagram with the valve elements in the positions they assume during overdrive, fourth gear, part throttle operation with the torque converter clutch applied. The bypass clutch control valve is shown in its position when the converter clutch is applied and the converter is in a lock up mode.

FIGS. 12A and 12B show a schematic valve diagram with the valve elements in the positions they assume when the manual valve is in the manual low position and the transmission is conditioned for first gear operation with closed throttle and an open converter.

FIGS. 16A and 16B show a circuit diagram with the valve elements in the positions they assume during overdrive operation and during a 1–2 upshift with part throttle.

FIGS. 17A and 17B show a schematic valve diagram with the valve elements in the positions they assume during overdrive operating and during a 2–3 shift with part throttle.

FIGS. 18A and 18B show a valve diagram with the valve elements in the positions they assume during overdrive operation and during 3–4 upshift with part throttle. The 2–3 backout valve for the 4–3 downshift at part throttle corresponds to that shown in FIG. 18B.

FIGS. 22A and 22B show a schematic valve diagram with the valve elements in the positions they assume during a 3–2 closed throttle downshift during operation in the overdrive mode.

FIG. 22C is an exploded assembly view showing the valve body, the oil pan, the gaskets and the dowel screws used during the assembly of the valve body elements to the transmission case.

FIG. 22D is a plan view showing the valve cover plate assembled to the valve body and located by the dowel pins illustrated schematically in FIG. 22B.

FIG. 22E is a detailed view of the dowel pin or bolt used in the assembly of the valve plates, the gaskets and the valve body of FIG. 22C.

FIG. 22F is an end view of the valve body with the valve cover plates applied and the dowel bolts in place.

FIG. 23 is a chart showing the solenoid states for effecting ratio changes and the condition of the friction clutches and brakes during each of the drive ranges and for each of the ratios in each drive range.

FIG. 25 is a cross-sectional view showing the electronic pressure control solenoid valve and the solenoid actuator which controls the line pressure maintained by the pressure regulator.

FIG. 26 is a cross-sectional view showing the modulated converter clutch control solenoid valve for controlling the torque converter clutch.

FIG. 26D shows the relationship between the speed ratio and duty cycle during the period of time following the command of a ratio shift to the end of that shift.

FIG. 26E is a flow chart showing the electronic control strategy for the hardlock mode for the torque converter bypass clutch following the closed loop control for the bypass clutch after the absolute slip has become equal to target slip.

FIG. 29 is a plot of the bypass clutch slip characteristics for the prior art bypass clutch design to which the chart of FIG. 28 refers.

PARTICULAR DESCRIPTION OF THE INVENTION

The Converter And Gearing

Figure 1:
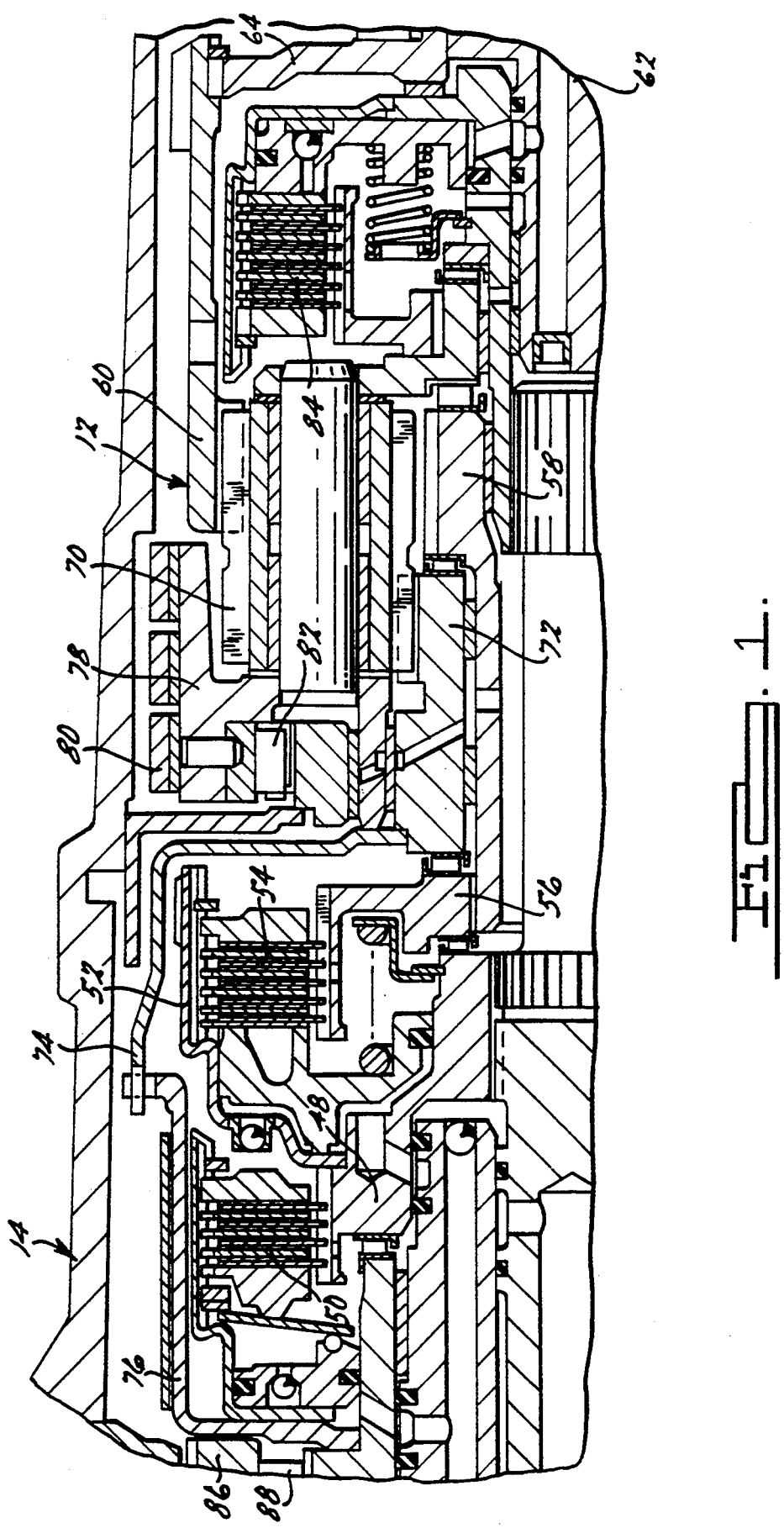
FIG. 1 is a partial cross-sectional view of an automatic transmission having a hydrokinetic torque converter and gear elements capable of being controlled by the improved control valve system of this invention.
Figures 2, 3:
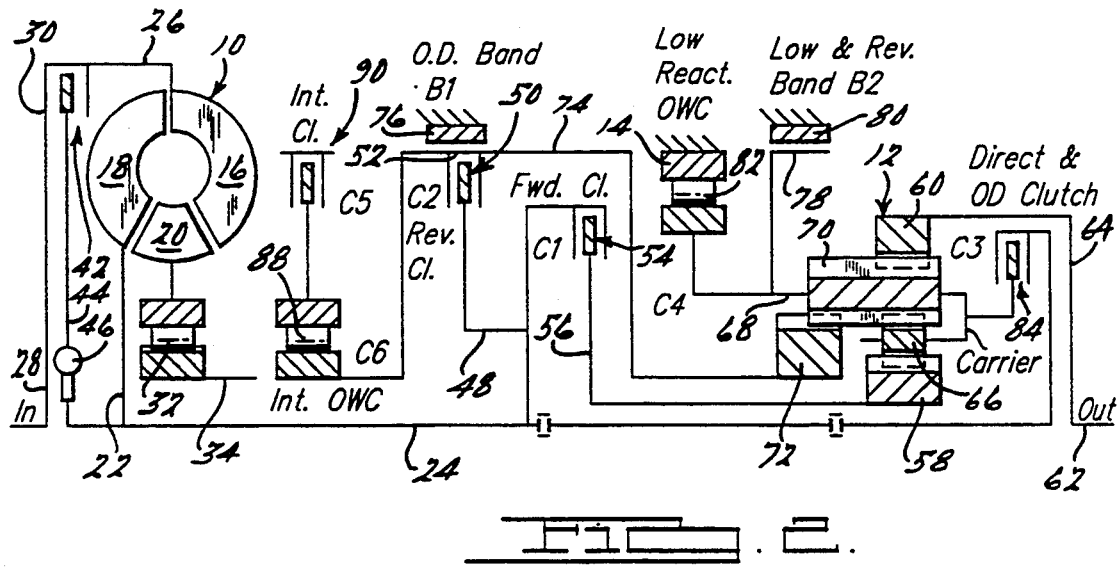
FIG. 2 is a full schematic representation of the converter and the gear elements of the cross-sectional view of FIG. 1.
FIG. 3 is a chart that shows the clutch and brake engagement and release pattern for effecting ratio changes in the transmission of FIGS. 1 and 2.

In the cross-sectional view of the transmission seen in FIGS. 1 and 2, numeral 10 designates a hydrokinetic torque converter and numeral 12 designates a compound planetary gear unit. The converter 10 and the gear unit 12 are located in a transmission housing illustrated at 14.

The converter 10 includes a bladed impeller 16, a bladed turbine 18, and a bladed stator 20. The converter elements 16, 18 and 20 form a toroidal fluid flow path in known fashion, whereby impeller torque is multiplied hydrokinetically to produce a turbine torque that is distributed through turbine hub 22 to the turbine shaft 24. The impeller is enclosed within an impeller housing 26, which is bolted by means of bolts 28 to an engine crankshaft. The bolts 28 are located at the hub of a drive plate 30. The latter being secured to the outer periphery of the impeller housing 26.

Stator 20 is mounted on a one-way brake 32 and is supported by stationary turbine sleeve shaft 34.

Housing wall 36 forms an enclosure for the transmission pump 38, which includes positive displacement Gerotor pump elements connected drivably to the hub 40 of the impeller 16.

A torque bypass clutch generally shown at 42 includes a clutch plate 44 adapted to engage the adjacent wall of the impeller housing 26. It is secured to turbine hub 22 by means of a damper assembly 46. Fluid is distributed radially outward through the space between the clutch plate 44 and the adjacent wall of the impeller housing when the clutch is disengaged. The converter at that time acts as an open converter and is capable of multiplying torque hydrokinetically. Fluid is supplied continuously to the toroidal cavity of the converter and the pressure thus developed applies the clutch by engaging the clutch plate 44 against the adjacent frictional surface of the impeller housing. The radial outward flow through the space between the plate 44 and the adjacent wall of the impeller housing is interrupted when the clutch is applied.

The torque delivered to the turbine shaft 24 is transferred through the turbine shaft to the torque input side 48 of reverse clutch 50 and to the torque input side 52 of forward clutch 54. The output side 56 of the forward clutch 54 is connected to sun gear 58 of the planetary gear unit 12. The ring gear 60 of the gear unit 12 is connected to a torque output shaft 62 through torque transfer member 64.

Sun gear 58 engages a first set of planet pinions 66 supported on carrier 68. Pinions 66 engage companion pinions 70 which in turn mesh with the ring gear 60. Pinions 70 mesh with a second sun gear 72. The torque output side of the reverse clutch 50 is connected to sun gear 72 through torque transfer member 74. A brake drum 76 forms a part of the torque output portion of reverse clutch 50. The brake band for drum 76 is applied during overdrive operation to anchor the sun gear 72.

Carrier 68 journals both sets of pinions 70 and 66 and is connected to reverse brake drum 78. Brake band 80 surrounds brake drum 78 and is applied during reverse drive operation. An overrunning brake 82 anchors the carrier 68 during operation in the first speed ratio as forward drive reaction torque is delivered to the housing 14.

Carrier 68 is adapted to be connected to the turbine shaft 24 through direct-drive clutch 84.

Brake drum 76 is connected to the outer race 86 of an overrunning brake 88. Race 86 is adapted to be braked by friction brake 90 to the transmission housing 14. When brake 90 is applied, overrunning brake 88 is adapted to deliver reaction torque to the housing through the friction brake 90 during intermediate ratio operation.

For a particular description of the mode of operation of the transmission of FIGS. 1 and 2, reference may be made to U.S. Pat. No. 4,934,216 discussed above. For present purposes however, the mode of operation can be summarized by referring to FIG. 3. This figure is a chart showing the clutches and brakes that are engaged or released to established each of the ratios and each of the multiple drive ranges.

To simplify the description, FIG. 3 carries the symbol B1 to identify the overdrive brake band 76, the symbol B2 to identify the reverse brake band 80, the symbol C1 to identify the forward clutch 54, the symbol C2 to identify the reverse clutch 50, the symbol C3 to identify the direct and overdrive clutch 84, the symbol C4 to identify the overrunning brake 82, the symbol C5 to identify the intermediate clutch 90 and the symbol C6 to identify the overrunning brake 88. FIG. 3 also shows solenoid states for solenoid SS1 and solenoid SS2, which will be described subsequently.

During operation in the first gear ratio in the automatic drive mode, clutch C1 is applied and brake C4 is applied. Torque delivered to the turbine shaft 24, and then it is transferred through the clutch C1 to the sun gear 58. The carrier 68 acts as a reaction member since it is braked by brake C4. Thus, the ring gear 60 is driven in a forward driving direction with the highest torque multiplication ratio. If coast-braking is desired (manual range), brake band 80 is applied thus permitting the reaction torque to be distributed to the housing 14 in a reverse driving direction.

An upshift to the second ratio is achieved by applying intermediate brake C5. This permits the sun gear 72 to act as a reaction point and the overrunning brake C4 begins to overrun. Torque is distributed to the housing through the brake C5 and through the overrunning brake C6.

An upshift of the third ratio from the second ratio is achieved by engaging direct-drive clutch C3 while clutch C1 remains applied. Thus, all of the elements of the gearing then are locked together for rotation in unison.

Fourth ratio is achieved by releasing clutch C1 and applying brake band B1. Sun gear 72 then acts as a reaction point as the input torque is delivered through the clutch C3, thus overdriving the ring gear 60.

Reverse drive is obtained by applying brake band 80 thus anchoring the carrier. Engagement of the reverse clutch 50 results in torque transfer from shaft 24 to the sun gear 72. With the carrier 68 acting as a reaction member, ring gear 60 is driven in a reverse direction as sun gear 72 acts as a torque input element.

The Microprocessor Controller

Figure 3A:
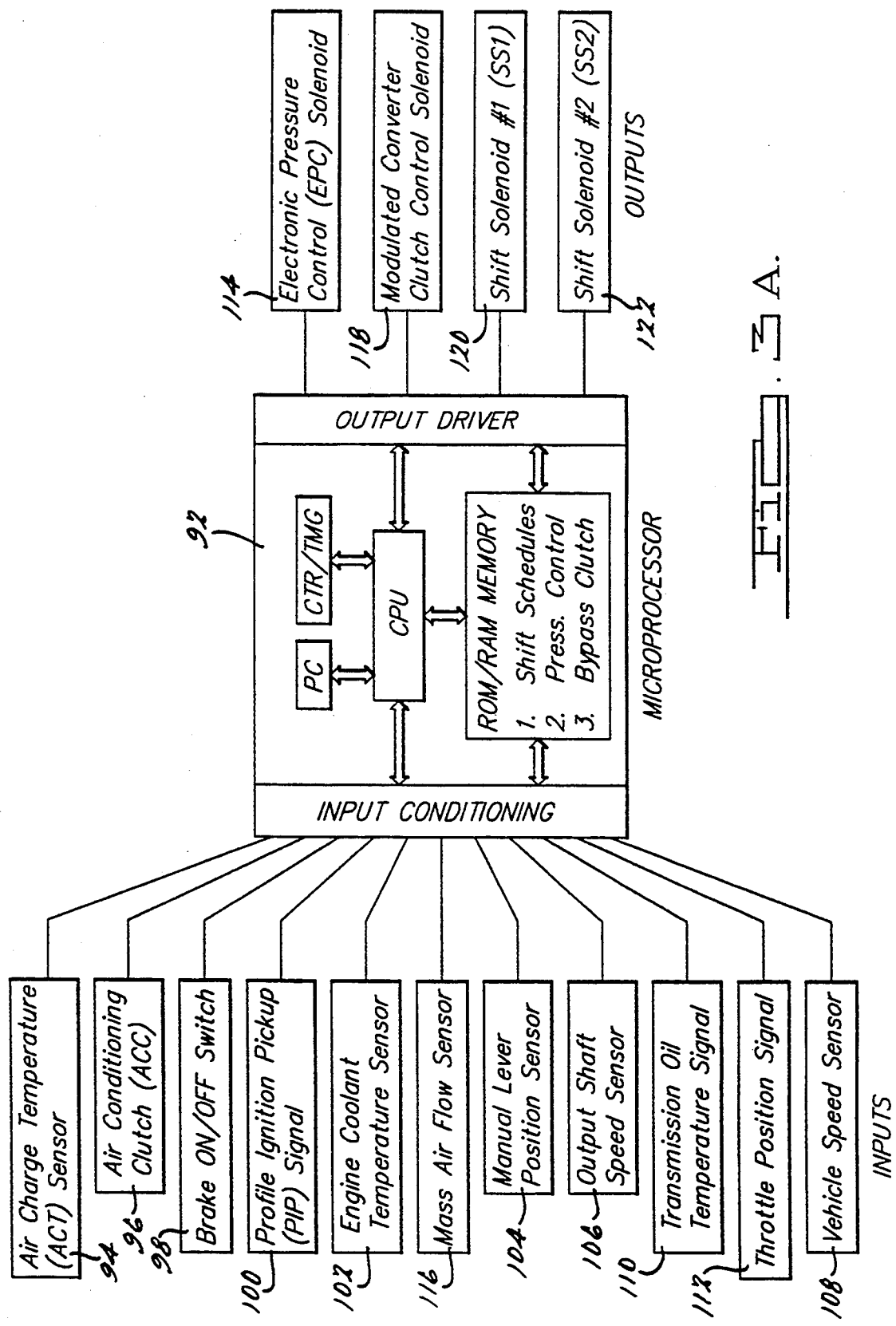
FIG. 3A is a schematic overview of a microprocessor adapted to control the valve circuit of the present invention.

FIG. 3A shows a microprocessor that is used to control the valve circuits that in turn control distribution and exhaust of actuating pressure to the clutch and brake servos for the transmission. The processor is shown at 92 in FIG. 3A.

As schematically represented in FIG. 3A, an air-charge temperature sensor 94 is adapted to develop an ambient air temperature that is used by the processor in developing commands issued to the control valve system. The processor also responds to an air conditioning clutch signal from sensor 96 which indicates whether the air conditioning system is on or off. This is one of the parasitic torque losses that must be accounted for by the processor in issuing instructions to the solenoid valves of the valve circuit.

A brake on/off switch 98 is triggered by the vehicle brakes and the on/off signal is delivered to the processor.

An engine speed sensor 100 measures crankshaft speed and engine coolant temperature is sensed by temperature sensor 102.

The drive range selected by the operator is indicated by a manual lever position sensor 104. A transmission output shaft speed sensor 106 provides an indication of the driven shaft speed for output shaft 62. That speed is related to the vehicle speed signal developed by sensor 108, the vehicle speed being a function of output shaft speed times the gear ratio that exists at any instant. A transmission oil temperature signal is delivered to the processor by sensor 110. An engine throttle position signal is delivered to the processor by sensor 112.

The transmission does not include a turbine speed sensor. However, a turbine speed value readily can be determined by the processor if either the output shaft speed or the vehicle speed is known and if the gear ratio is known. These variables that determine speed can be used by the processor in computing turbine speed at any instant. The turbine speed then can be compared to engine speed to detect torque converter slip at any instant.

The signals that are delivered to the valve circuit are received by an electronic pressure control solenoid 114, which is indicated generally in FIG. 25. The duty cycle for that solenoid can be changed to develop the required circuit pressure at any instant so that the capacities for the clutches and the brake servos are maintained at every instant at their optimum values for the required torque delivery capacity. The duty cycle is determined by the throttle position sensor signal developed by sensor 112 as well as the signal developed by mass air flow sensor 116, which measures the mass air flow at any instant at the engine throttle body for the internal combustion engine with which the transmission is used. The slip value that is determined by the processor is used to develop a duty cycle that is received by modulated converter clutch control solenoid 118. This solenoid is shown in FIG. 26.

Figure 27:
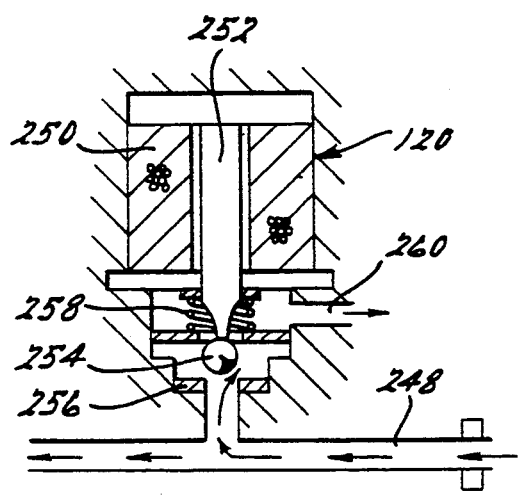
FIG. 27 is a cross-sectional view showing the shift control solenoid when it is deenergized.
Figure 27A:
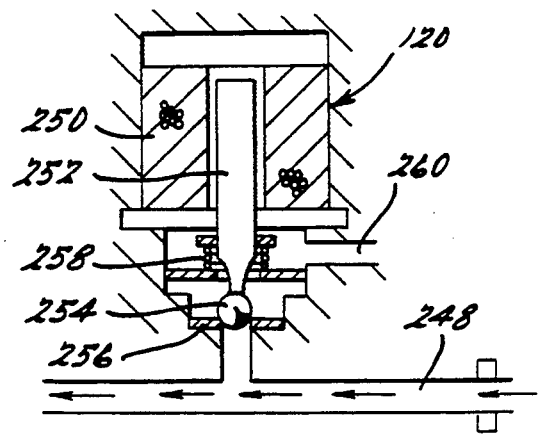
FIG. 27A is a view of the electronic shift control solenoid of FIG. 27 with the armature element of the solenoid in the position it assumes when the solenoid is energized.

The control valve circuit includes two solenoid operated shift valves which receive shift signals. These are on/off signals from the processor. They are received by shift solenoid number 1, shown at 120, and shift solenoid number 2, shown at 122. These shift solenoids will be described subsequently. Solenoid 120 is illustrated in FIGS. 27 and 27A. Solenoid 122 has not been separately illustrated in the drawings since it is similar to solenoid 120. Both solenoids are packaged in a single assembly.

The sensor inputs, such as the engine-related sensor signals indicative of engine coolant temperature, barometric absolute pressure, etc., are used by the processor to develop more accurate outputs as the load and climate conditions change. Other inputs are based on driver commands such as the engine throttle position. Still other inputs to the processor are developed by the transmission itself, such as the output shaft speed sensor signal, the manual lever position signal and the transmission oil temperature signal. The processor will develop the appropriate shift time and conditions for shifts in the ratio as well as control the clutch application and release. Line pressure also is developed by the processor to establish optimum shift feel.

The processor is an integrated central processor which converts signals, such as the signals from a vehicle speed sensor and an engine throttle position sensor, engine temperature sensor, turbine speed sensor and the manual selector lever, into electrical signals for the shift solenoid valves, the solenoid valve for the converter bypass clutch and the variable force solenoid for the electronic pressure control. The processor receives the sensor signals and operates on them in accordance with programmed control strategy, which will be described. The processor includes appropriate gates and driver circuits for delivering the output of the operation of the strategy to the hydraulic control valve body for the transmission.

The processor includes a central processor unit (CPU) having a read only memory (ROM) in which the programs (strategy) and calibration data are stored, a control unit that includes a read-write memory or RAM and internal busses between the memory and the central processor arithmetic logic unit.

The processor executes programs that are obtained from the memory and provides the appropriate control signals to a valve circuit as the input signal conditioning portions of the processor reads the input data and the computation logic portions deliver the results of the computation to the output driver system under the program control.

The memory includes both a random access memory (RAM) and a read-only memory (ROM), the latter storing the information that comprises the control logic. The result of the computations carried out on the input data is stored in RAM where it can be addressed, fetched, erased, rewritten or changed, depending upon the operating conditions of the vehicle. The CPU portions that perform the computations comprise an integrated circuit distinct from the microprocessor chip that comprises the memory portions. The memory and the CPU computation portions are connected by internal bus and interface circuitry.

Data may be read from a first memory location as the processor seeks an instruction from the memory. The fetched data is then fed into a data register or storage area and then to an instruction decoder. When an instruction is to be carried out, the data that is fetched is transferred to an arithmetic logic unit. Then, sequentially pursuant to instructions in the instruction decoder, other data may be fetched from memory and fed into the data registers. The data may be a shift time delay value, for example, and may be stored in an accumulator until it is addressed during shift sequencing of the processor.

Also sequentially, the data in the accumulator may be transferred to the data register and then fed back into memory and stored in the next memory location within the random access memory (RAM) where it may be addressed during the next background loop.

The data that is stored in ROM memory may, for example, be shift schedule information or functions in which two variables, such as throttle position and vehicle speed, are related one to the other in accordance with a shift function. The data also may be in the form of information in a table containing three variables or data such as a timer value and values for the other two pieces of data or variables.

The control strategy for the transmission is divided into several routines and control modules which are executed sequentially in known fashion during each background pass. The strategy for each module is executed furthermore in sequential fashion, just as the modules themselves are executed in sequential fashion. The various data registers are initialized as input data from the previously mentioned sensors are introduced into the input signal conditioning portion of the processor. The information that results from the inputting of the sensor data, together with information that is stored in memory and learned from a previous background pass, is used to carry out the control functions of the shift solenoid valves, the throttle pressure solenoid valve, and the bypass clutch solenoid valve. The modules and sub-modules are executed in sequence in each background loop. Each module or logic portion is independent of the others and performs a specific function. They are executed as they are separately addressed by the processor pointer. These functions occur after the input signals are received by the input gates and the signal conditioning portions of the processor and after the input signal conditioning has occurred.

The processor logic is established by independent logic modules that are calibrated for special purposes as will be described subsequently. For example, special logic is required to effect maximum smoothness during start-up from a standing start as the clutch and brake servos are actuated for acceleration from a standing start or, for example, during a transition from a forward driving condition to a reverse driving condition which requires release of a forward torque delivery clutch or brake and the engagement of a reverse clutch or brake. Another module will establish a desired circuit pressure when the vehicle is coasting or when the vehicle is operated in a power-off mode and a shift is called for by the control logic. The circuit pressure is dependent upon engine torque as represented by throttle position, but the capacity of the clutches and brakes cannot be made solely dependent upon the throttle position since, under certain operating conditions such as high-speed coasting or power-on or power-off ratio changes, an augmented circuit pressure is required to avoid excessive friction element slipping.

Another module will determine the normal TV (EPC) pressure that is required when a special condition such as start-up, coast boost or power-off shift is not present. The normal TV pressure (EPC) calculation developed by this module will take into account the inertia torque resulting from a change in engine speed during a shift. It also takes into account the dynamic conditions which require modification of TV pressure (EPC) resulting from variations in engine speed during a shift.

Thus, the normal calculation for determining the torque proportional pressure, which herein is referred to as throttle valve pressure or TV pressure, will consist of both a static portion and a dynamic portion. The static TV portion is determined by the torque input to the transmission and compensates for various factors that affect the net torque such as the ambient pressure, accessory loads, etc. The dynamic portion of the TV calculation takes into account the inertia torque due to changes in rotary velocity of the engine and other rotating portions of the driveline during a shift. The dynamic portion is added to the static portion to obtain a total value that is representative of torque at any given instant. This corrected value is necessary in order to achieve optimum shift feel and to eliminate harshness that might be perceived by the vehicle operator.

The static TV portion is calibrated by this normal TV calculation module for each gear. This requires a calculation of the effective torque, which is obtained by reading from a table stored in computer memory a value that is a function of engine speed and load, the latter being a measure of air charge. From that value, accessory losses are subtracted. The result of that subtraction is multiplied by the torque ratio of the torque converter which exists for each torque converter speed ratio, the speed ratio being a ratio of the turbine speed to the engine speed.

The calculation in this module will determine, for each gear, the slope of the functional relationship between static TV pressure and the static torque. During a shift, the dynamic torque is added to the input torque prior to the multiplication by the converter torque ratio. A different shifting slope constant is used for each gear. The dynamic TV pressure portion is added to the static portion of the throttle valve pressure during a shift.

Part of the pressure control strategy includes modulation of the clutch pressure during an upshift to improve smoothness during the shift. This involves using a converter turbine speed derivative to trigger a pressure drop so that the capacities of the clutch and brake servos are temporarily reduced to a level that will contribute to maximum smoothness but which will be sufficient to maintain adequate torque transfer capacity during the shift interval.

The ability of the clutches and brakes to transmit torque depends, of course, on the level of the pressure maintained in the control circuit by the main pressure regulator. This control is unlike TV pressure controls of conventional transmissions which rely upon mechanical throttle valve linkages to maintain a desired throttle valve pressure or a vacuum diaphragm which is actuated by engine intake manifold pressure. The TV control in the present design is achieved by a variable force solenoid valve, shown in FIG. 25, that responds to a signal developed by the electronic microprocessor. Electronic TV strategy for the processor includes the step of looking up engine torque from a table and varying appropriately the signal delivered to the variable force solenoid to adjust the torque transmitting capacity of the transmission.

The static capacity, which as mentioned previously is one of the components of the throttle valve TV pressure, is equal to the throttle valve (EPC) pressure required to hold the weakest friction element because of engine combustion torque (torque net) and inertia torque during a shift. When a shift is not occurring, the capacity is equal merely to static capacity. The sum of the two torque components is multiplied by the torque converter torque ratio to obtain the total torque capacity requirements. Adjustments to the static torque are made by determining the dynamic TV, as explained previously, in order to obtain the desired shift feel, to make adjustments for rapid "tip-in shifts" and to counteract for the lag time required for the variable force TV solenoid to respond.

The throttle valve pressure may be modified during a shift by retarding the engine spark at the proper instant. Throttle valve pressure is determined by a so-called TV-Guide throttle valve pressure module once every background loop, which may be as long as 100 milliseconds. However, a throttle valve pressure modification may occur at the beginning of a shift without waiting for the full 100 millisecond background loop to be completed. The so-called TV-GUIDE module in these circumstances will be executed as the next sequence. At initiation of a shift, an engine ignition spark retard may be called for, but this occurs during a 100 microsecond foreground loop or repeater loop as distinct from the 100 millisecond background loop. A delay between this spark retard and the execution of the throttle valve module should be avoided so that these events occur at the same time whereby the TV pressure may be allowed to drop before a rise of inertia torque, which might be felt by the vehicle operator.

When an upshift is commanded, the torque transmitted is transferred from one friction element to another. During the torque transfer, the driven torque will be increased during the so-called inertia phase following a decrease of driven torque during the preceding torque phase of the shift. Provision is made for retarding the spark at the beginning of the inertia phase, and the throttle valve pressure module routine will be executed before any other module is addressed in the background loop. The normal sequencing thus is interrupted in order to permit the TV pressure reduction to occur immediately.

In the case of the shift control modules, the four main modules are the PRNDL Based Desired Gear Determination module, the PRNDL Based Commanded Gear Determination module, the Load Shift in Progress Timer module, and the Determine Shift Solenoid States module.

The PRNDL Based Desired Gear Determination module is divided into three sub-modules called the GR_DS_PRNDL=3 or 4 module, GR_SEQ_PNTR calculation sub-module, and the Delay Verify Shift sub-module.

The second main module, namely, the PRNDL Based Command Gear Determination module, has four sub-modules which are identified as the GR_CM,PRNDL=1 Logic sub-module, the GR_CM,PRNDL=2 Logic sub-module, GR_CM,PRNDL=3 or 4 Upshift Logic sub-module, and the GR_CM,PRNDL=3 or 4 Downshift Logic sub-module.

The PRNDL Based Desired Gear Determination module determines the gear that the transmission should assume to satisfy a given set of steady state operating conditions. For example, it will choose the appropriate gear or the desired gear for certain throttle openings and vehicle speeds and for a given road load, but it will change if any of the prevailing conditions should change. If the selector and lever PRNDL position is manual 1, the desired gear is set to 1.

If the manual lever PRNDL is in neutral, the desired gear is set to 1.

If the manual lever is placed in the overdrive position or the drive position, then sub-module GR_DS_PRNDL=3 or 4, the GR_SEQ_PNTR calculation sub-module, and the Delay Verify Shift sub-module are executed. If a vehicle shift is taking place at this time, the sequence will be interrupted.

The sub-module GR_DS_PRNDL=3 or 4 has a sub-routine that selects the desired gear using stored information based upon vehicle speed and throttle position. The desired gear is set to the next higher gear if the engine speed is greater than the sea level wide-open throttle engine upshift speed for the current gear.

The next module is the Delay Verify Shift Module. If a change occurs in the desired gear, this module will delay a change to that gear until a new desired gear has been present a sufficient length of time to verify that a shift is appropriate. For example, if the shift is the result of a transient condition that begins and ends during a time less than the time required for a delay timer to expire, a change in desired gear will not occur. Further, the delay will permit the new desired gear to be delayed by a time that is determined by a sub-module called "Load TM_VER_SFT for Upshifts", which determines the delay time required to verify that an upshift should be made. If a fast "backout" rate is detected during this routine, for example, the time required to verify a tip-out upshift is used. Otherwise, the time required to verify a normal upshift is used.

Next, the processor addresses the module called GR_SEQ_PNTR which carries out a gear sequence calculation. This module determines how multi-step shifts will be sequenced based upon a series of calibration parameters. Each step of every multi-step shift has a calibration parameter that is unique to it. For example, if the current gear is 1 and the desired gear is 4, a 1-4 upshift is called for. There are three calibration parameters; namely, GR_SEQ_141, GR_SEQ_142, and GR_SEQ_143 to determine which gear to command during each step of the shift. This will result in a 1-2-3-4 shift, a 1-2-4 shift, a 1-3-4 shift, or a 1-4 shift.

The next main routine is carried out by the PRNDL Based Commanded Gear Determination module which determines which gear should be commanded. If the range selector (PRNDL) is in the manual low position, the GR_CM_PRNDL=1 logic is executed. If the PRNDL is in 3 or 4 and an upshift is desired, the GR_CM_PRNDL=3 or 4 upshift control logic is executed. If the manual lever PRNDL is in 3 or 4 and a downshift is desired, GR_CM_PRNDL=3 or 4 downshift logic is performed. If PRNDL is in neutral and vehicle speed is high, the commanded gear is set to 3, as explained previously. Otherwise, the PRNDL, when in neutral, commands the gear to be set at 1.

The GR_CM_PRNDL=1 module (Gear Command) determines the commanded gear when the range selector (PRNDL) is in manual low. Downshifts are scheduled based upon vehicle speed, and no upshifts are allowed. When the manual valve is moved to manual-low from fourth gear or third gear, the transmission immediately shifts to second gear with engine braking. The transmission remains in second gear until a timer runs down and vehicle speed falls below some calibrated speed. The transmission then shifts to first with no permitted while the manual valve remains in manual-low.

The next sub-module that is executed in this routine is the GR_CM_PRNDL=3 or 4 upshift module (Gear Command). This sub-module determines the commanded gear when the range selector (PRNDL) is in 3 or 4 and an upshift is desired. If a single step upshift is desired, the commanded gear is set to the desired gear. If a multi-step upshift is desired, the commanded gear is set to the first step of the multiple ratio shift, as determined by the calculation of the GR_SEQ_PNTR calculation sequence. Again, shifts from one step to another are delayed by the sequence time determined by the upshift delay logic.

The upshift delay logic is a routine executed by the sub-module that determines the time that should be spent in each gear before the next step of a multiple step upshift can be executed. If an upshift from the second gear to the third gear is desired, the sequence time for that shift must expire before the upshift can be completed. If the current gear is 3, the sequence timer is set to a new value before the execution of the 3-4 shift can be completed.

Following completion of the logic steps for an upshift, the GR_CM_PRNDL=3 or 4 Downshift (Gear Command) module will address the downshift delay logic and will execute it if it is called for. This module determines the time that must be spent in each gear before the next step of a multi-step downshift can be executed. In this respect, its function is similar to the upshift delay logic function described previously. If the current gear is 3, the sequence timer is set to the sequence time before the execution of the 3-2 shift. If the current gear is 2, the sequence timer is set to the sequence time before the execution of the 2-1 shift.

Each time a new gear is commanded, the Load Shift In Progress Timer module loads a unique time into the shift in progress timer. Calibration constants are provided for power-on upshifts, power-off upshifts, power-on downshifts, power-off manual downshifts, and power-off automatic downshifts. This timer must count down to zero before the PRNDL Based Desired Gear Determination module will begin its execution for a new desired gear while the range selector (PRNDL) is in 3 or 4.

Shift Logic

A description of the shift logic for normal upshifts now will be made. That will be followed by a general description of the shift logic for normal downshifts. These are examples of how the control logic will react to various changes in the operating conditions that are encountered during a typical driving maneuver with the driver-controlled manual range selector valve (PRNDL) in 3 or 4.

A check is made by the processor for an appropriate vehicle speed controlled upshift. All schedules for upshifts into the higher ratios are checked and the desired gear is set to the highest gear that is allowed by the shift schedules. If the vehicle speed is higher than the upshift function for throttle position corrected for altitude and other variables, then an upshift is commanded.

The new desired gear is not allowed to pass through to the commanded gear module until the upshift verify timer has run down. This delay is achieved by the previously mentioned logic called "Delay/Verify Shift Logic". When the new desired gear is passed through to the PRNDL Based Commanded Gear Determination module, the GR_CM_PRNDL 32 3 or 4 logic is executed. In that case, if this is the first execution of the logic, the commanded gear is set to the desired gear. If this is a single step shift, that logic then is finished. If it is a multiple-step shift, a new sequence timer is loaded to effect a shift delay time for that part of the multiple-step shift. Similar delay times are introduced for each other step of the multiple-step shift. When all of the delays are completed, the commanded gear is set to the gear for the final step of the shift.

If the desired gear is one greater than the current gear, a single-step shift is desired. If it is more than one greater than the current gear, a multiple-step shift is desired. The previously mentioned calculation called "GR_SEQ_PNTR Calculation" will determine the first step of the shift. If the shift is a tip-out shift, which results from a quick relaxation of the engine throttle, the new desired gear value is not allowed to pass through to the commanded gear module until the tip-out upshift verification time has passed. Thus, a timer will prevent continuation of the logic until the tip-out upshift verification time has elapsed.

If the upshift desired is not a tip-out upshift, the new desired gear is not passed to the commanded gear module until the upshift verification timer for that upshift has expired. When that occurs and the shift delay is over, the commanded gear is set to the gear for the second step of a multiple-step shift. If still another step is required to complete the shift sequence, the shift sequence timer for the next step is loaded and a second delay, independent of the first, delays the next step. When that shift sequence time is expired, the commanded gear is set to the gear for the final step of the multiple-step shift.

During normal downshifts, if there is no shift in progress, a check is made to see if there is a new desired gear. The processor checks all schedules for downshifts into lower gears and sets the desired gear to the lowest gear allowed by the shift schedules. As in the case of upshifts, if the desired gear is one less than the current gear, the commanded gear is set to that desired gear. If the desired gear is more than one less than the current gear, the GR_SEQ_PNTR calculation determines the first step of the shift. Each step of the shift has an independent calibration constant.

The Control Valve Circuit

Figure 4A:
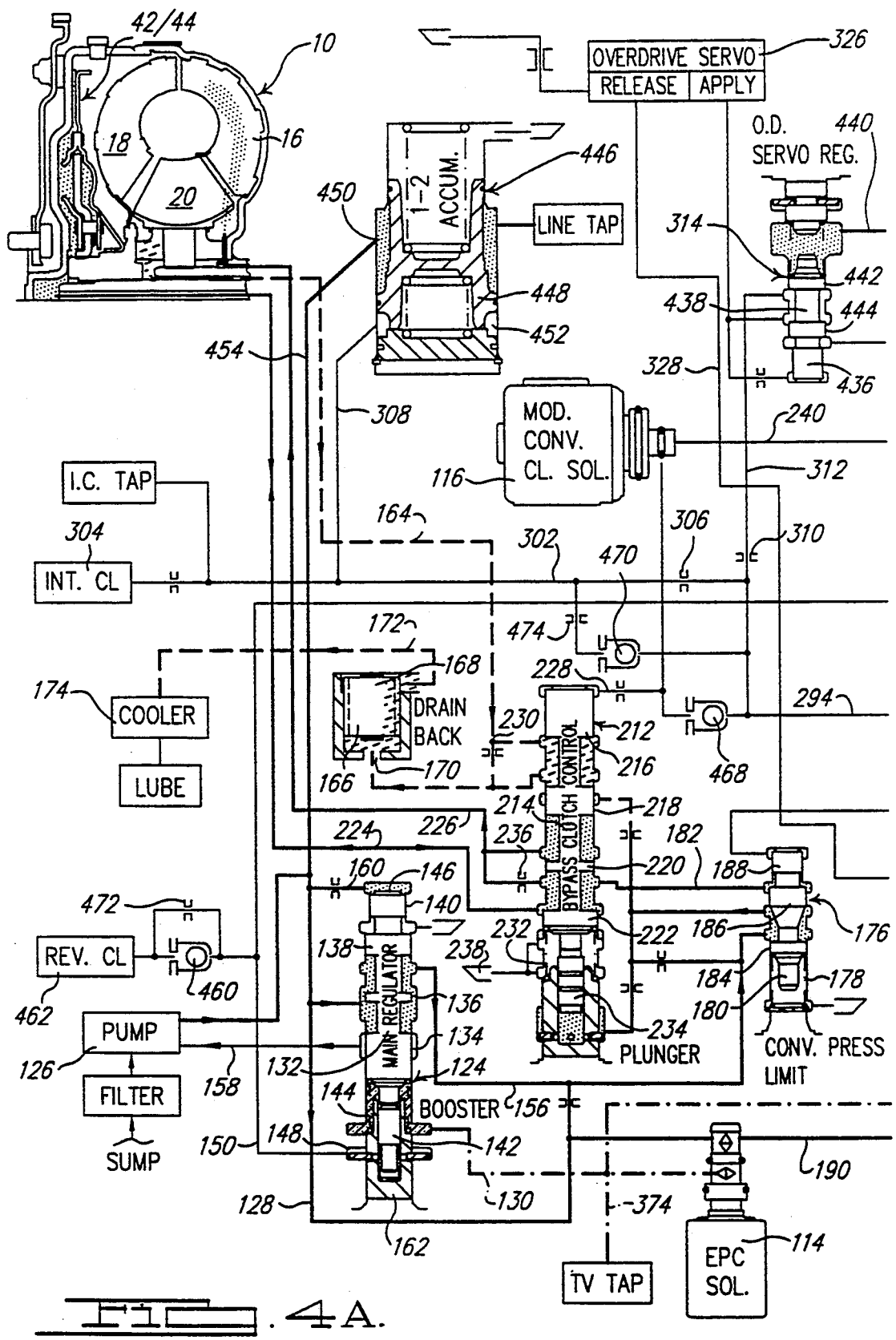
FIGS. 4A and 4B show a schematic valve diagram for the control valve system shown in FIG. 4 when the transmission is in neutral or park with the throttle closed and the converter open.
Figure 4B:
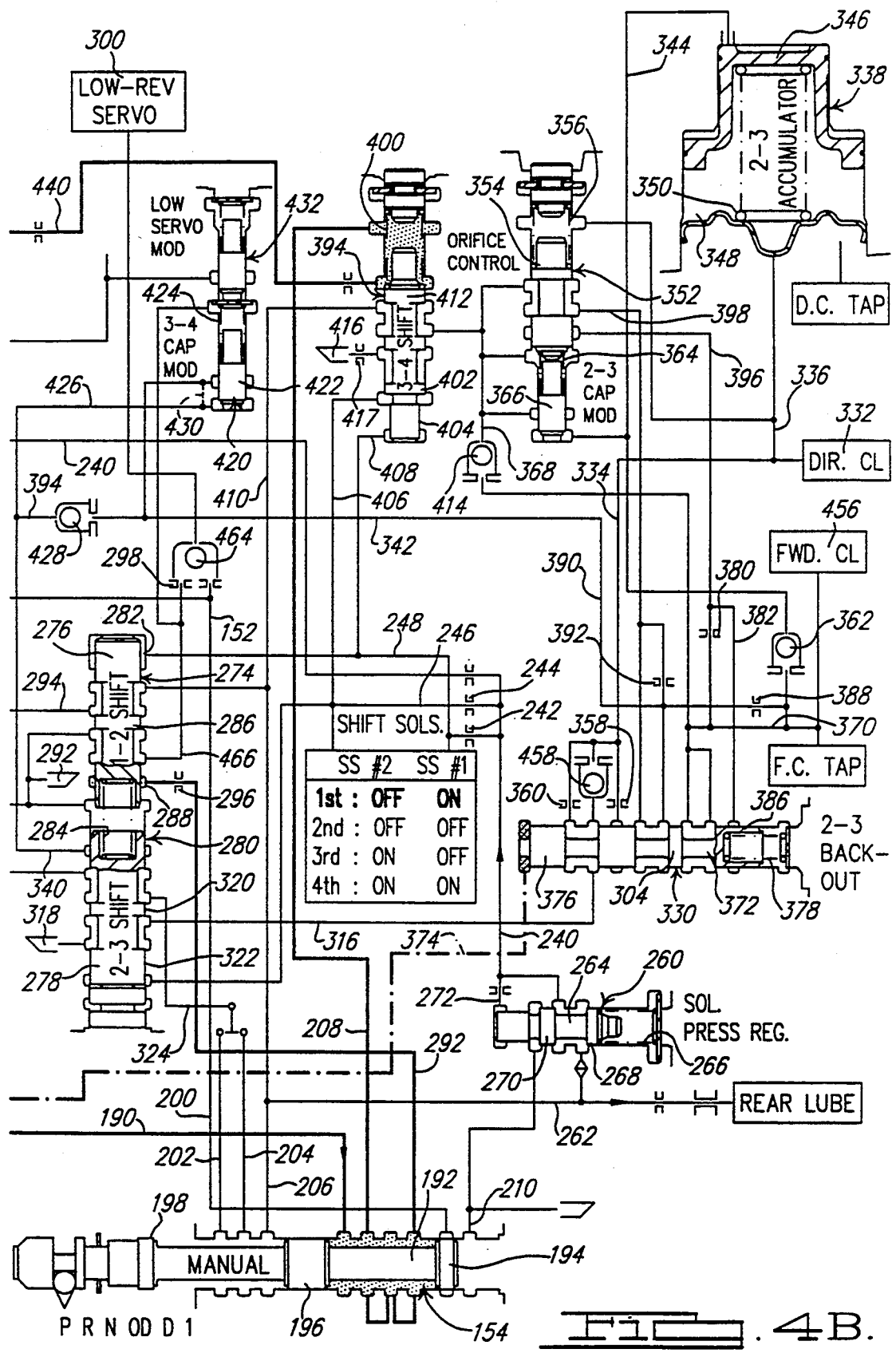

Shown in FIGS. 4A and 4B is a valve circuit illustrated in schematic form. These views are enlargements of FIG. 4. The valve elements in the valve circuit of FIG. 4 are in the positions they assume when the transmission is in park, the engine throttle is closed and the converter clutch is off.

The circuit of FIG. 4, 4A and 4B includes a main regulator valve and booster shown at 124. This valve regulates line pressure from engine-driven pump 126. This pump was described generally in FIG. 1. It includes Gerotor pump elements 38 as mentioned previously.

The main regulator valve 124 determines the line pressure in line pressure passage 128. It responds to an electronic pressure control output delivered to the main regulator 124 through line 130. This pressure is developed by the electronic pressure control solenoid valve 114 as will be described subsequently.

As seen in FIG. 4A, main regulator valve 124 comprises a valve spool 132 having spaced lands 134, 136, 138 and 140. These lands register with internal lands when in the main regulator valve bore as shown. A booster valve spool 142 is situated in a sleeve in the main regulator valve bore. The booster valve sleeve provides a seat for main regulator valve spring 144, which tends to urge the main regulator valve spool 132 in an upward direction against the opposing force of line pressure acting on the upper end of land 140 as shown at 146.

The lower end of land 134 is subjected to the pressure in the electronic pressure control line 130, thus producing a force that assists the spring 144.

Booster valve spool 142 has a land 148 that is subjected to pressure delivered to the booster valve spool through reverse line pressure line 150, which in turn communicates with reverse line pressure passage 152. Passage 152 extends to the manual valve generally indicated at 154 in FIG. 4B. The manual valve will establish pressure distribution to line 152 when the manual valve resumes the reverse drive position R.

The main regulator valve distributes pressure to the converter and lubrication circuits through passage 156 as seen in FIG. 4A. Valve land 136 establishes controlled communication between line pressure passage 128 and passage 156 in response to the pressure and spring forces acting on the regulator valve spool. The magnitude of the pressure in passage 128 is determined by the regulating action of land 134 which establishes controlled communication between passage 128 and return passage 158 leading to the intake side of the pump 126.

The main regulator valve 124 regulates line pressure by exhausting a proper amount of oil from the pump outlet line 128. When the valve spool 132 is in its uppermost position, the pressure will rise until it is limited by either leakage or available power input to the pump. At the other extreme position of the regulator valve spool, the valve is fully opened and all pump flow is exhausted. The valve spool 132 will automatically position itself between these two extremes, thus creating a variable restriction by exhausting the proper amount of oil into line 158 to maintain the desired pressure. A pressure increase occurs as the valve moves upwardly in response to a pressure signal from the electronic pressure control solenoid.

The regulator valve regulates the position of the valve spool by balancing electronic pressure control output pressure in line 130 and the force of the spring against the line pressure force acting at the upper end of the valve on land end 146. If the line pressure is less than the desired amount or if the electronic pressure control pressure in line 130 increases, the force balance is upset and the pressure signal from the electronic pressure control solenoid and the spring force will move the valve upwardly, thus reducing the exhaust flow and increasing the line pressure. The converse action will occur if the line pressure is too high or if the electronic pressure control signal in line 130 is decreased.

The regulator valve will respond continuously to changes in pump flow to cause a readjustment of the position of the valve to maintain a preset balance. A decrease in pump flow, or an increased demand for pump flow, during clutch application for example, will cause the valve to close slightly and exhaust less oil in order to maintain the desired pressure.

When the engine is started, the main regulator valve opens to a point where the flow is delivered first to the converter circuit through line 156. This flow goes through the converter limit and bypass control valves into the converter and lubrication circuits. These circuits are charged quickly and the regulator valve opens further until the flow is exhausted into the passage 158 which recirculates the oil back to the pump intake. If there is not sufficient pump flow to satisfy the flow demands for both line pressure and converter pressure, the main regulator valve will prioritize the pump flow to maintain the scheduled line pressure.

The line pressure acting on land end 146 is routed through orifice 160, which dampens rapid valve movements which would cause pressure oscillations.

The main regulator valve spring 144 prevents line pressure from being too low at low output pressures of the electronic pressure control solenoid. If the electronic pressure control signal in line 130 is above a predetermined valve, such as 19 psi, the booster valve is shifted downwardly into a sleeve 162 so that it does not contact the main regulator valve spool 132. When the output of the electronic pressure control solenoid is less than 19 psi, for example, the booster valve will contact the main regulator valve spool.

During reverse drive, passage 150 is pressurized as mentioned earlier. The force of that pressure is added to the force of the booster valve spring.

Oil from the torque converter passes through line 164 to drainback valve 166, which comprises a movable single-diameter valve element 168. This valve element is urged downwardly under its own weight in a valve chamber to control the effective flow through drain back orifice 170. The output flow from the drainback valve passes through line 172 to the transmission oil cooler 174. When the engine is turned off, the weight of the valve seats to block the oil from draining out of the converter through line 164.

The converter pressure limit valve shown at 176 limits the pressure of the converter circuit by controlling the amount of oil delivered to the converter through line 156 by the main regulator valve. At lower pressures, the valve is held in an uppermost position by valve spring 178 acting on converter pressure regulator valve element 180. Converter charge pressure then flows freely to converter feed line 182 through the space between adjacent lands 184 and 186. If the converter charge pressure in line 182 rises above a predetermined value, the valve spool 180 will be forced outwardly by reason of the pressure acting between lands 186 and 188. The magnitude of the pressure in passage 182 then will be regulated at a value determined by the spring force.

The manual valve 154, seen in FIG. 4B, receives line pressure through passage 190, which communicates with line pressure passage 128 described previously. The manual valve 154 includes a driver-controlled valve spool 192 having spaced lands 194, 196 and 198. The valve spool has several positions that may be selected by the operator. These positions are determined by detents and are identified in FIGS. 4 and 4B by the symbols P, R, N, OD, D and 1, which respectively identify the Park position, the Reverse position, the Neutral position, the Overdrive drive range position, the three-speed ratio D range position, and the manual low range position. The valve is actuated by a driver-operated manual shift valve linkage. When the valve spool 192 is positioned as shown in FIG. 4B, the valve circuit is conditioned for park.

Line pressure from passage 190 is transferred through the space between lands 196 and 198 to the reverse drive circuit through passage 200, to the overdrive circuit through passage 202, passage 204 and passage 206, to the three-speed ratio drive range circuit through passage 204 and 206 and to the manual low drive range circuit through passage 206.

Passage 208 is pressurized by the manual valve when it assumes the park position, the D position, the reverse position or the "1" position.

Line 210 is an exhaust passage located between the lands 196 and 194.

The bypass clutch control valve, which is generally indicated at 212, comprises a movable valve spool 214 with equal diameter spaced valve lands 216, 218 and 220. A larger diameter valve land 222 provides a differential area on which bypass clutch pressure in passage 224 acts.

The bypass clutch control valve controls the operation of the converter bypass clutch. When the clutch is not engaged, pressure from passage 182, described previously, is distributed through the bypass clutch control valve to the converter supply line 226 and to the bypass clutch supply line 224. The modulated converter clutch control solenoid is off at that time, as will be explained subsequently.

When the bypass clutch control valve spool 214 is in an upward position, the clutch piston plate, shown at 42 and 44 in FIG. 1, is held out of engagement with respect to the adjacent friction surface of the impeller housing 26. All of the torque delivered to the gearing from the engine then is delivered hydrokinetically.

The converter clutch is engaged, upon actuation of the modulated converter clutch control solenoid, as the bypass clutch control valve element 214 moves downwardly under the influence of modulated converter clutch solenoid pressure in passage 228, which acts on the upper end of the land 216. The valve spool 214 then regulates the pressure in passage 224, which extends to the bypass clutch, the magnitude of the pressure in passage 224 being determined by the magnitude of the modulated converter clutch solenoid pressure in passage 228 and by the pressure in passage 182.

The microprocessor monitors continuously the torque converter slip and continuously adjusts the magnitude of the modulated converter clutch solenoid duty cycle to achieve the desired output pressure in passage 228 so that the slip is controlled to a predetermined value as will be explained subsequently.

Line 164 returns oil from the torque converter to the cooler through the drain back valve as explained previously. When the bypass clutch is not engaged, oil flows freely through the bypass valve from the line 164 to the cooler circuit. When the valve is engaged, the oil flow is restricted by orifice 230.

When the modulated converter clutch solenoid is deenergized, its output pressure in line 228 is zero and the bypass clutch control valve is moved upwardly by valve spring 232 and by pressure from passage 182 acting on the end of valve plunger 234 located at the lower end of the bypass clutch control valve and directly engaging the bypass clutch control element. The pressure in passage 182, as explained previously, is limited by the converter pressure limit valve.

When the modulated converter clutch solenoid is off, oil flows freely from passage 182 to passage 224 and through flow restricting orifice 236 to the converter impeller circuit line 226. This is done to restrict the flow in passage 226 so that the converter clutch will not drift on when clutch application is not desired.

The converter turbine circuit, which includes lines 164, carries oil from the converter to the cooler and the lubrication circuit as explained previously. During open converter operation, the flow passes unrestricted through the bypass clutch control valve and the drain-back valve.

When the modulated converter clutch solenoid is actuated, a modulated pressure is developed in passage 228. A pressure in excess of 6 psi in a preferred embodiment is required to overcome the force of the valve spring 232. When the bypass clutch control valve is in its modulating position, flow from line 182 to the bypass clutch supply passage 224 is bypassed and fluid flow is unrestricted into the converter impeller circuit through line 226 to maintain full pressure on the rear of the converter clutch piston shown at 42 and 44.

Converter bypass pressure acts on the opposite side of the piston, as shown at 42 and 44, and is regulated by the bypass clutch control valve as a function of the pressure in the passage 228 and by the force of the spring 232 and the force of pressure from passages 182 acting on valve plunger 234.

The microprocessor, during modulation of the pressure in passage 224, calculates turbine speed from the output shaft speed and the gear ratio and compares that value with the engine speed to determine converter slip. The pressure in passage 228 is continuously adjusted to maintain the desired slip. To reduce the slip, the microprocessor commands a higher value of pressure in passage 228 which reduces the pressure in passage 224, thus increasing the clutch torque capacity. To eliminate slip, the microprocessor can command a maximum pressure in passage 228. The solenoid acts with a 100% duty cycle at that time, thus moving the bypass clutch control valve downwardly to maintain the pressure in passage 224 at a zero value since it is brought into communication with exhaust port 238.

The shift solenoids SS1 and SS2 are illustrated in FIG. 4B in block diagram form. They are identical in form, as will be explained subsequently with reference to FIGS. 27 and 27A.

Solenoid SS1 is fed with pressure from solenoid supply passage 240 through a flow control orifice 242. Solenoid SS2 is supplied with solenoid supply pressure from passage 240 through orifice 244. The solenoid supply line for the solenoid SS2 on the downstream side of the orifice 244 is shown at 246. The corresponding supply line for solenoid SS1 is shown at 248. When the shift solenoid is deenergized, the flow through the orifice is exhausted and the output pressure for solenoid S1 or S2 is zero. When the solenoid is energized, however, the solenoid blocks the flow and the solenoid output pressure rises until it equals supply pressure.

Referring next to FIGS. 27 and 27A, solenoid SS1, which is identified in FIG. 3A by numeral 120, includes electrical windings 250 and an armature 252. (Since solenoid SS2 is similar to solenoid SS1, FIGS. 27 and 27A may be considered to apply also to solenoid SS2.) The armature engages ball valve element 254, which acts on and registers with an orifice formed in valve seat 256. Solenoid spring 258 urges normally the armature 252 in an upward direction. When the solenoid is off, valve 254 moves off its seat thereby exhausting pressure from supply line 248 to an exhaust port 260.

When the solenoid 120 is energized, the armature 252 moves to the position shown in FIG. 27A, thereby seating ball valve element 254 against its valve seat and interrupting communication between passage 248 and exhaust port 260. This causes a shift signal that will be utilized by the shift valve elements to be described subsequently.

The pressure supplied to the shift solenoids through passage 240 is obtained from solenoid pressure regulator valve 260 shown in FIG. 3B. Pressure is distributed to the valve 260 through supply line 262 which is pressurized by the manual valve when the manual valve is in the overdrive position, the D position, or the 1 position.

The valve 260 includes a regulator valve element 264, which is urged in a left-hand direction by valve spring 266. Valve element 264 has pressure regulating valve lands 268 and 270 which control communication between passage 262 and passage 240. A feedback branch passage 272 acts on the left-hand end of the solenoid pressure regulator valve spool 264. Thus, the pressure in passage 240 is functionally related to the spring force of valve spring 266. The pressure in passage 240 is a constant value in all forward drive ranges. Passage 240 also supplies a modulated converter clutch solenoid 116 with supply pressure as will be explained subsequently.

The 1-2 shift valve is identified in FIG. 4B by reference numeral 274. It includes a shiftable valve element 276 which is located in direct alignment with valve element 278 for the 2-3 shift valve generally indicated at 280. The 1-2 shift valve controls ratio changes between first and second gears. When the first solenoid SS1 is energized, solenoid pressure is developed in line 248, as explained previously. This pressure is distributed to the upper end of land 282 thereby shifting the valve spool 276 downwardly against the opposing force of valve spring 284. That spring is effective also on valve land 278 for the 2-3 shift valve 280.

The 1-2 shift valve includes also lands 286 and 288.

Passage 206 which is pressurized during operation in the overdrive range, the D range and the manual low range is blocked by land 282 during first ratio operation. All of the output circuits are exhausted through exhaust port 290. Thus, line 294 which extends to the intermediate clutch and the overdrive servo supply, is exhausted.

Passage 292 which is pressurized by the manual valve in the park, manual-low range and reverse drive positions of the manual valve distributes pressure through orifice 296, through the space between lands 286 and 288 and through check valve 298 to the low and reverse servo 300. When the 1–2 shift is initiated by the processor, shift solenoid SS1 is deactivated and the 1–2 shift valve is moved by the valve spring upwardly. Pressure from passage 206 then is delivered directly to the line 294 which distributes pressure through passage 302 to the intermediate clutch 304. Communication between passage 294 and passage 302 is established by orifice 306. Pressure is delivered also to the 1–2 accumulator through passage 308. Pressure also is delivered at that time from passage 294 through flow control orifice 310 to passage 312 leading to the overdrive servo regulator valve generally identified by reference numeral 314.

The 2–3 shift valve 280 controls shifting between the second ratio and the third ratio. During operation in the second ratio, shift solenoid SS1 and shift solenoid SS2 are off and the spring holds the 2–3 shift valve element 278 in a downward position. It also holds the 1–2 shift valve element 276 in an upward position. Direct clutch feed line 316 during second ratio operation is exhausted through exhaust port 318, the latter communicating with line 316 through the space between lands 320 and 322 on the 2–3 shift valve spool 278. When the manual valve is in the overdrive range or the D range, oil from the manual valve flows through the 2–3 shift valve from passage 324 to the release side of the overdrive servo 326. Communication between the 2–3 shift valve and the release side of the overdrive servo is obtained from overdrive release feed passage 328. This assures that the overdrive servo will remain off even when the apply side of the overdrive servo is pressurized. In manual-low (1) drive range, the overdrive servo release pressure is exhausted through the manual valve and through passage 204, passage 324 and passage 328 so that when the overdrive servo apply chamber is pressurized, the overdrive servo will be activated.

A ratio change to the third gear is obtained when the processor turns on shift solenoid 2 while shift solenoid 1 remains off. Shift solenoid pressure then is distributed to the lower end of land 320 of the 2–3 shift valve and moves the 2–3 shift valve upward. Pressurized oil from the manual valve passes through passage 324 to passage 316, which leads to the 2–3 backout valve generally identified by reference numeral 330. That pressurized fluid then passes directly through the 2–3 backout valve to the direct clutch 332 through passage 334. Pressurized fluid in the direct clutch 332 is transferred to the 2–3 accumulator through passage 336. The 2–3 accumulator is identified generally by reference numeral 338. The pressure then is distributed to the overdrive servo release chamber through passage 328 and to the overdrive release circuit from passage 340 instead of being connected to the passage 324 leading to the manual valve. This is done to prepare for a 3–4 upshift.

A 2–3 capacity modulator valve is identified generally by reference numeral 342. This valve, during a 2–3 upshift, regulates the pressure in passage 344 extending to the upper side of the piston 346 of the 2–3 accumulator 338. This then controls the direct clutch pressure on the bottom side of the accumulator piston 346. The pressure in passage 344 opposes the force of accumulator valve spring 350.

The 2–3 capacity modulator valve 342 is situated in a common valve bore and acts in cooperation with the orifice control valve 352, which comprises a valve spool 354 that is urged downwardly by valve spring 356 and the direct clutch pressure in passage 336 during a 2–3 upshift.

The direct clutch pressure in the chamber 348 is determined by the regulated pressure at the top of the 2–3 accumulator piston 346. During a 2–3 upshift, pressurized fluid from the 2–3 shift valve flows through orifice 358 or orifice 360, depending upon the position of the 2–3 backout valve to the direct clutch 332. This strokes the 2–3 accumulator piston 346 in an upward direction. Prior to the 2–3 shift, the accumulator piston assumes the downward position under the influence of the forward clutch pressure on top of the piston in the first and second ratio. As the 2–3 accumulator piston 346 strokes, the force balance on the piston control affects clutch pressure. Direct clutch pressure added to the 2–3 accumulator spring force moves the accumulator piston 346 upward, thereby forcing oil out of the accumulator through line 344. This causes ball check valve 362 to close. This forces oil to flow through the 2–3 capacity modulator valve, which regulates the accumulator back pressure to a higher value than the line pressure.

The 2–3 capacity modulator valve has a valve spring 364 which urges the 2–3 capacity modulator valve spool 366 downward thereby providing controlled communication between passage 344 and passage 368, which communicates with the 2–3 capacity modulator valve element 366 and with the forward clutch feed line 370.

The 2–3 backout valve 330 has a multiple land valve spool 372. The output pressure of the electronic pressure control solenoid valve 114 is distributed through line 374 to the left-hand end of valve land 376 of the backout valve 330. The force developed by the electronic pressure control solenoid pressure in passage 374 is opposed by backout valve spring 378.

During a 2–3 shift, the 2–3 backout valve feeds pressurized oil to the direct clutch 332 through either orifice 358 or orifice 360. Normally, orifice 358 is the feed orifice during part throttle operation and orifice 360 is the feed orifice during closed throttle operation. However, since the line pressure established by the EPC control solenoid 114, which is controlled by the processor 92, may be affected by factors in addition to throttle pressure, part throttle 2–3 shifts may use orifice 360 in some cases and orifice 358 in other cases.

The 2–3 backout valve, in combination with the orifice control valve 352, controls the apply rate of the forward clutch and the overdrive servo release. During a closed throttle forward engagement of the forward clutch, the forward clutch and the 2–3 accumulator are pressurized through the orifice 380. During power-on engagements, the orifice 380 is bypassed and the feed rate to the forward clutch is unrestricted. Thus, oil will be transferred through passage 382, bypassing the orifice 380, and through the space between backout valve lands 384 and 386 to the forward clutch.

During a 4–3 coasting downshift, the forward clutch is applied slowly as apply pressure passes through control orifice 388 located in the forward clutch feed line 370. Simultaneously, the flow to the overdrive servo release through passage 328, which is fed through the 2–3 shift valve from passages 390 and 340, is unrestricted and the release occurs quickly.

During a power-on 4–3 downshift when the backout valve element 372 is shifted in a right-hand direction, the flow to the forward clutch and to the overdrive servo release are combined and fed through a common orifice 392. The feed line 328 for the overdrive servo release communicates with passage 394. Passage 394 communicates with line 370, which is the feed line for the forward clutch.

It is the function of the orifice control valve 352 to control the application rate for the forward clutch passage 368 extending from the 3–4 shift valve 394 holds the orifice control valve spool in an upward position during first and second gear ratio operation. Further, the pressure in passage 368 is transferred through the orifice control valve 352 to passage 396, which is the feed passage for the forward clutch in first and second gear.

The left end of land 376 of the 2–3 back-out valve 230 is subjected to electronic pressure control solenoid pressure in passage 374. In FIG. 24A is shown a plot of the electronic pressure control solenoid pressure on a vertical axis and throttle position on a horizontal axis. For throttle settings between zero and an initial throttle position shown at 670, the throttle valve pressure is at a fixed value greater than zero, but less than the maximum shown at 672. This is shown by a horizontal line 674. For a value of throttle valve pressure equal to that indicated at 674, the 2–3 back-out valve will not be shifted to the right since the pressure force thus developed is insufficient to overcome the force of the valve spring 378. For various commands that are issued to effect change in ratio, a different pressure will be made available to the left hand of the land 376.

Figure 24:
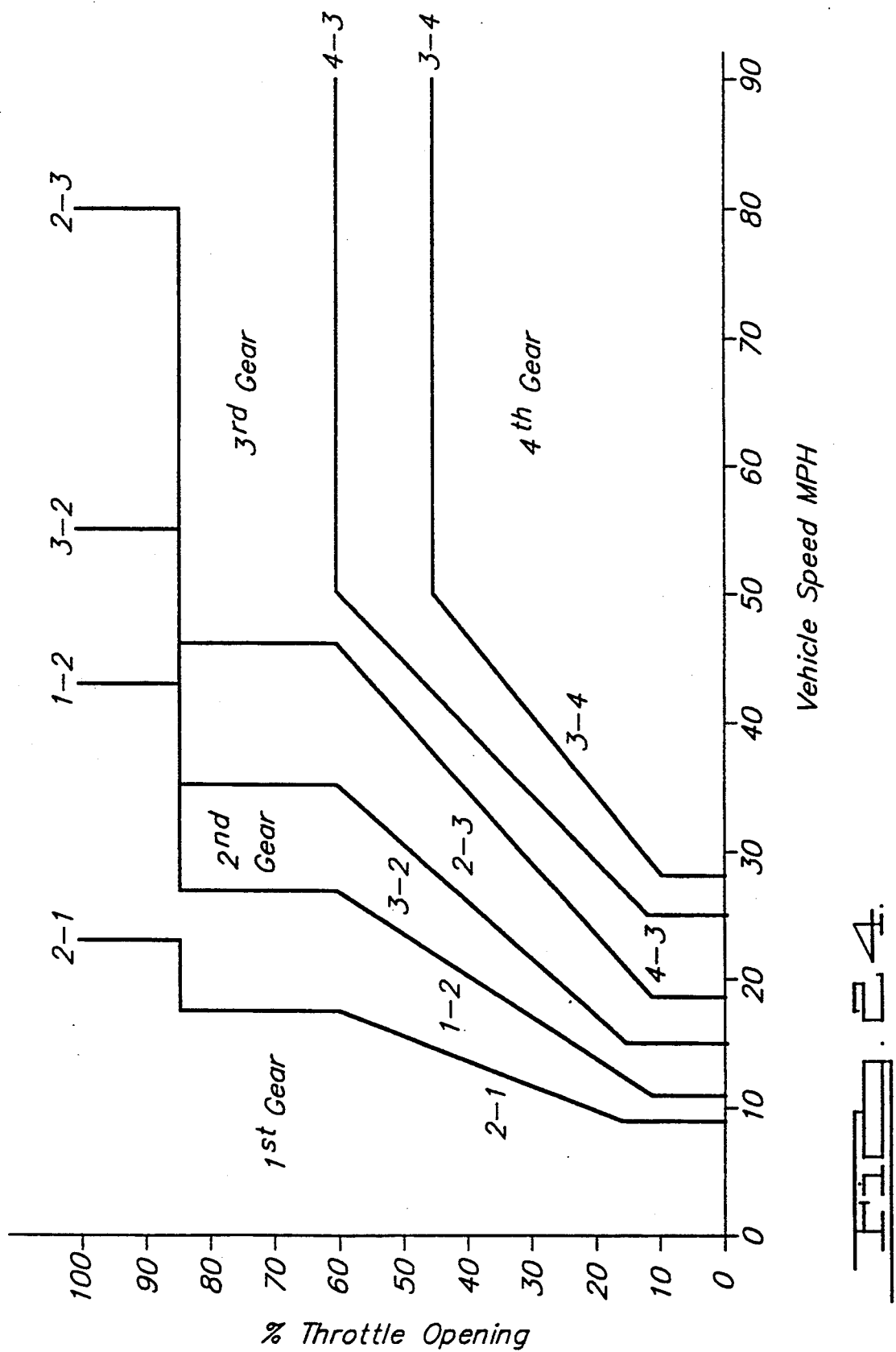
FIG. 24 is a chart showing the automatic transmission shift schedule, which is a plot of the throttle opening versus vehicle speed.
Figure 24A:
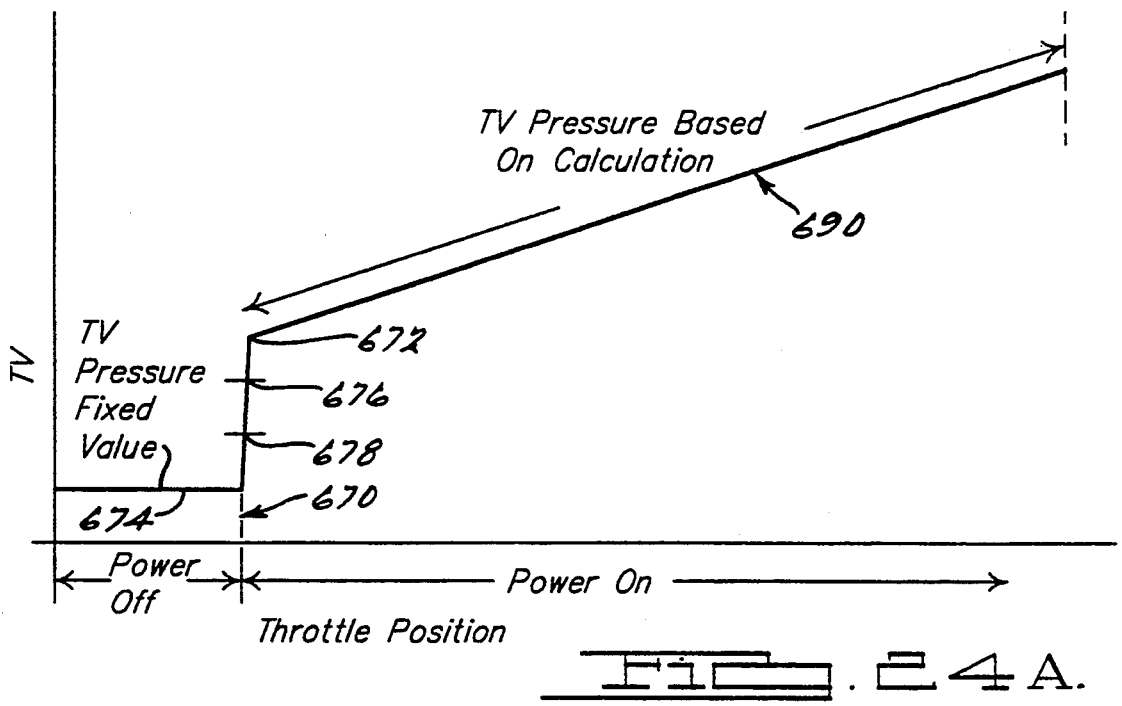
FIG. 24A is a chart showing the relationship between the throttle pressure made available to the 2–3 back-out valve throughout a range of throttle positions for both power-on and power-off modes.
Figure 24C:
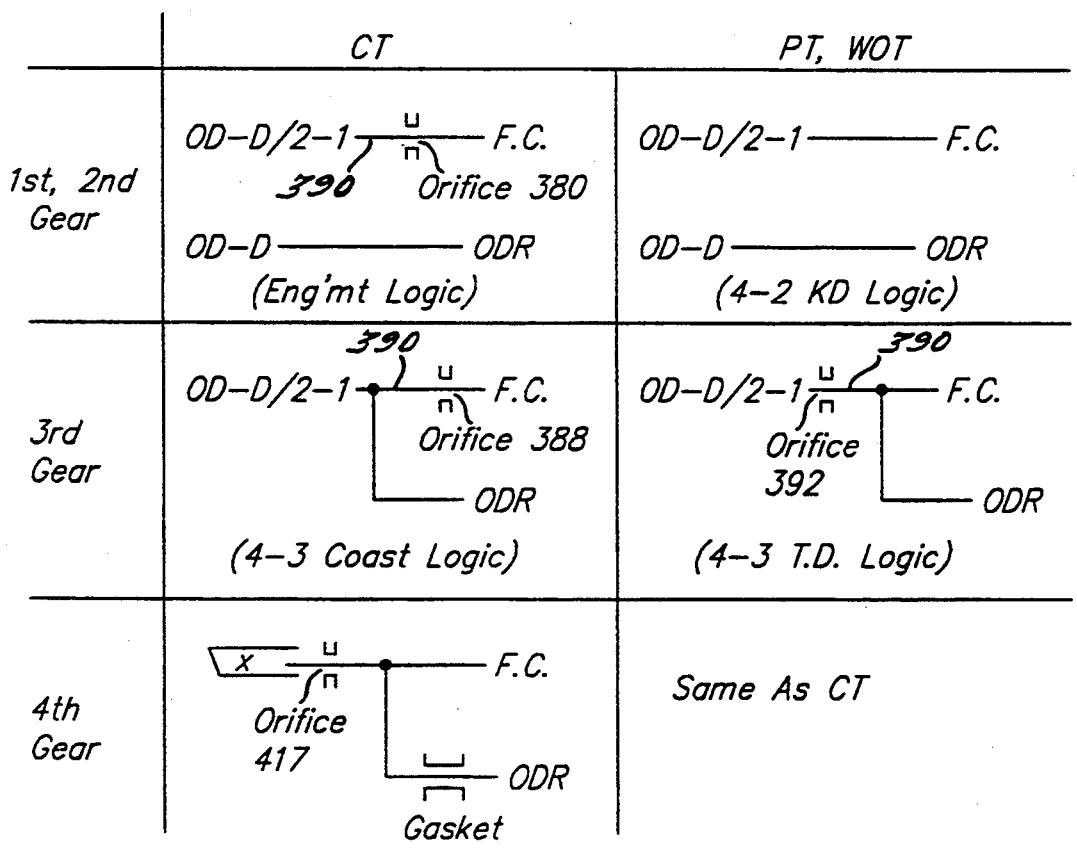
FIG. 24C is a chart showing the flow patterns through the various orifices that are established by the operation of the 2–3 back-out valve and the orifice control valve.
Figure 24B:
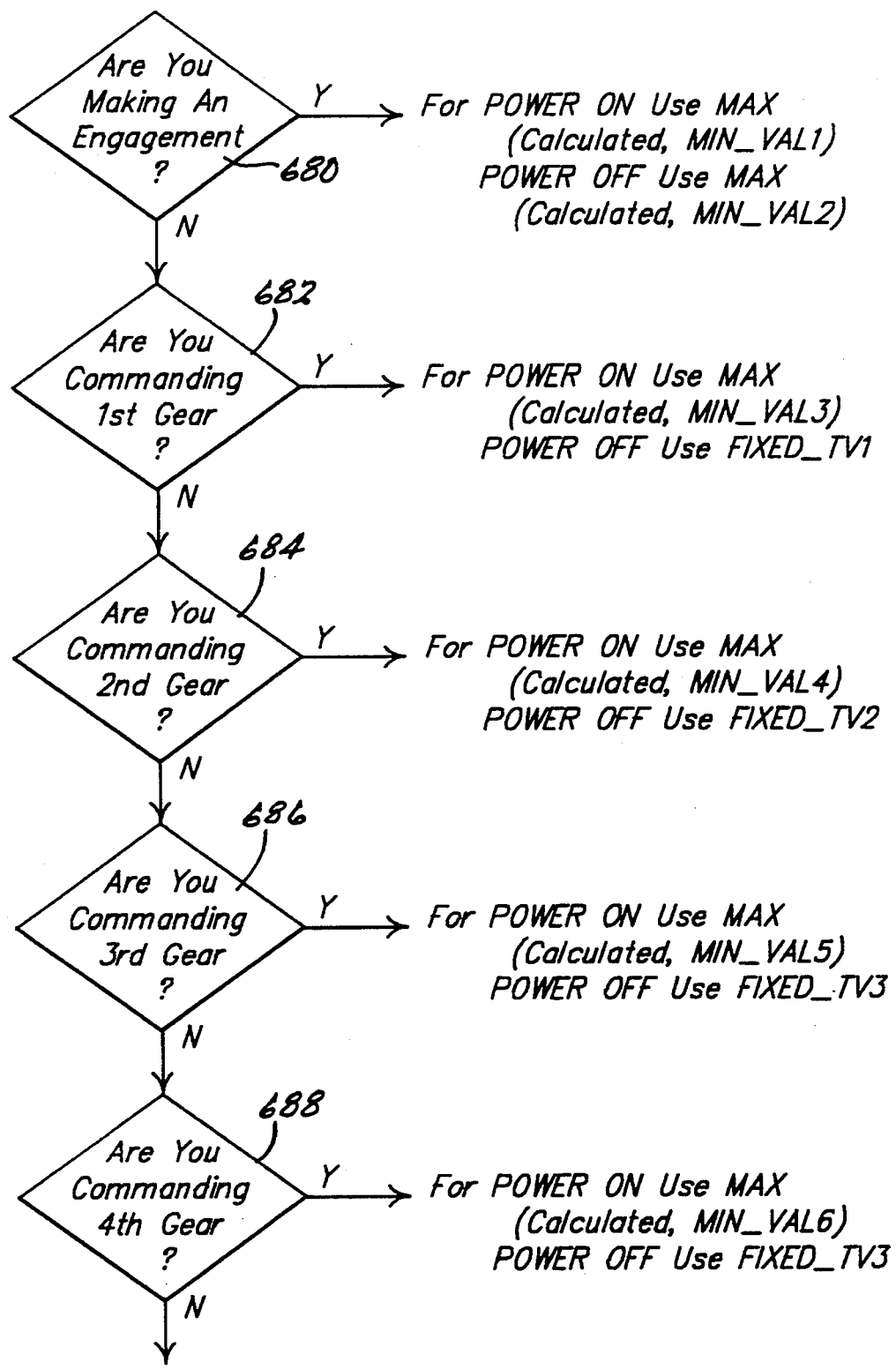
FIG. 24B is a flow chart showing the electronic strategy for triggering the operation of the 2–3 back-out valve and the orifice control valve during forward clutch engagements.

The strategy for accomplishing these back-out valve functions is shown in FIG. 24B. The processor will continuously monitor during each background loop the conditions for establishing the appropriate pressure level for the 2–3 back-out valve by inquiring first at step 680 in FIG. 24B whether the control system is making a change that requires engagement of the forward clutch. If the answer is yes and the shift in place is a power-on shift, a maximum value for the minimum TV pressure is determined at point 676 shown in FIG. 24A. Further, a minimum value 678 is determined if the engagement in place occurs during a power-off shift. If the inquiry at step 680 is negative, the routine will proceed to step 682 where an inquiry is made to determine whether a first gear is being commanded. If that is case and if the shift is a power-on shift, a different minimum value for point 682 is determined. If it is a power-off shift, a fixed TV value is used. If the inquiry at step 682 is negative, an inquiry then is made at step 684 to determine whether a second gear is being commanded. If that is the case, a still different minimum value or TV pressure is calculated for point 676 while a constant TV value is maintained for power-off shifts.

If the inquiry at step 684 is negative, the routine will proceed to make an inquiry at step 686 where it is determined whether third ratio is being commanded. If that is the case, a still different minimum value or TV pressure is calculated for a point 676. Again, the minimum value for a power-off shift is fixed.

If the fourth ratio is being commanded rather than first, second or third ratios, and the shift is a power-on shift, a still different minimum value is calculated for point 676 as shown at step 688. Again, if the shift at 688 is a power-off shift, the fixed value for TV is used.

If during the shift the TV pressure is greater than the value at 672, the greater value that is used is the TV pressure-base on the TV calculation that is used. This calculation results in the curve shown at 690 in FIG. 24A. If, on a power-on shift, the value does not exceed the value at 676, the 2–3 back-out valve will not move. If the shift is a power-off shift and the value does not exceed the value at 678, the 2–3 back-out valve will not move.

Shown in FIG. 24C is a diagram that summarizes the orifices that are in place as the 2–3 back-out valve functions. This 2–3 back-out valve logic will introduce orifice 380 in the fluid flow path leading to the forward clutch through passage 370 during the engagement logic for the forward clutch. On the other hand, as indicated in the logic diagram of FIG. 24C, the fluid flow path to the overdrive release servo is a free flow path with no control orifice.

The 4–2 kickdown logic, as indicated in the logic diagram of FIG. 24C, does not result in the introduction of a flow control orifice by the 2–3 back-out valve into the feed flow paths for the forward clutch and the overdrive release side of the overdrive servo.

During a coasting 4–3 downshift, the logic will result in introduction of orifice 388 into the flow path to the forward clutch through passage 390. The flow path to the overdrive release side of the overdrive servo, however, is free of a flow restricting orifice as indicated in the chart of FIG. 24C.

During a power-on 4–3 downshift, the 2–3 back-out logic diagram of FIG. 24C indicates that the forward clutch is fed through orifice 392 from passage 398. The fluid flow path to the release side of the overdrive servo is also on the downstream side of the orifice 392. It is apparent from FIG. 24C that on a coasting 4–3 downshift, the overdrive release will be pressurized to release the overdrive brake much sooner during a coasting downshift than in the case of a torque demand downshift, where the overdrive release side of the overdrive servo must be fed with oil through the orifice 392.

During fourth ratio engagement of the overdrive servo on a 3–4 shift, both the forward clutch and the overdrive release side of the overdrive servo must be exhausted. In the case of the forward clutch and the overdrive servo release, the exhaust will occur across orifice 417 located at the 3–4 shift valve. The overdrive servo release pressure, however, must be regulated by 3–4 capacity modulator valve 420 and bled through gasket bleed orifice 430 and a bleed orifice in the servo release cavity. Thus, the overdrive release has three flow paths, one path through the 3–4 capacity modulator valve, one path through the orifice 430 before merging with forward clutch fluid and passing through orifice 417 and one path directly to exhaust in the servo cavity.

During operation in the third and fourth ratios, the direct clutch pressure, plus the force of valve spring 356 for the orifice control valve 352, moves the valve element 354 downward and flow from the 3–4 shift valve is transferred through the valve 352 to passage 398, which is the source of pressure for the forward clutch and the overdrive servo release during third ratio and fourth ratio operation.

The 3–4 shift valve 394 controls shifting between the third ratio and the fourth ratio. During operation in the first, second and third ratios, the 3–4 shift valve is held in a downward position by valve spring 400. Pressure from the shift solenoid 2 is distributed to the differential area of lands 402 and 404 on the 3–4 shift valve through passage 406. Similarly, output pressure from shift solenoid 1 is distributed to the lower end of the land 404 through passage 408. Neither the pressure in passage 408 nor the pressure in passage 406 is sufficient by itself to move the 3–4 shift valve upwardly against the force of the spring 400. Line pressure from passage 410, which is the same as the pressure in passage 262, is transferred through the 394 shift valve to the orifice control valve since the two are hydraulically connected through passage 368. Passage 410 then becomes the source of pressure for the forward clutch. Further, it is a source of pressure during third ratio and fourth ratio operation for the overdrive servo release.

A ratio shift to the fourth ratio from the third ratio requires both shift solenoids SS1 and SS2 to be energized. The pressures acting on the lower end of the land 404 and on the differential area of lands 404 and 402 then is sufficient to move the spool valve element 412 for the 3–4 shift valve 394 in an upward direction. This conditions the transmission for fourth ratio operation. Forward clutch pressure and overdrive servo release pressure during power-on 3–4 shifts then are exhausted through check valve 414 and through exhaust port 416 in the 3–4 shift valve 394. For closed throttle 4–3 shifts, the servo release pressure does not flow through check valve 414. A control orifice 417 is located at the exhaust port 416. The overdrive servo piston then applies as pressure builds up in the servo apply side of the overdrive servo. The rate of pressure build up is controlled by orifice 310 in the passage 312.

The 3–4 capacity modulator valve 420 is a simple pressure regulator comprising a valve spool 422, which is urged downwardly by valve spring 424. It functions to regulate the release of pressure of the overdrive servo during 3–4 upshifts. The overdrive release pressure is distributed to the lower end of the valve element 422 through passage 426, which extends to the overdrive release passage 328 in third and fourth ratios. Passage 328 and passage 426 communicate with each other through passage 340 and the 2–3 shift valve.

As the overdrive servo applies during a 3–4 shift, the flow from the release side of the servo seats the ball check valve 428 so the release oil is forced to flow through the 3–4 capacity modulator valve through passage 426.

A small bleed passage is used to bypass the 3–4 capacity modulator valve as shown at 430 to keep the overdrive servo release pressure during steady-state operation at zero so as not to compromise the overdrive band static capacity. A second bleed exists in the servo release cavity for the same reason.

The low servo modulator valve generally identified by reference numeral 432 regulates the pressure distributed to the low-and-reverse brake band servo 300 during first gear manual operation. The manual low range fluid flow from the 1–2 shift valve and through the orifice 296 described previously is regulated during first gear operation in the manual low range by the valve 432. Valve 432 is a simple regulator that modifies the rate of application of the pressure to the servo 300.

The overdrive servo regulator valve 314 functions to regulate at a constant apply pressure for the overdrive servo 326 in third gear and second gear of the overdrive range in order to smooth the 4–3 power-on downshifts. Overdrive servo apply pressure acts on the lower end of land 436 and balances the spring force. The valve is supplied from the 1–2 shift valve through passage 294, which is line pressure in second, third and fourth gear ratios.

During fourth ratio operation, pressure from the 3–4 shift valve is distributed to passage 440 and urges the valve spool 438 downward to prevent it from regulating so that the overdrive servo apply pressure equals line pressure. It functions in this manner also during manual low operation so that overdrive servo apply pressure is the same as line pressure whenever the servo apply chamber is pressurized.

The 1–2 accumulator is generally identified by reference numeral 446 and includes a double-acting piston 448 having an upper pressure chamber 450 and a lower pressure chamber 452. Intermediate clutch pressure during a 1–2 shift, as explained earlier, is distributed to the chamber 452 through passage 308. Line pressure is delivered to the upper chamber 450 through line passage 454. This cushions the application of the intermediate clutch. The uppermost chamber of the 1–2 accumulator is exhausted. It could be pressurized, however, if it is desired to further modify the intermediate clutch pressure during a 1–2 shift.

The 2–3 accumulator, which was described with reference to the engagement of the forward clutch, functions also to cushion the engagement of the direct clutch during a 2–3 shift. The direct clutch 332 communicates with the lower side of the piston 346 during direct clutch engagement and the forward clutch 456 communicates with the upper side of the accumulator piston 346.

The control scheme has eight check valves. These include valve 362 previously described, valve 414 previously described, check valve 458 associated with the 2–3 backout valve, previously described valve 428, a valve 460 associated with the reverse clutch 462, and a check valve 464 which actually is a shuttle valve disposed between the low and reverse servo 300 and reverse servo feed line 200 and between the low and reverse servo 300 and the feed line 466 extending to the 1–2 shift valve. The seventh check valve is shown at 468 and the eighth check valve is shown at 470.

Check valve 362 seats during a 2–3 shift thereby forcing the 2–3 accumulator back pressure to flow past the 2–3 capacity modulator valve. During a 3–2 downshift and during a forward clutch engagement, forward clutch flow unseats the ball and flows to the accumulator.

Check valve 414 seats when the forward clutch is being applied thereby forcing the flow through the appropriate orifice. During a 3–4 shift and during a disengagement to effect neutral, forward clutch fluid flows freely past the valve 414 thus bypassing all of the orifices.

Check valve 458 seats during a 2–3 shift to force the direct clutch flow to go through either orifice 358 or orifice 458, depending upon the position of the 2–3 backout valve. During a 3–2 downshift direct clutch pressure fluid flows freely past the check valve 458, thus bypassing the orifices.

Check valve 428 seats during a 3–4 shift, thus forcing the overdrive servo release flow to go past the 3–4 capacity modulator valve 420. On a 4–3 shift, oil flows freely past the valve 428.

Check valve 460 seats during reverse engagement thus forcing the reverse supply fluid to flow through orifice 472. When the reverse clutch is released, fluid from the reverse clutch exhausts freely through the valve 460.

Shuttle valve 464 applies the low-and-reverse servo from either the reverse circuit or the 1–2 shift valve.

Check valve 468 prevents the distribution of pressure to the converter clutch during first gear operation if for some reason the modulated converter clutch solenoid should malfunction during operation in first gear. The ball is seated in second gear, third gear and fourth gear operation.

Check valve 470 seats during a 1–2 shift. This forces the intermediate clutch fluid, upon clutch application, to flow through the control orifice 306. On a 2–1 downshift, a second orifice exhaust path through the orifice 474 is added to the exhaust flow path.

FIG. 4A shows the converter circuit and the bypass clutch control when the transmission is in the neutral and park ranges at light throttle. In this instance, the bypass clutch control valve 212 is in an upward position. Regulated pressure then is distributed to the converter impeller circuit and also to the bypass circuit through passages 226 and 224, respectively. Fluid is distributed from the main regulator valve through the converter pressure limit valve 176, which assumes an upward position. It is transferred then through the bypass clutch control valve directly into the passages 226 and 224. Fluid returns from the converter turbine circuit through passage 164 and then through the open drain back valve to the cooler 174.

Figure 5A:
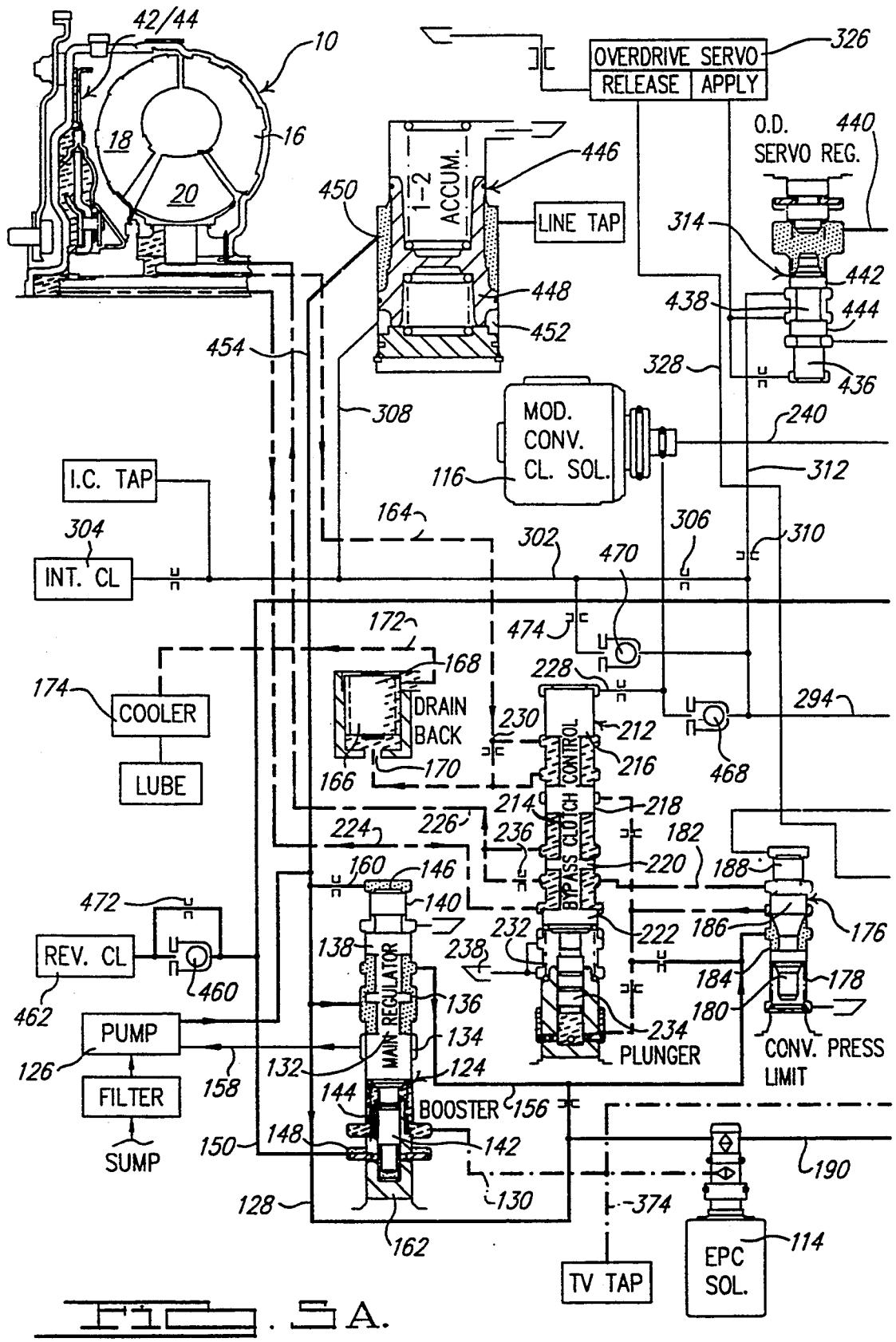
FIGS. 5A and 5B show a schematic valve diagram of the valve system of the invention wherein the valve elements are positioned for reverse drive, part throttle, open converter operation.
Figure 5B:
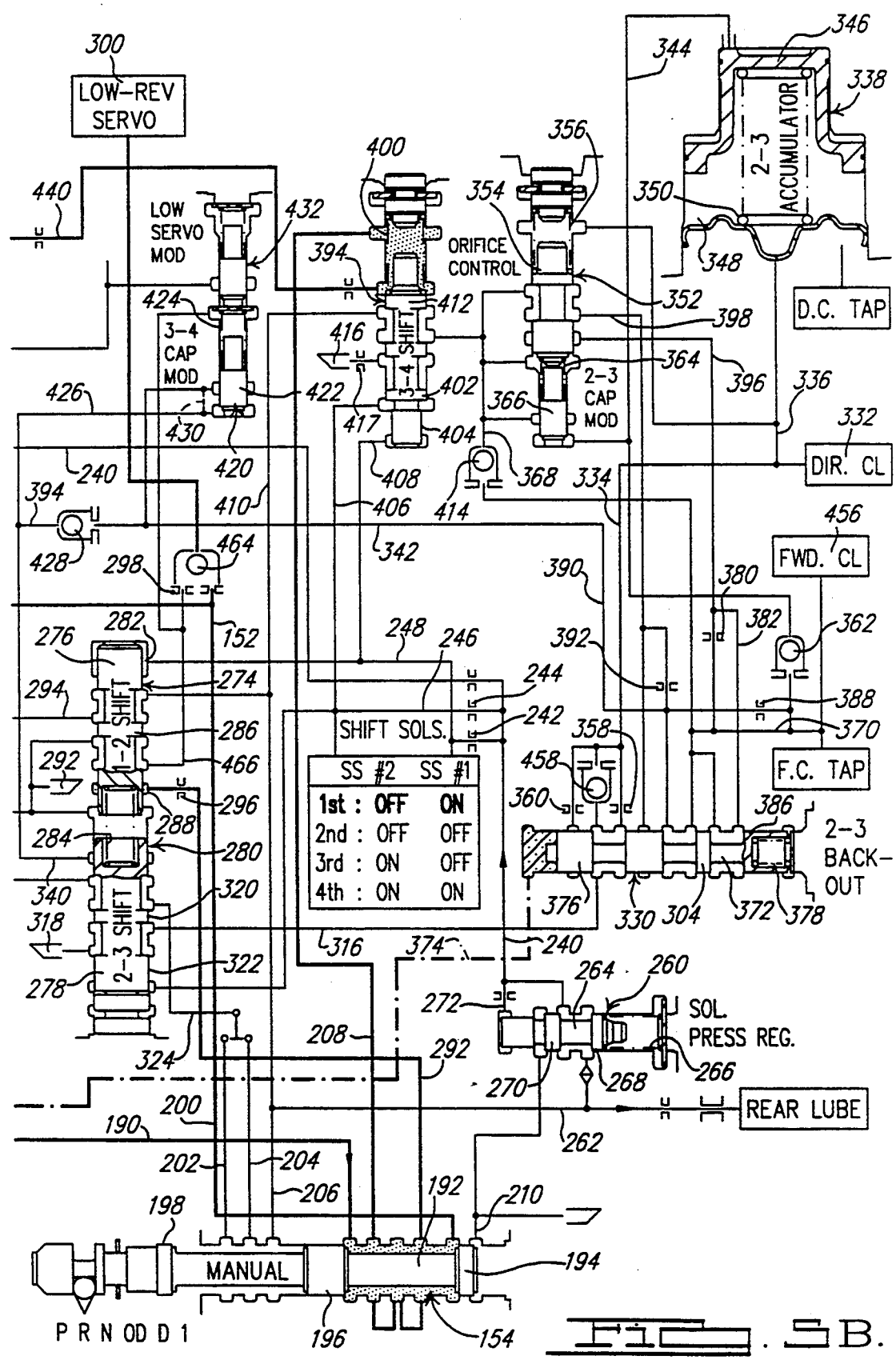
Figure 5A:
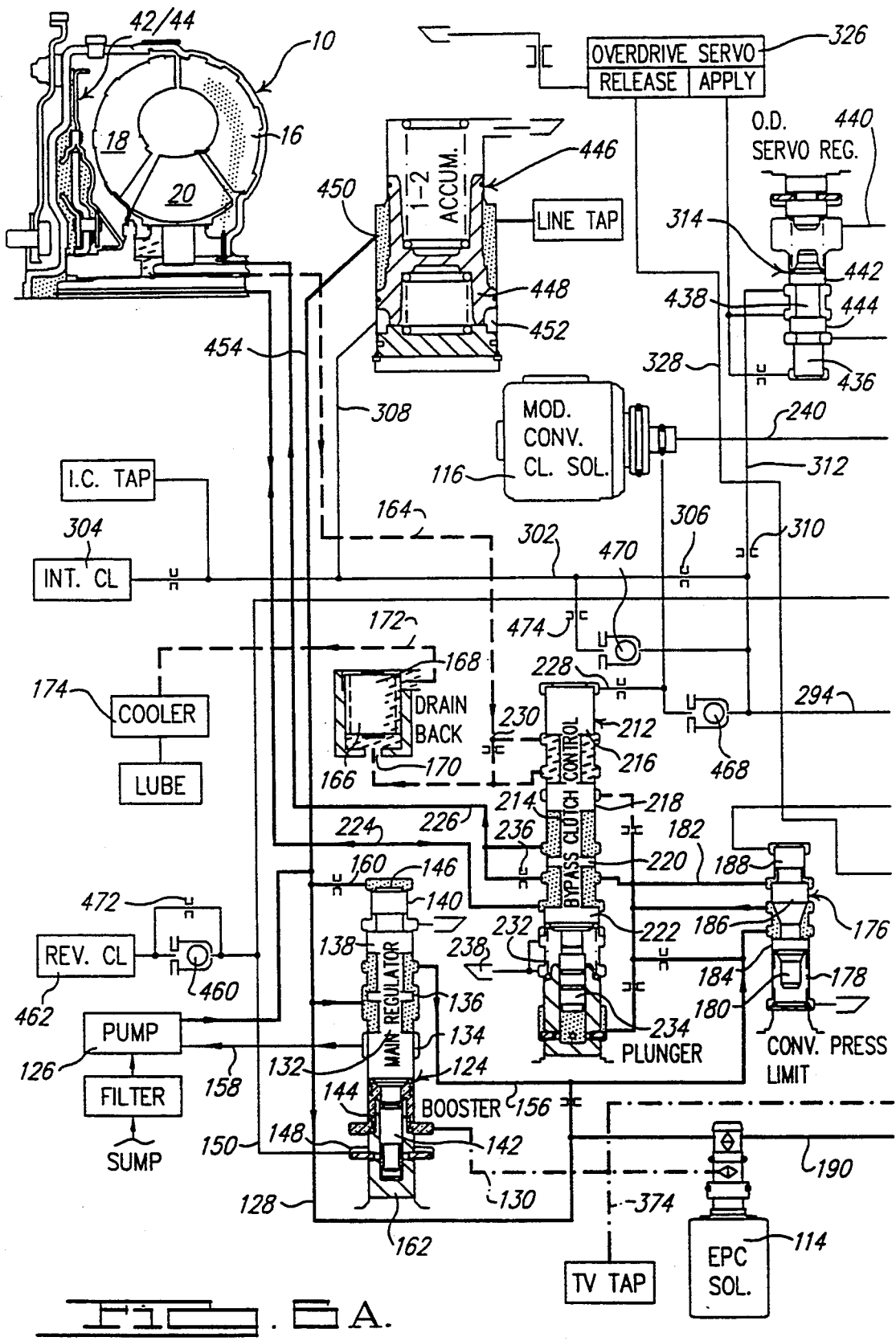

FIGS. 5A and 5B show a schematic diagram of the valve elements described with reference to FIG. 4, but the valves have been shifted to the positions that are consistent with reverse-drive, part-throttle, open-converter operation. Thus, the bypass clutch control is in an upward position, the solenoid pressure regulator valve 260 is in a left-hand position, the 2–3 backout valve is shifted to the right by the electronic pressure control output pressure in passage 374, the 3–4 shift valve element 412 is shifted to a downward position and actuating pressure is distributed to the low-and-reverse servo 300.

The valve spring 284 moves the 1–2 shift valve element to its upper position and moves the 2–3 shift valve element to its lower position.

Reverse pressure is distributed to the reverse clutch through passage 200 from the manual valve 154.

FIGS. 6A and 6B show the valve elements described with reference to FIG. 4, but the valves are moved to the positions that are consistent with neutral, closed-throttle, open-converter operation. Line pressure from the manual valve, when the manual valve assumes the neutral position, is distributed through lines 190 and 156, through the converter pressure limit valve and through the bypass clutch control valve to the converter impeller and bypass clutch circuits. The 2–3 shift valve moves down, as described earlier, and the 1–2 shift valve element moves up, as described earlier. Pressure distribution to all of the servos and clutches is interrupted. The 2–3 backout valve and the solenoid pressure regulator valve move to their left-hand positions.

Figure 7A:
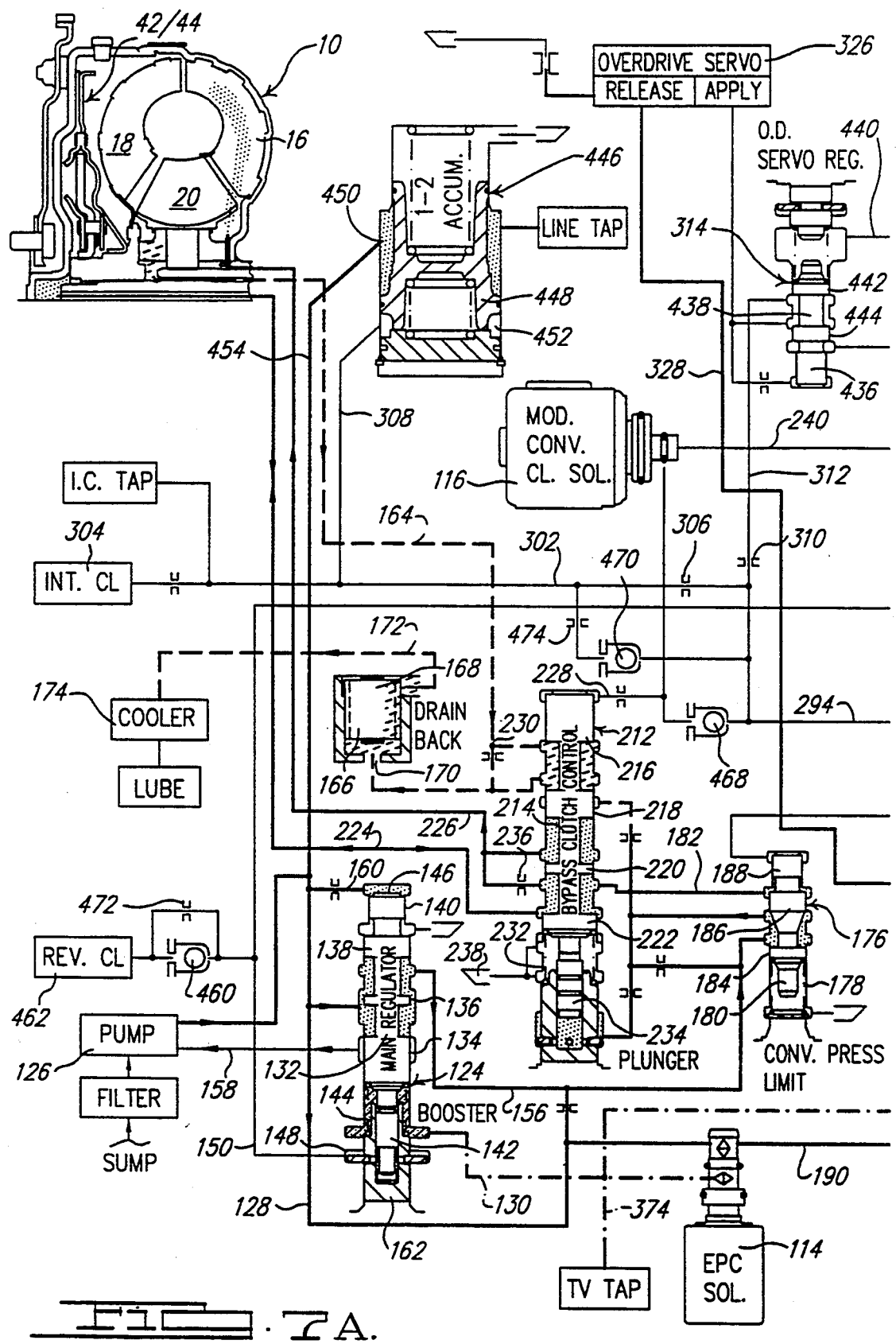
FIGS. 7A and 7B show a schematic valve diagram of the valve elements in the positions they assume when the transmission is conditioned for overdrive, first gear, closed throttle, open converter operation.
Figure 7B:
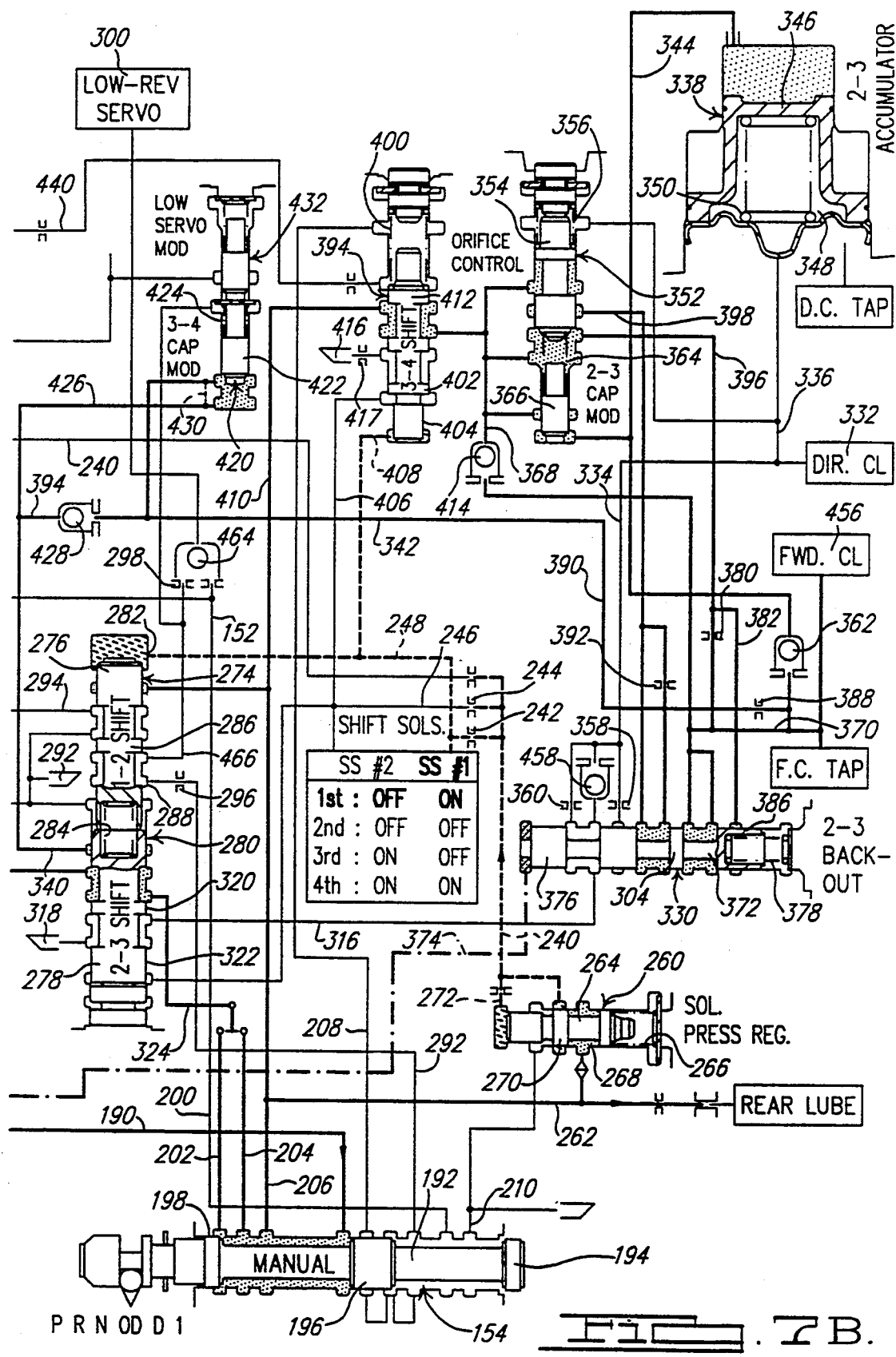
Figure 5B:
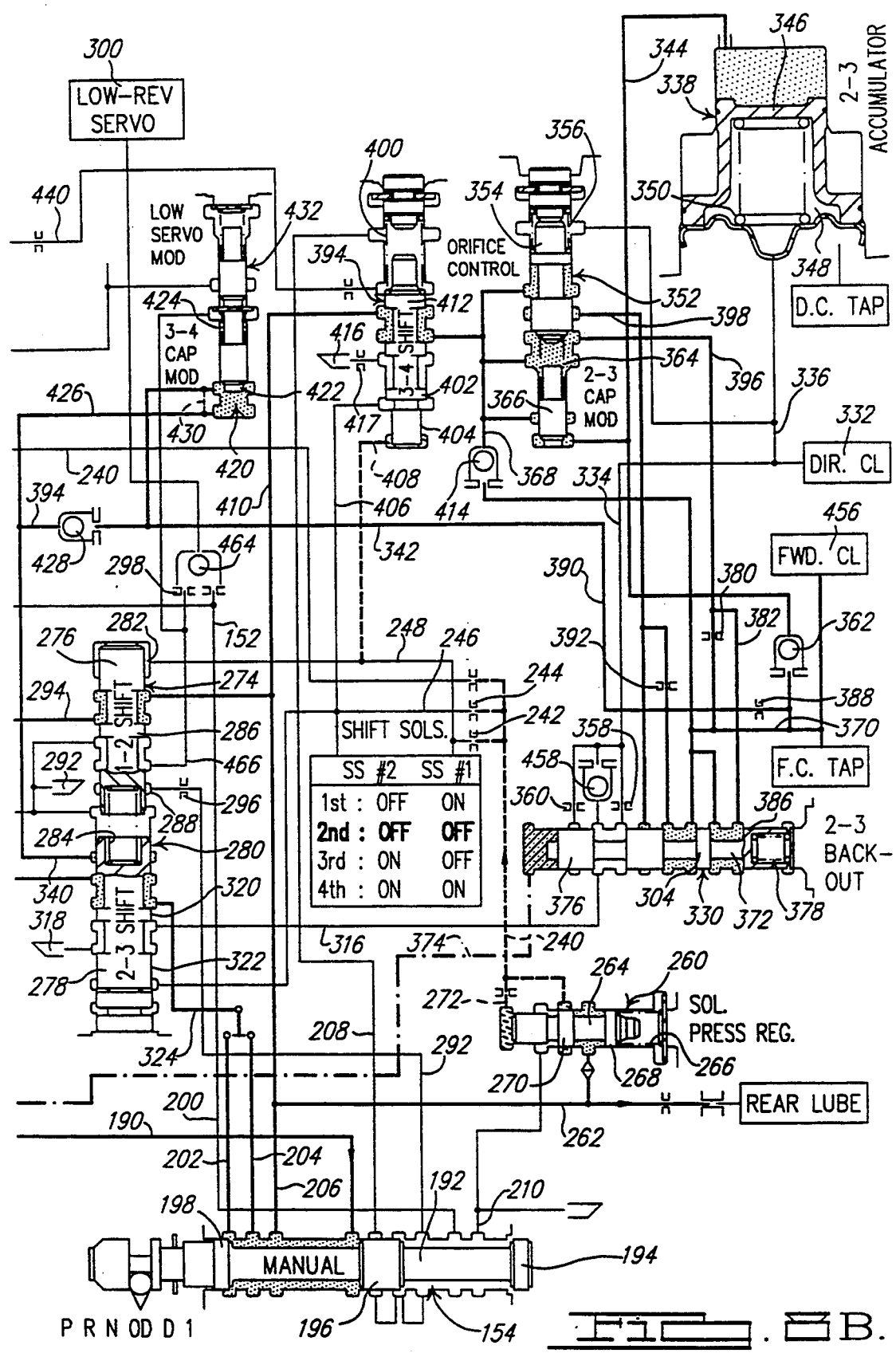
Figure 5A:
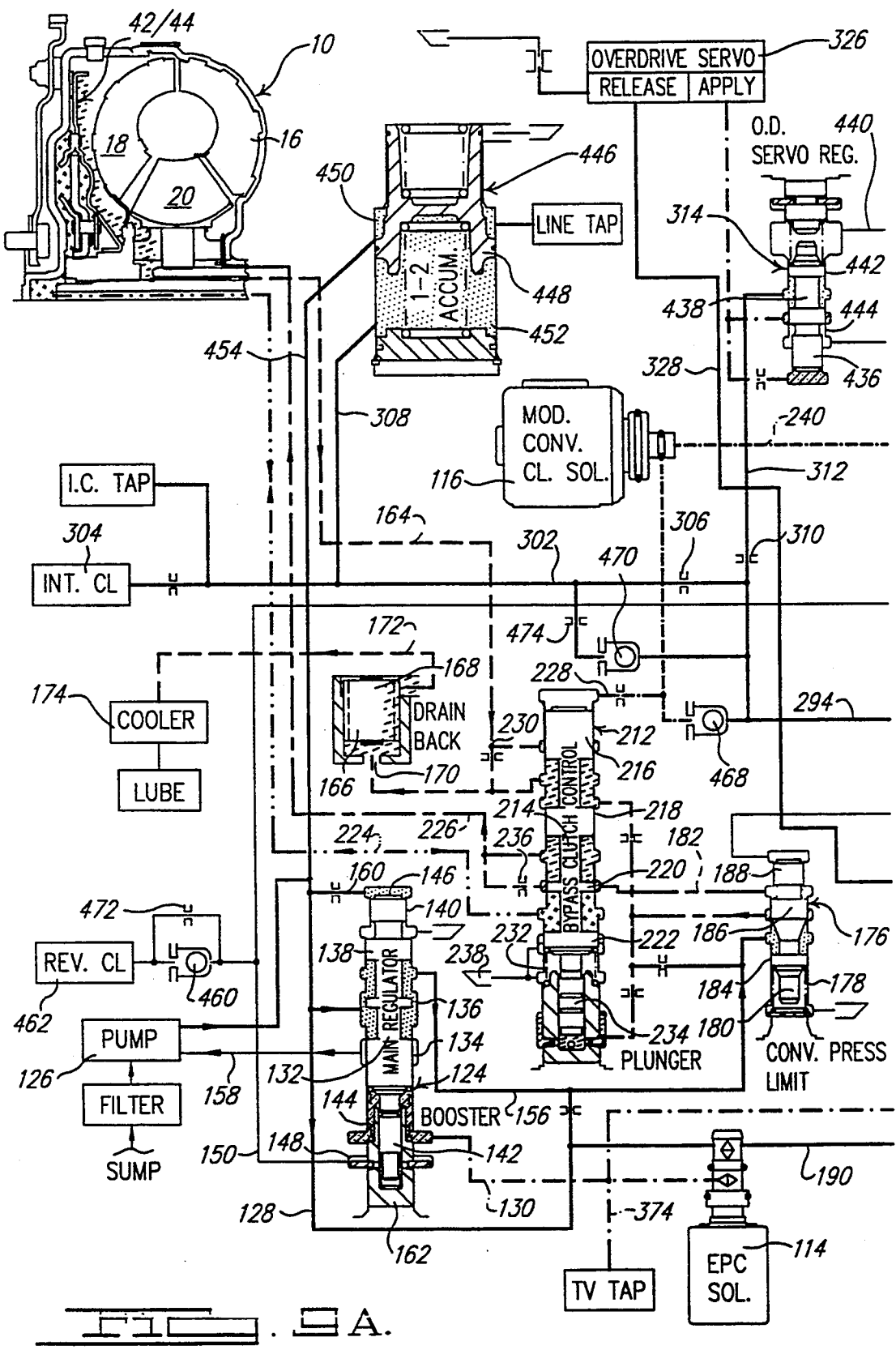
Figure 5B:
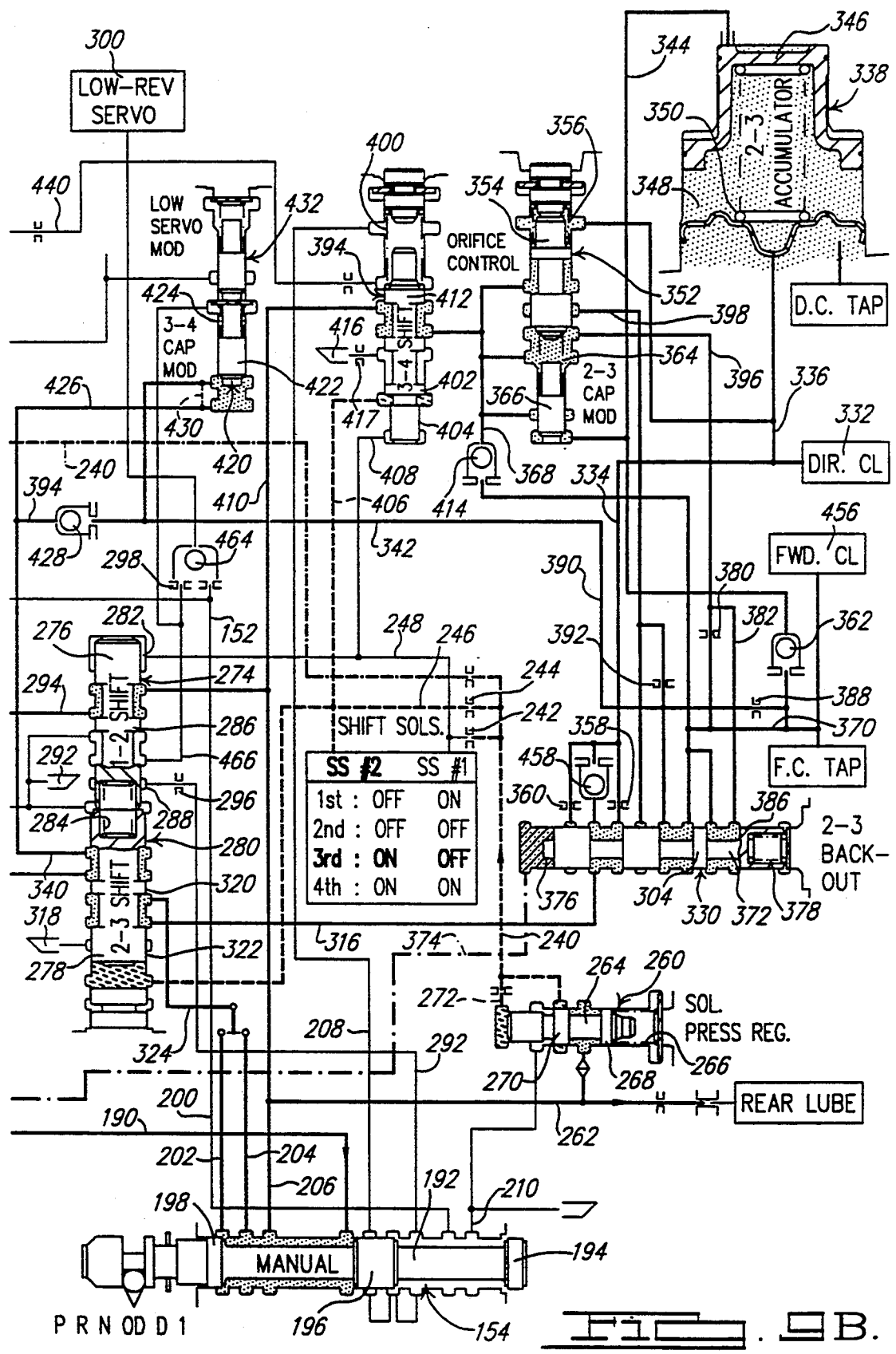

FIGS. 7A and 7B show the valve elements described with reference to FIG. 4, but the valve elements have been moved to the positions corresponding to the overdrive, first-gear, closed-throttle, open-converter operation. In this case, the manual valve delivers line pressure through the 2–3 shift valve, which is moved in a downward direction, to the feed passage 328 for the release side of the overdrive servo. Line pressure is distributed also to the forward clutch from the 3–4 shift valve, which assumes its downward position. The 3–4 shift valve is supplied with fluid from the manual valve through passage 410.

FIG. 7B shows in simplified form the valve elements that are particularly affected by this overdrive operating condition. It is seen from FIG. 7B that the upper working chamber of the 2–3 accumulator piston is pressurized. The orifice control valve is shifted upward and the 2–3 capacity modulator valve is shifted downward, thereby establishing fluid communication between the outlet side of the 3–4 shift valve and the forward clutch.

The shift solenoid SS2 is off and the shift solenoid SS1 is on. This causes the 1–2 shift valve to move downward, which in turn forces the 2–3 shift valve to move downward because the two valves are connected mechanically, one with respect to the other.

FIG. 7A shows the position of the bypass clutch control valve during operation in the overdrive range with the converter clutch released.

Figure 8B:
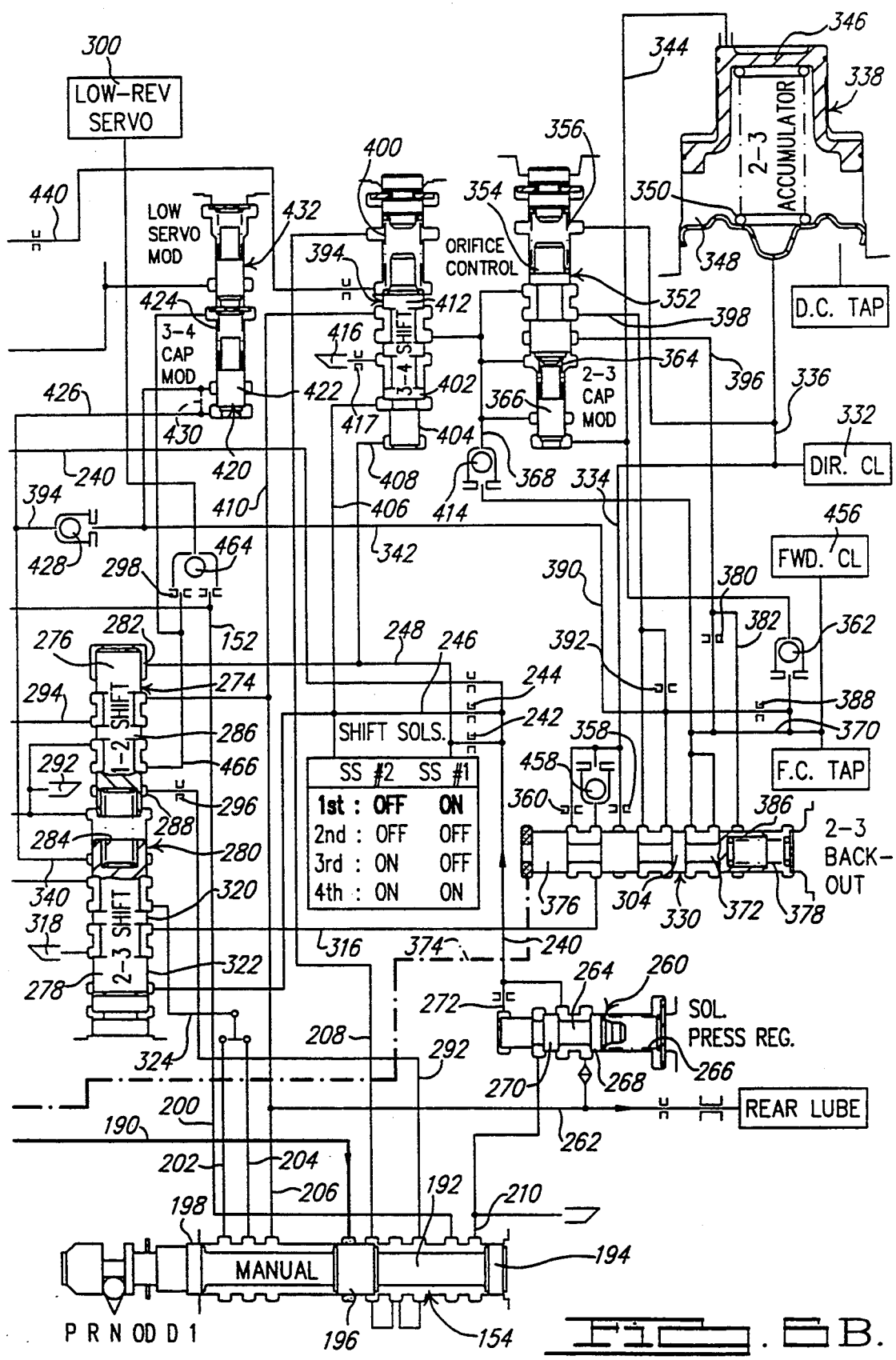

FIGS. 8A and 8B show a valve diagram corresponding to FIG. 4, but the valves have been moved to their positions consistent with overdrive, second-gear, part-throttle, open-converter operation.

FIG. 8A shows the 1–2 accumulator with both pressure chambers pressurized. Both shift solenoids SS1 and SS2 are deenergized, as shown in FIG. 8B. The manual valve then distributes pressure to the 3–4 shift valve, which transfers it to the forward clutch through the orifice control valve. The manual valve also distributes pressure to the 1–2 shift valve, which distributes it through the orifice 306 to the intermediate clutch.

FIGS. 9A and 9B show a view corresponding to FIG. 4, but the valves have been shifted to the positions consistent with overdrive, third gear operation when the converter is modulating, rather than being open. In this instance, the bypass clutch control is moved inward under the influence of pressure delivered to it from the modulating converter clutch solenoid. Thus, pressure is distributed through the bypass clutch control valve through bypass clutch feed passage 224. The magnitude of the pressure in passage 224 is determined by the duty cycle of the modulated converter clutch solenoid and the pressure in passage 228 delivered to the upper land 216 of the bypass clutch control valve.

Pressure from the manual valve is delivered directly to the release side of the overdrive servo and to the direct clutch through the 2–3 backout valve. The 2–3 backout valve is shifted in a right-hand direction by the electronic pressure control signal in passage 374.

The function of the 2–3 backout valve illustrated in FIG. 4 is better understood by referring to enlarged view of the backout valve as seen in FIG. 9B.

In the condition shown in FIG. 9B, the shift solenoid SS1 is deactivated and shift solenoid SS2 is activated. A modulated converter clutch solenoid receives signals of varying pulse width. When the shift solenoid 2 is activated, oil pressure is delivered to the 2–3 shift valve and the 3–4 shift valve. The 2–3 shift valve shifts upward against the opposing force of the valve spring while the 1–2 shift valve remains upshifted in an upward direction. Oil for the manual valve then flows to the direct clutch and to the 2–3 accumulator by way of the 2–3 backout valve.

The pressure from the shift solenoid SS2 is not enough in itself to move the 3–4 shift valve, so it is held in the position shown in FIG. 9B.

During light throttle operation, the 2–3 backout valve feeds the direct clutch through the orifice 360. During heavy throttle operation, the 2–3 backout valve is shifted to the right, thereby forcing supply oil to be directed through the orifice 358.

Figure 10A:
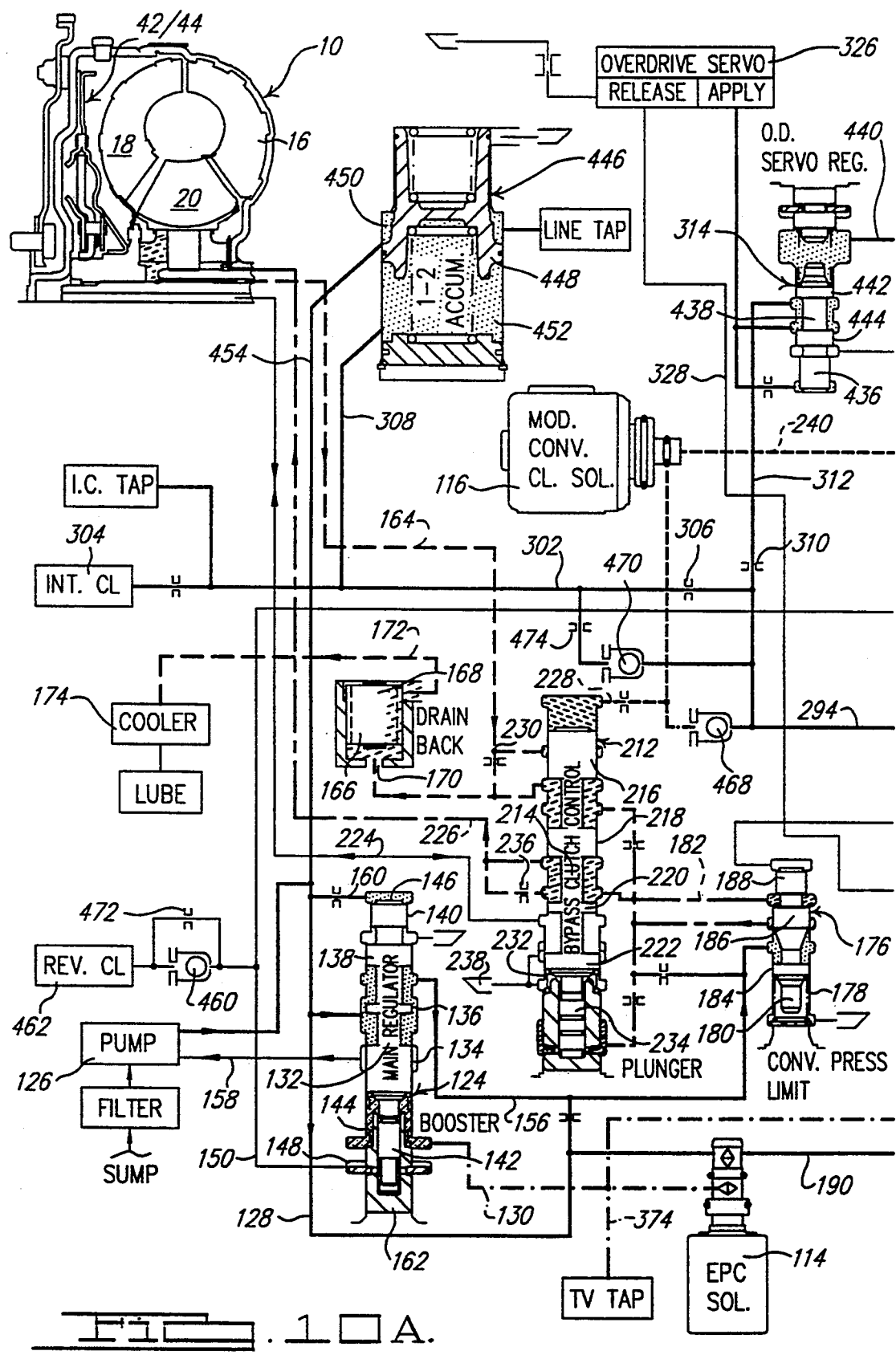

FIGS. 10A and 10B show the valve system of FIG. 4 with the valves moved to the positions they assume for overdrive, fourth gear, part throttle, open-converter operation.

FIG. 10A shows the converter and bypass clutch control circuit. As mentioned previously, the duty cycle of the modulated converter clutch solenoid can be increased to force the bypass clutch control to its downward position when full clutch application (no slip) is desired. Modified pressure from the modulated converter clutch solenoid will effect a controlled slip as explained previously. The duty cycle commanded by the processor then is greater than zero, but it is less than 100%.

Figure 11A:
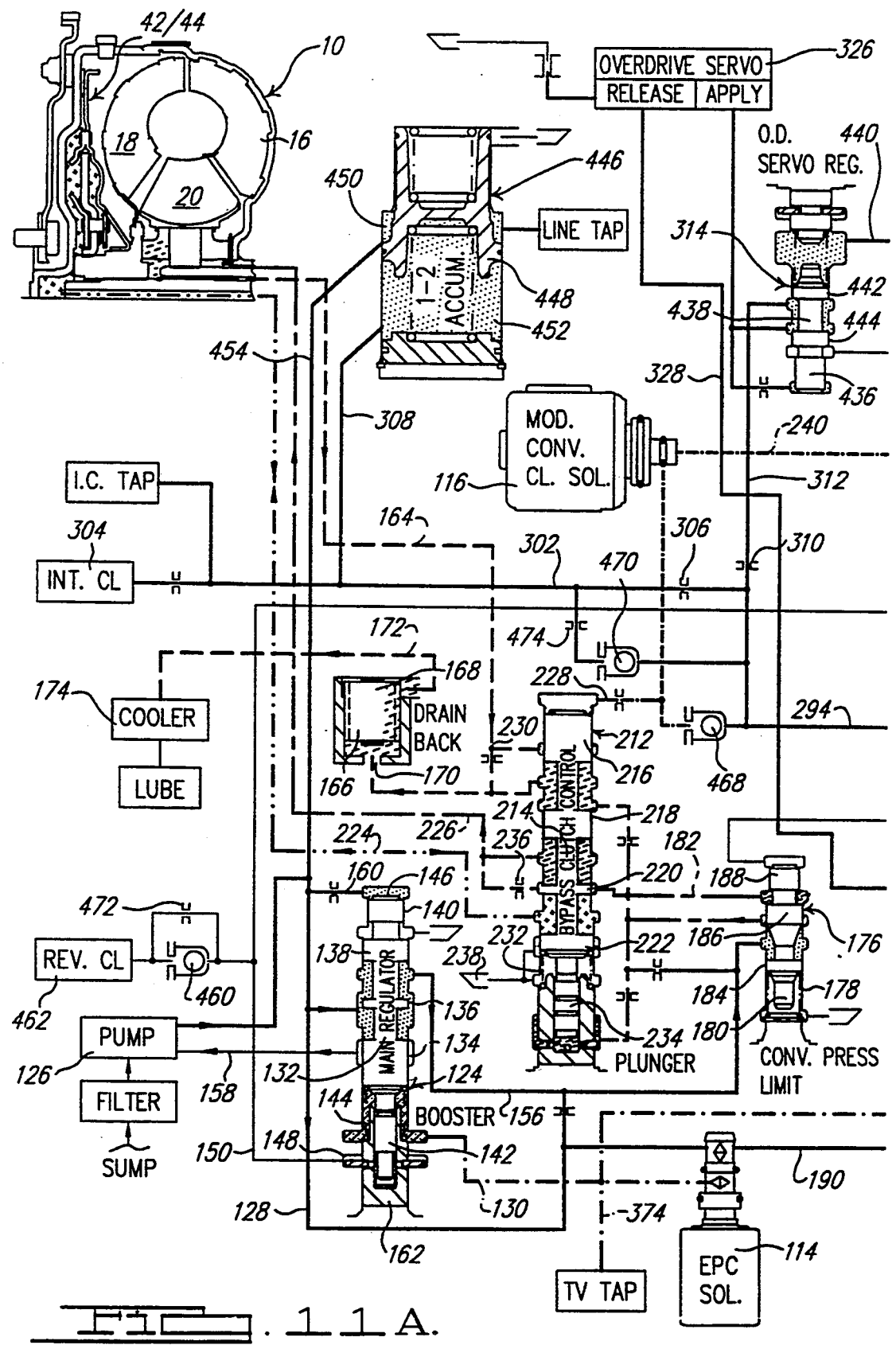
FIGS. 11A and 11b show a schematic valve circuit diagram with the valve elements in the positions they assume when the transmission is in the D-range, third gear operation with part throttle and with the converter in the modulating mode.
Figure 11B:
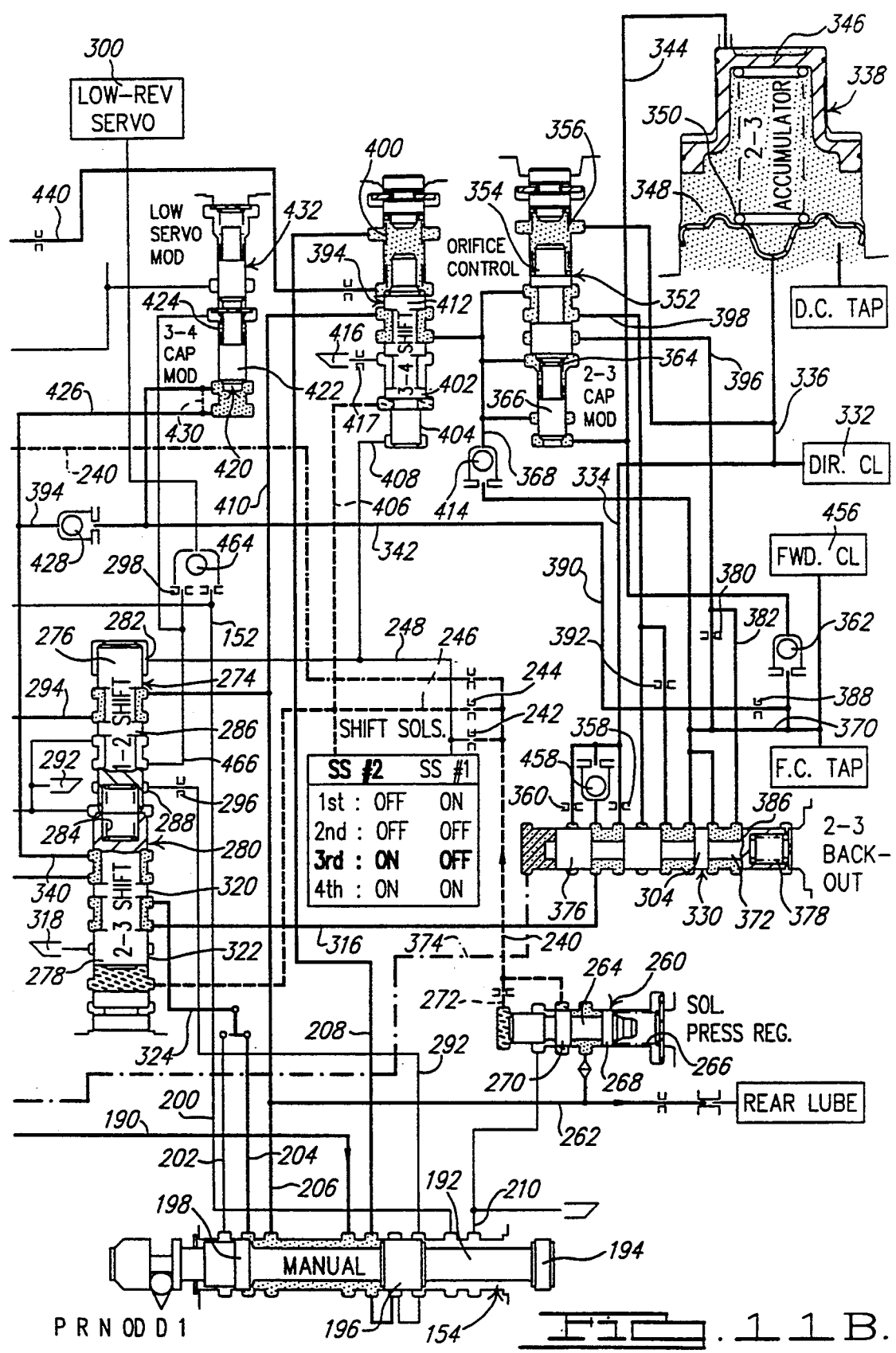

FIGS. 11A and 11B show the valve circuit of FIG. 4, but with the valve elements moved to the positions that correspond to drive range D, third gear, part throttle operation with a modulated converter clutch.

The 2-3 shift valve, the 3-4 shift valve and the overdrive servo is best seen in FIG. 11B. Both the apply and release side of the overdrive servo are pressurized and the servo is released. As seen in FIG. 11B, the 3-4 shift valve is downward. Solenoid pressure shifts the 2-3 shift valve and the 1-2 shift valve in an upward direction. As explained previously, this will cause the forward clutch and the direct clutch to be applied as well as the intermediate clutch.

Figure 12A:
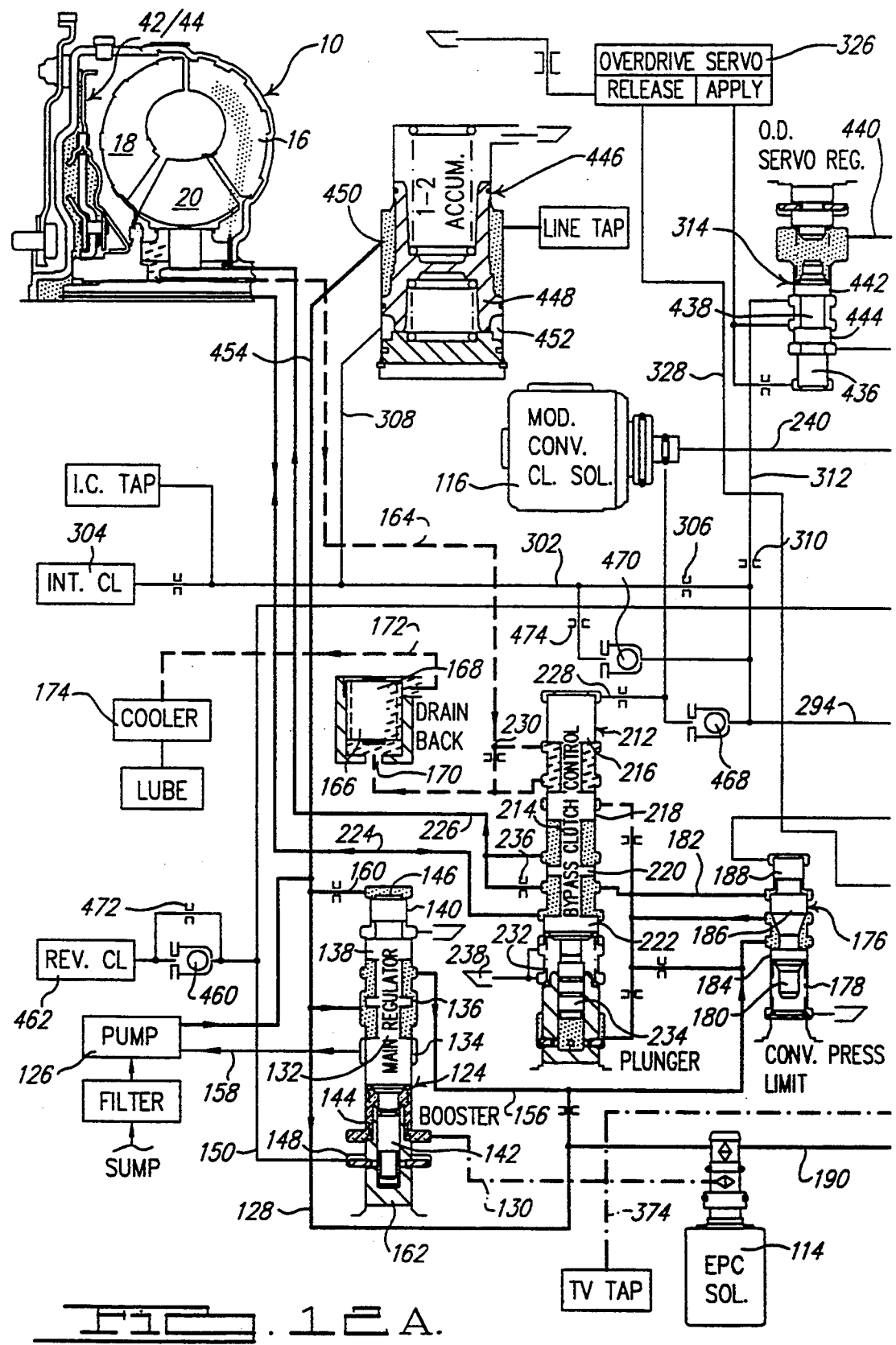

FIG. 12A and FIG. 12B show the valve elements of FIG. 4 in the positions they assume during first ratio operation in the manual low range with a closed throttle and an open converter. The solenoid SS2 is released and the solenoid SS1 is applied. Thus the 1-2 shift valve is moved downward. That forces the 2-3 shift valve also to move downward. The low-and-reverse servo is applied as pressure is distributed through the 1-2 shift valve from the manual valve. The 2-3 capacity modulator valve is forced to its lower position and the orifice control valve is forced to its upper position. The feed of fluid to the forward clutch is through orifice 380.

Figure 13A:
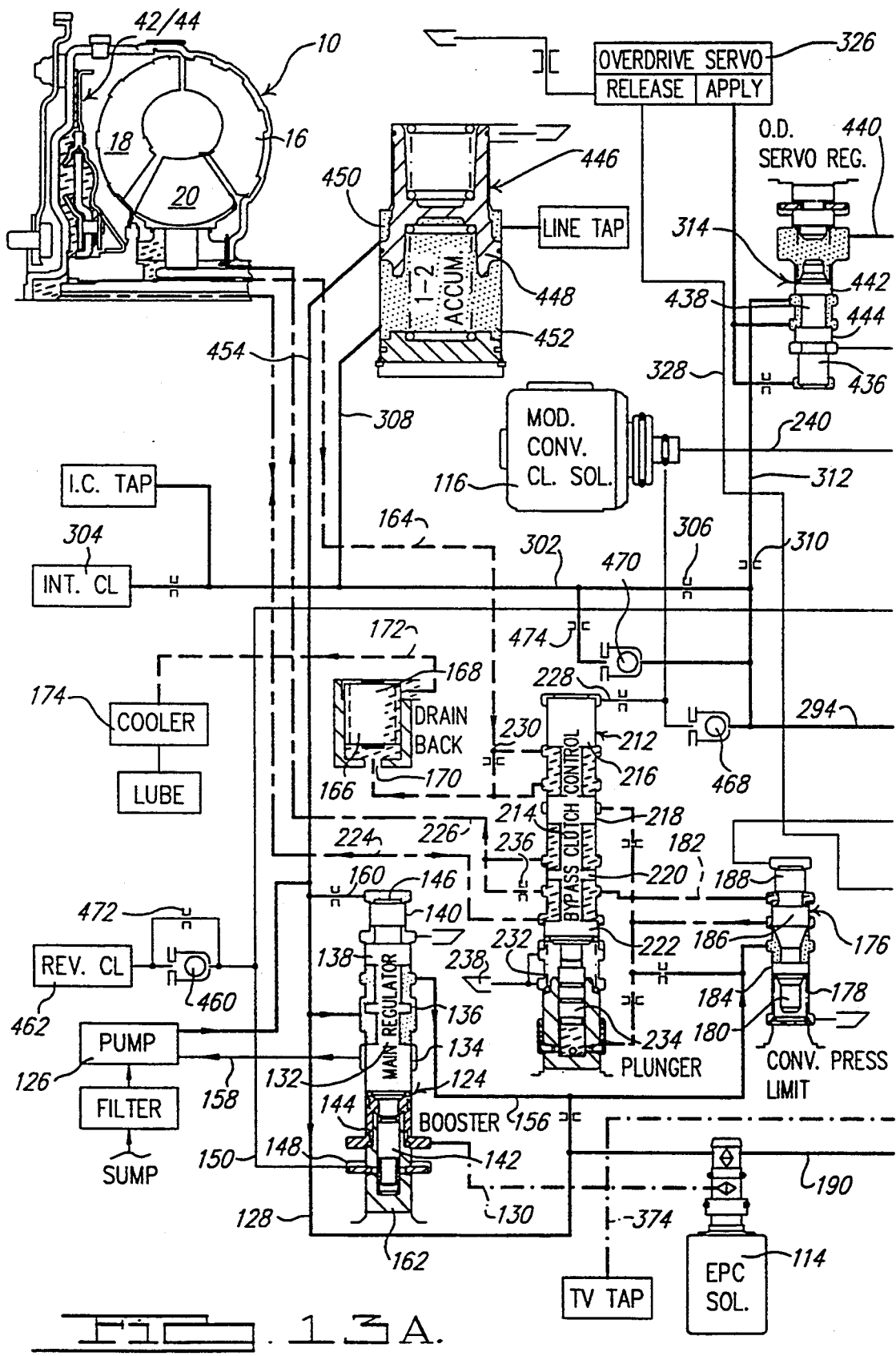
FIGS. 13A and 13B show a schematic valve diagram with the valve elements in the positions they assume during operation in the manual low drive range when in the second gear, part throttle, open converter operating mode.
Figure 13B:
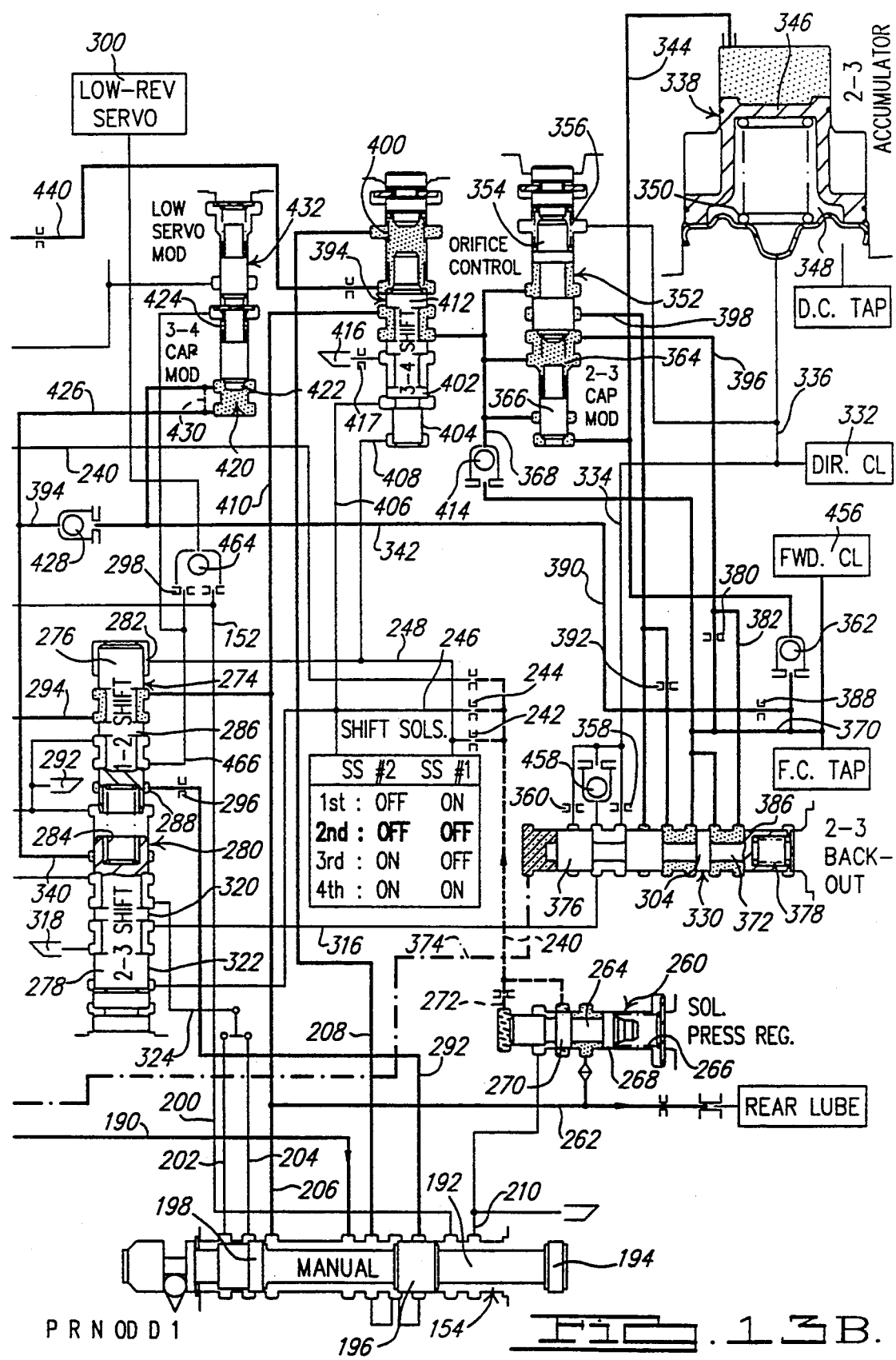

FIGS. 13A and 13B show the valve circuit of FIG. 4 with the valves moved to the positions corresponding to the second gear in the manual drive range with part throttle and an open converter. The overdrive servo apply chamber is pressurized at this time and the 1-2 shift valve is moved upward, thus permitting pressure from the manual valve to be distributed to the overdrive servo regulator valve and to the 1-2 accumulator and through the orifice 306 to the intermediate clutch. Both shift solenoids are turned off by the processor. The modulated converter clutch solenoid is turned off and the converter clutch is released. This is true also for first gear.

Figure 14A:
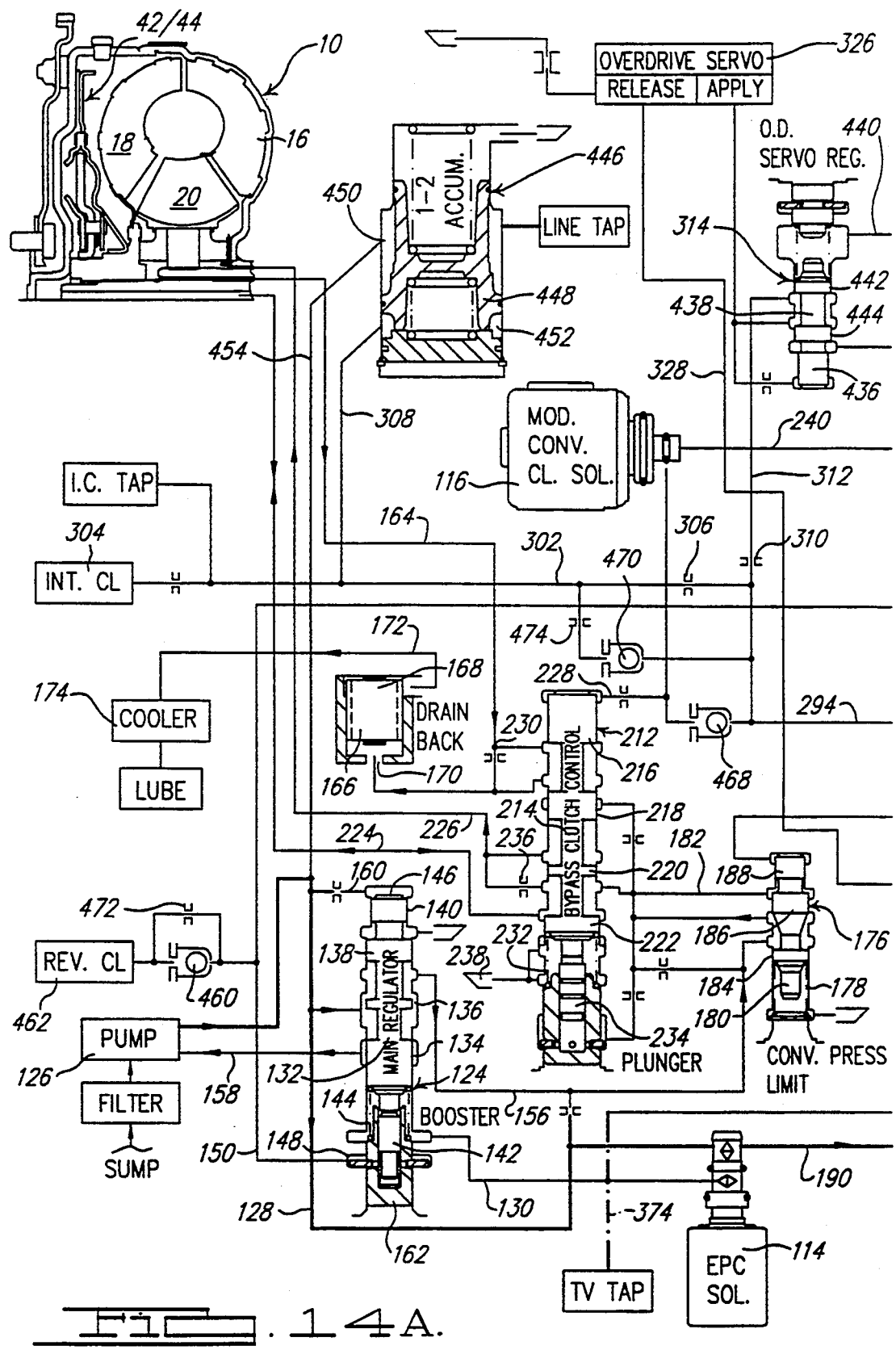
FIGS. 14A and 14B show a schematic valve diagram with the valve elements in the positions they assume during forward drive engagement of the forward clutch with a closed throttle.
Figure 14B:
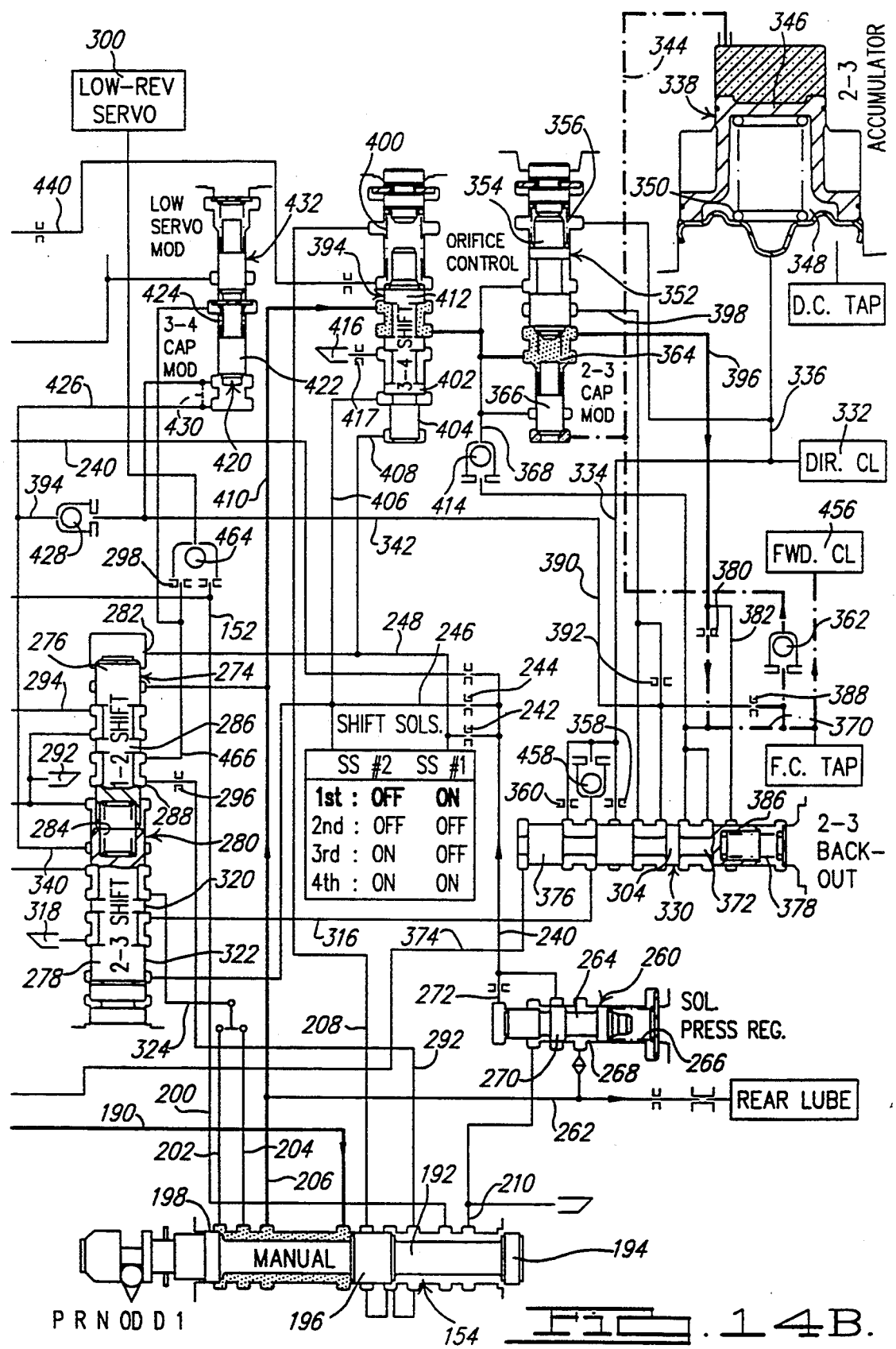

FIGS. 14A and 14B illustrate the circuit of FIG. 4, but the valves have been moved to the positions that they assume when the vehicle first is started and the manual lever is moved to the overdrive range position and the vehicle is at rest. The valves in this condition control the engagement of the forward clutch. Soft engagement is assured by the fluid delivery from the orifice control valve through the flow control orifice 380. The 2-3 accumulator also is pressurized to cushion the shift as fluid from the feed line 370 for the forward clutch is distributed through the check valve 362 to the upper end of the accumulator chamber.

Figure 15A:
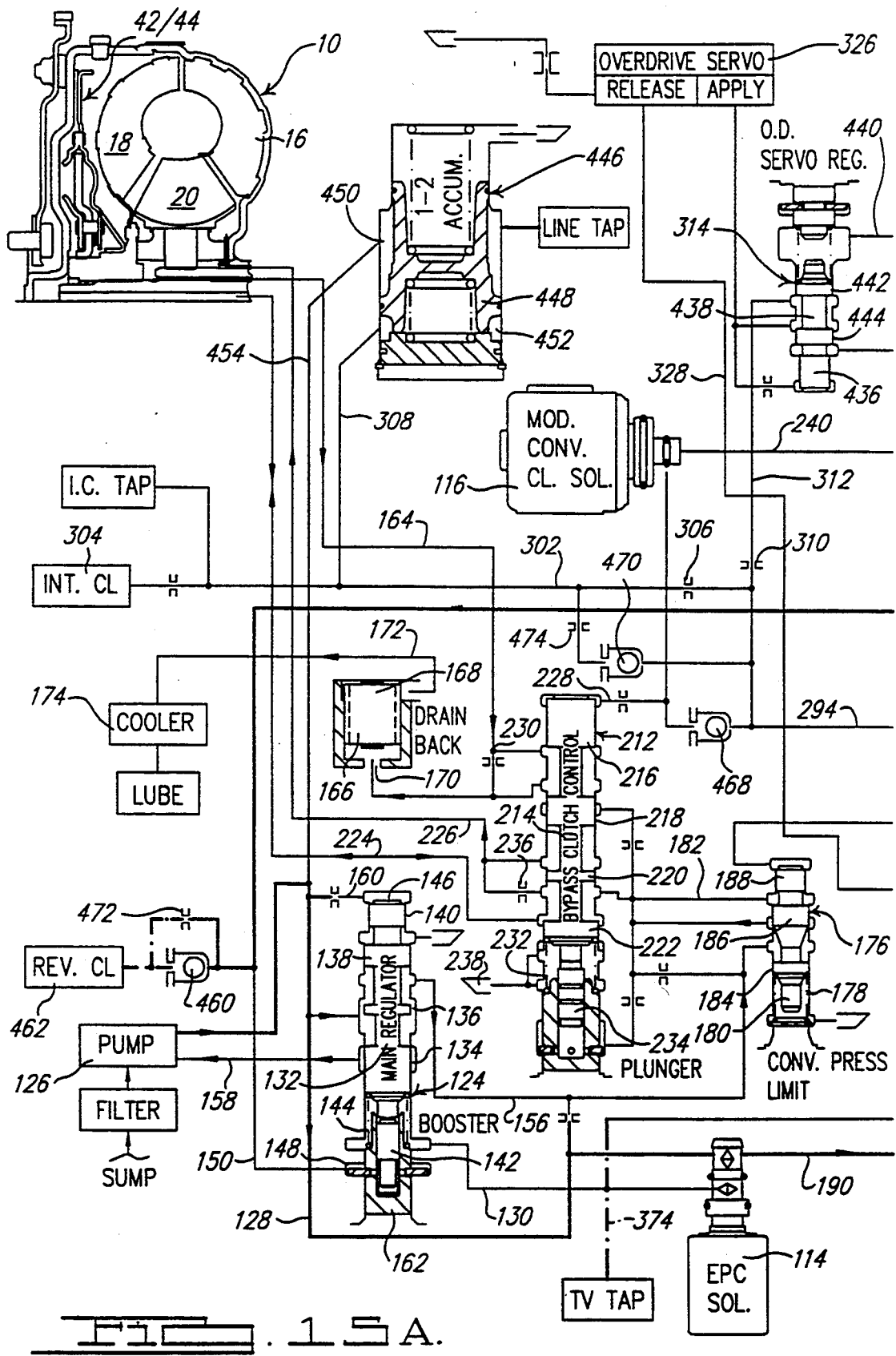
FIGS. 15A and 15B show a schematic valve diagram with the valve elements in the positions they assume during reverse drive as the low and reverse clutch becomes applied with a closed throttle.
Figure 15B:
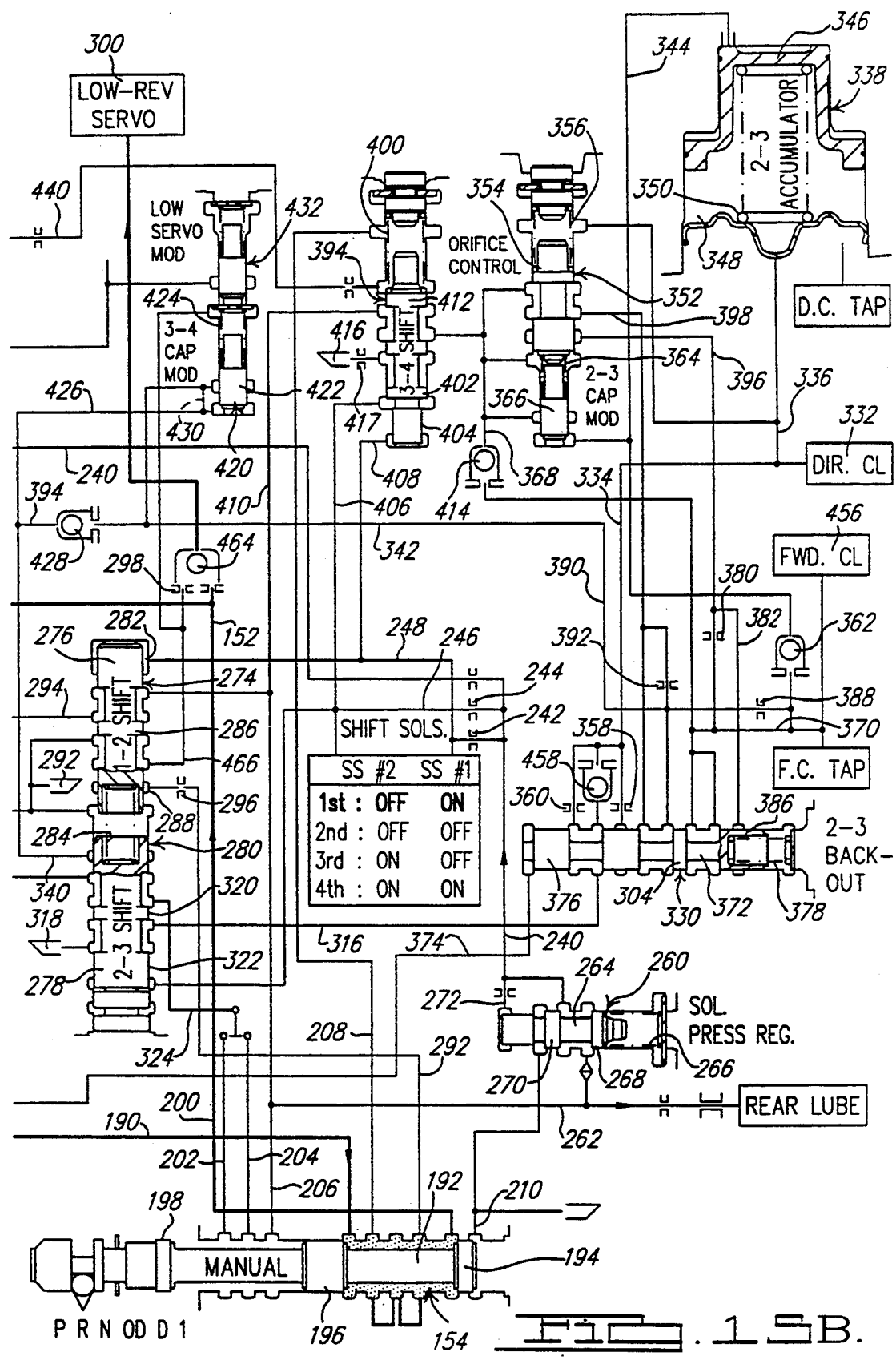
Figure 15A:
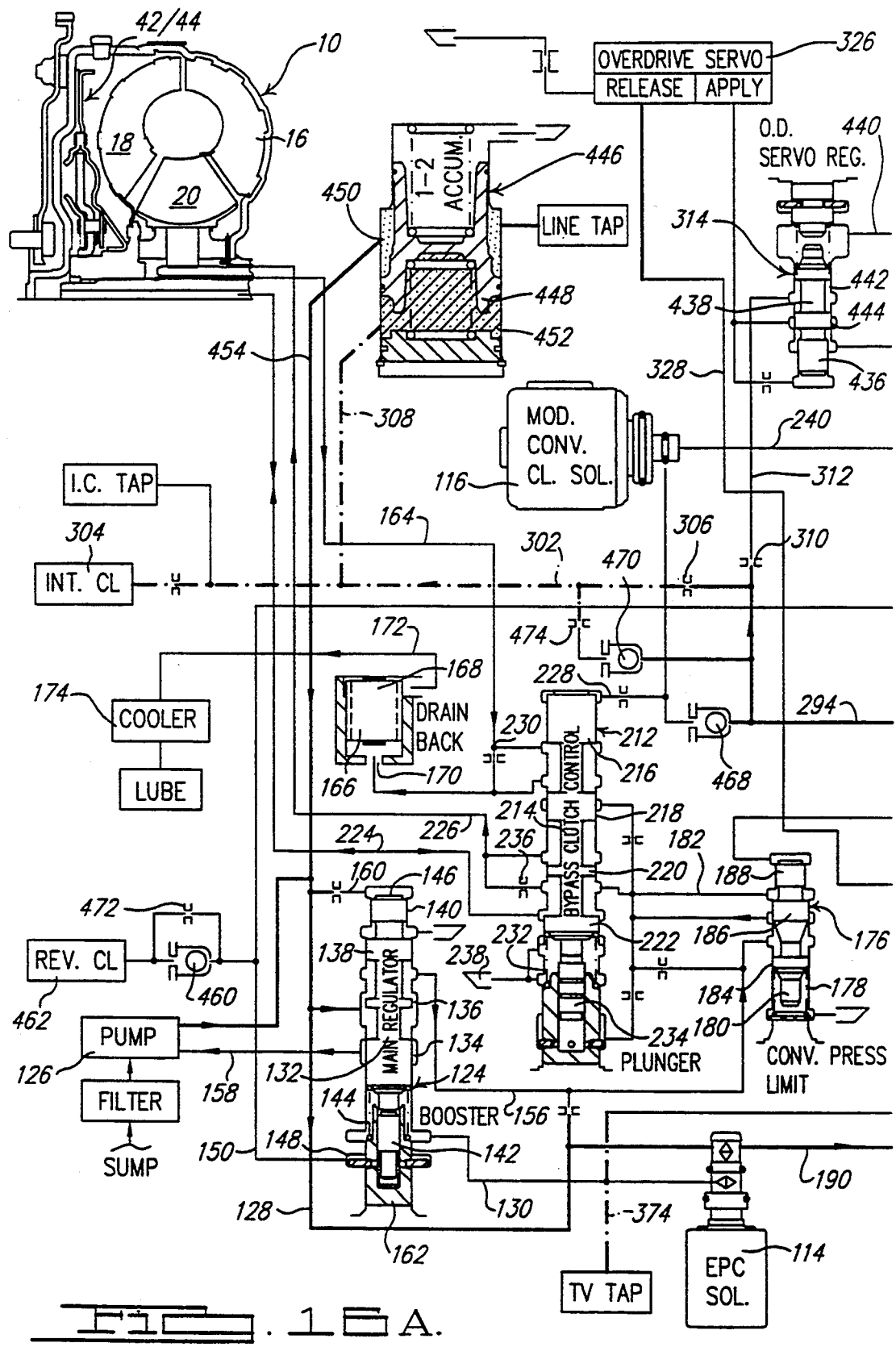

FIGS. 15A and 15B illustrate the positions of the valves when they are conditioned for reverse drive and the reverse clutch is being engaged following movement of the manual valve from the neutral position to the reverse position. The manual valve at this time delivers line pressure to the low and reverse servo and to the reverse clutch, the rate of application of the reverse clutch being controlled by the orifice 472. Check valve 464 provides communication between the manual valve and the feed line for the low and reverse servo. Shift solenoid SS1 is on and shift solenoid SS2 is off.

Figure 16B:
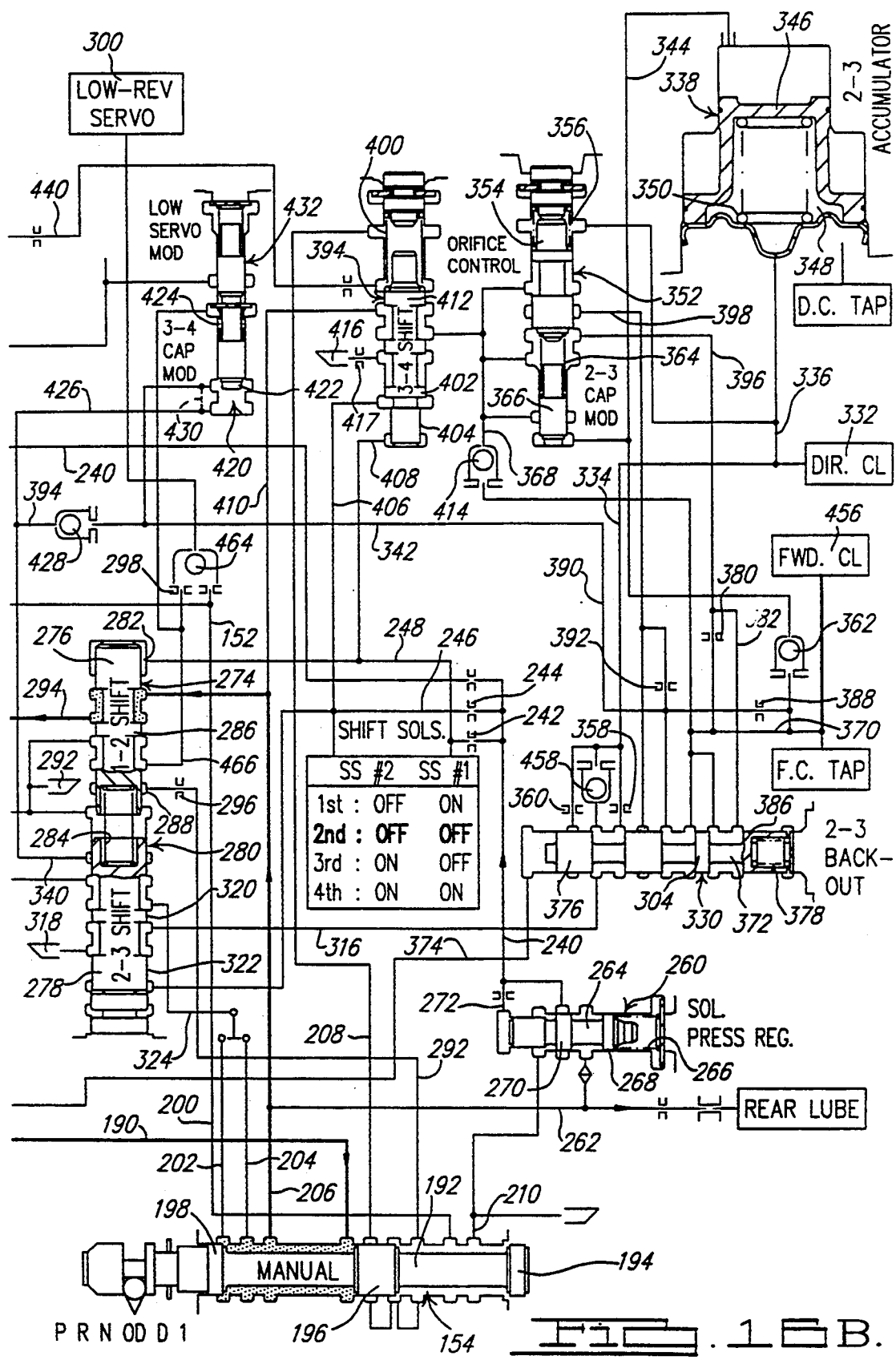

FIGS. 16A and 16B show the valve circuit with the valve elements in overdrive range as a 1-2 shift is occurring with part throttle. The manual valve then delivers fluid through the 1-2 shift valve, which assumes the upward position under the influence of the 1-2 shift valve spring. The intermediate clutch is fed then by the 1-2 shift valve through the orifice 306. The pressure made available to the intermediate clutch acts on the lower side of the 1-2 accumulator piston 448. With line pressure acting on the middle area of the piston 448, the application of the intermediate clutch is cushioned.

Figure 17B:
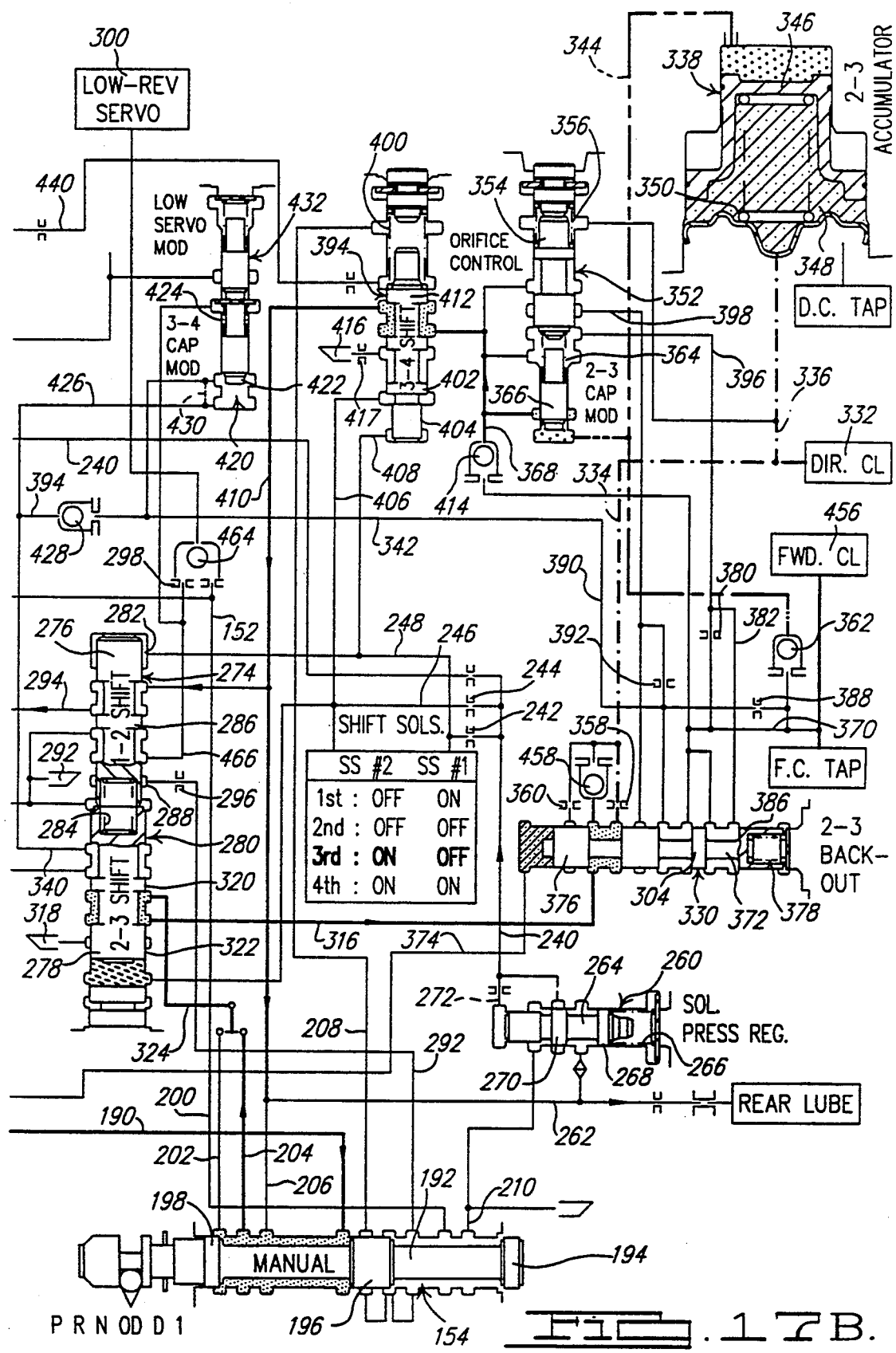

FIGS. 17A and 17B show the valve circuit with the valve elements conditioned for the overdrive range as the valves are causing a 2-3 shift with part throttle. Forward clutch pressure is distributed through the 3-4 shift valve, which assumes a downward position. It assumes a downward position also during a 1-2 shift. The 2-3 shift valve moves upwardly because solenoid pressure acts on the lower end of the 2-3 shift valve. The shift solenoid SS2 is on at this time and the shift solenoid SS1 is off. Upward movement of the 2-3 shift valve holds the 1-2 shift valve up because, as explained earlier, they are connected mechanically, one with respect to the other. Overdrive release pressure is distributed through passage 328 from the 2-3 shift valve as explained previously. The intermediate clutch is pressurized as feed line 302 is brought into communication through the 1-2 shift valve with line pressure passage 206, which extends to the manual valve.

Figure 18A:
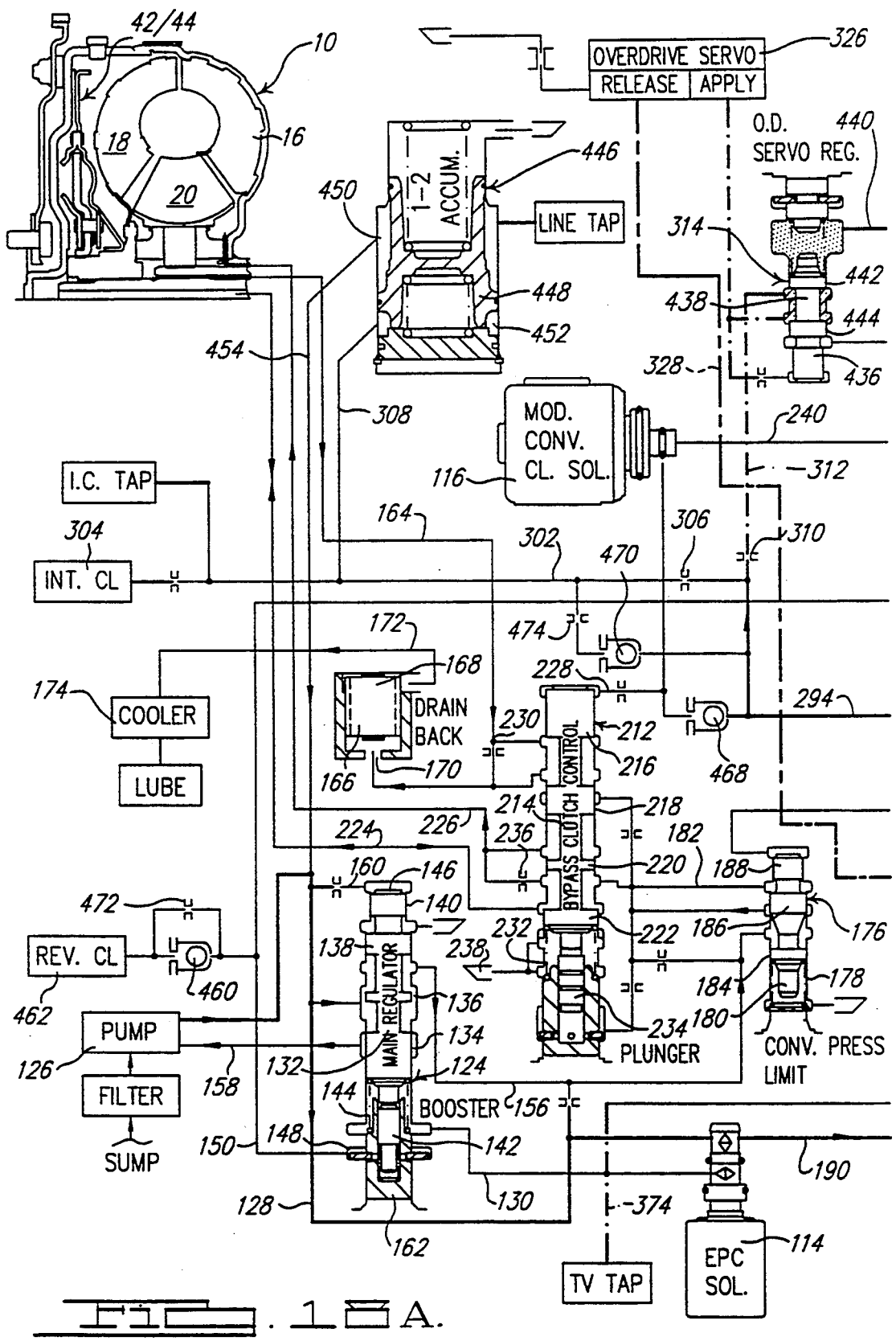

FIGS. 18A and 18B show the valves in the positions they assume in overdrive range while a 3-4 upshift is taking place at part throttle. Line pressure is distributed through the 1-2 shift valve which, together with the 2-3 shift valve, moves to the upward position because of the solenoid actuating pressure. The overdrive servo regulator valve moves downward thus establishing communication between the 1-2 shift valve passage 294 and the apply side of the overdrive servo.

FIG. 18B shows the positions of the shift valve elements. Both shift solenoids SS1 and SS2 are applied. Both shift solenoid valve pressures then are sufficient when they act on the 3-4 shift valve to move the 3-4 valve against the force of the valve spring for the 3-4 shift valve. The 3-4 shift valve thus is able to direct fluid to the overdrive servo regulator valve through passage 440. This keeps the overdrive servo regulator valve from regulating, thus allowing full line pressure to be distributed to the apply side of the overdrive servo. The 3-4 capacity modulator valve 420 softens the 3-4 shift by regulating the pressure on the release side of the overdrive brake band as fluid is displaced from the servo through the passage 328. The pressure on the forward clutch is exhausted through the check valve 414 and through the 3-4 shift valve at this time.

Figure 19A:
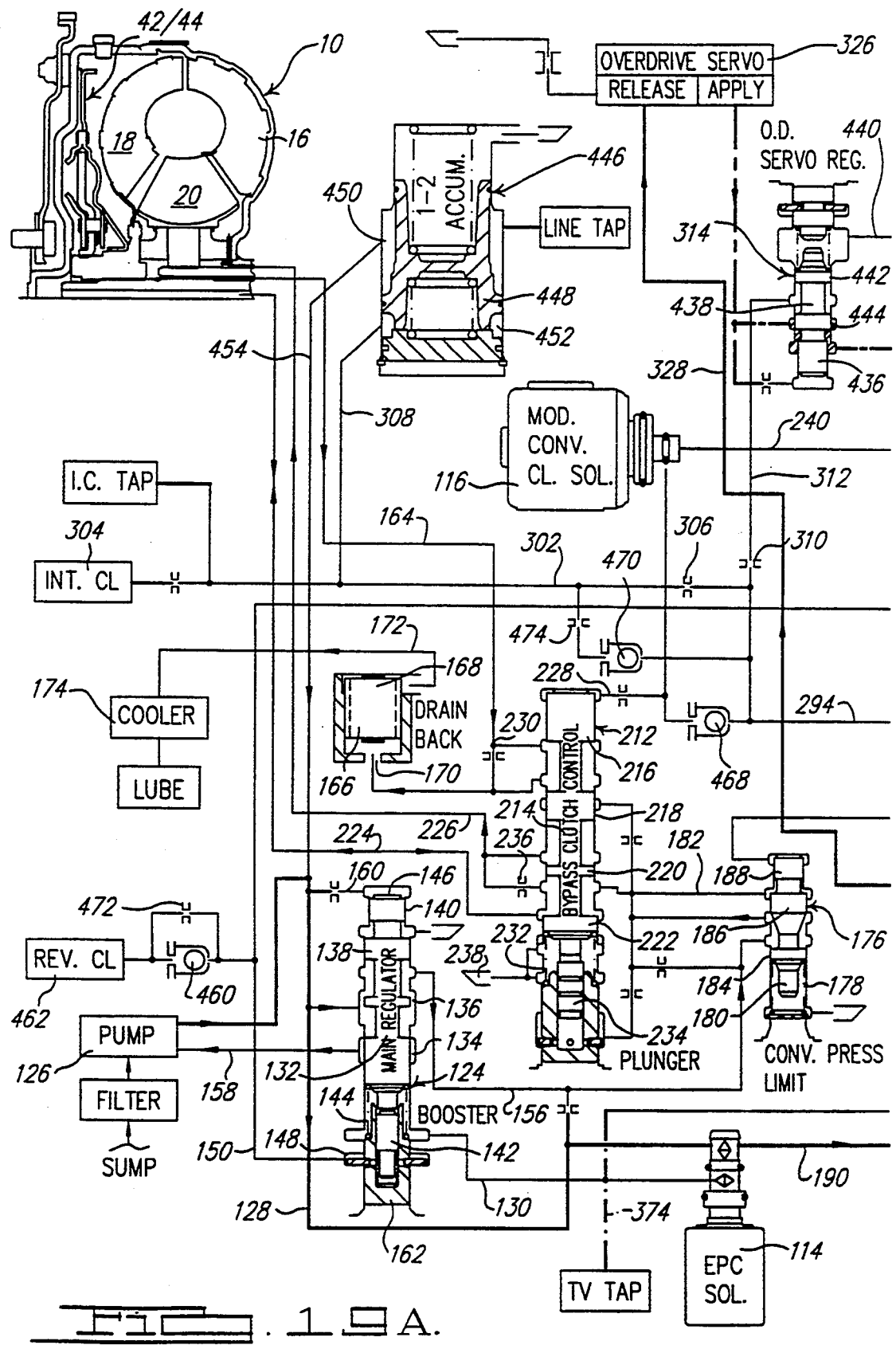
FIGS. 19A and 19B show a schematic valve diagram with the valve elements in the positions they assume during overdrive operation with the vehicle coasting during a 4–3 downshift and with a closed throttle.
Figure 19B:
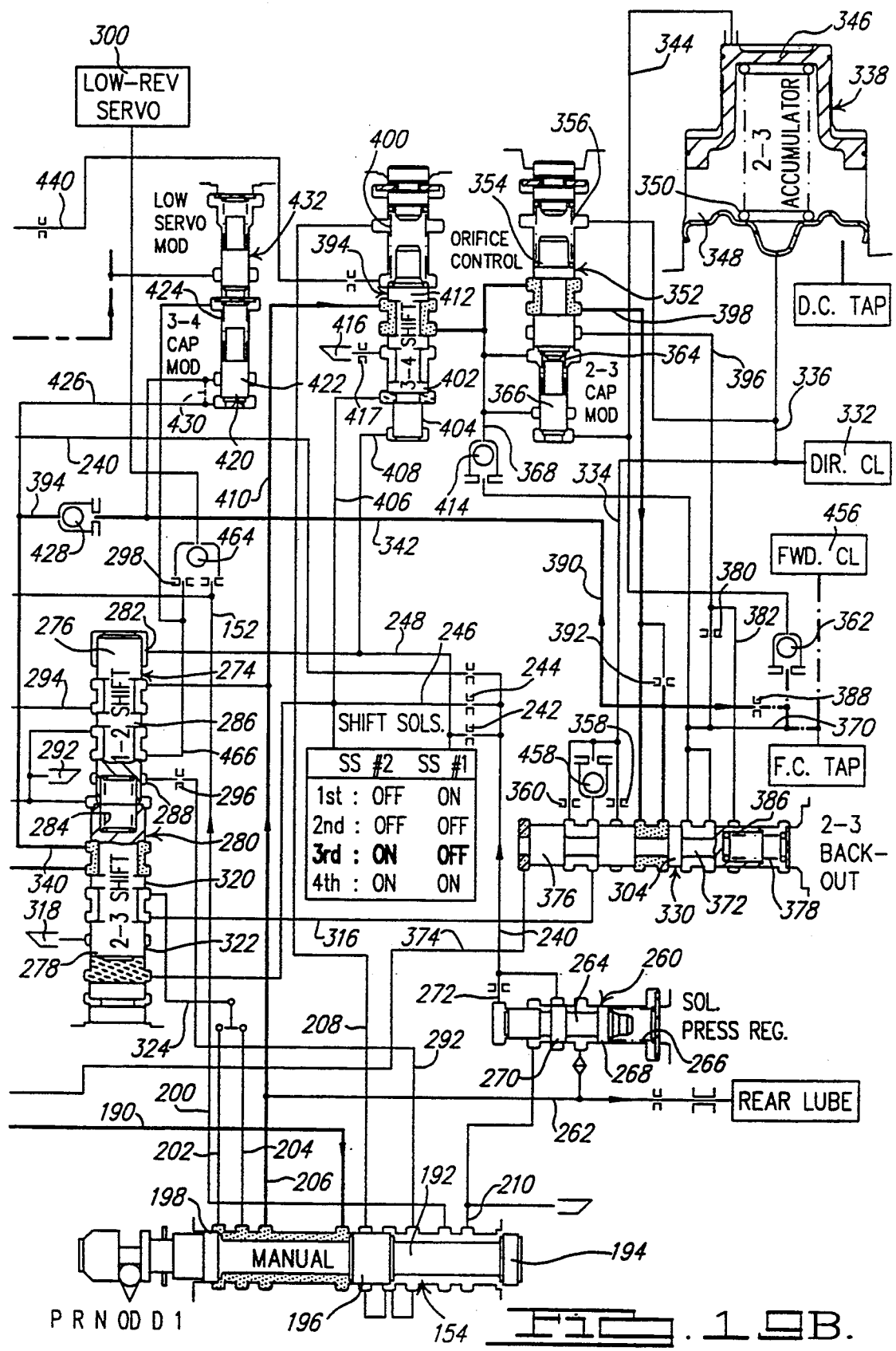

FIGS. 19A and 19B show the valves in the positions they assume during overdrive operation as a 4-3 coasting downshift occurs with a closed throttle. The back-out valve 330 assumes a left-hand position as explained previously because the electronic pressure control solenoid valve output pressure is a minimum at that time. The 3-4 shift valve moves downward because shift solenoid SS1 is deactivated and the remaining pressure at the lower end of the 3-4 shift valve is supplied from the shift solenoid SS2 is insufficient to overcome the force of the valve spring 400. This makes pressure available from the manual valve to the forward clutch through the orifice control valve and the 2–3 backout valve through orifice 388.

Figure 20A:
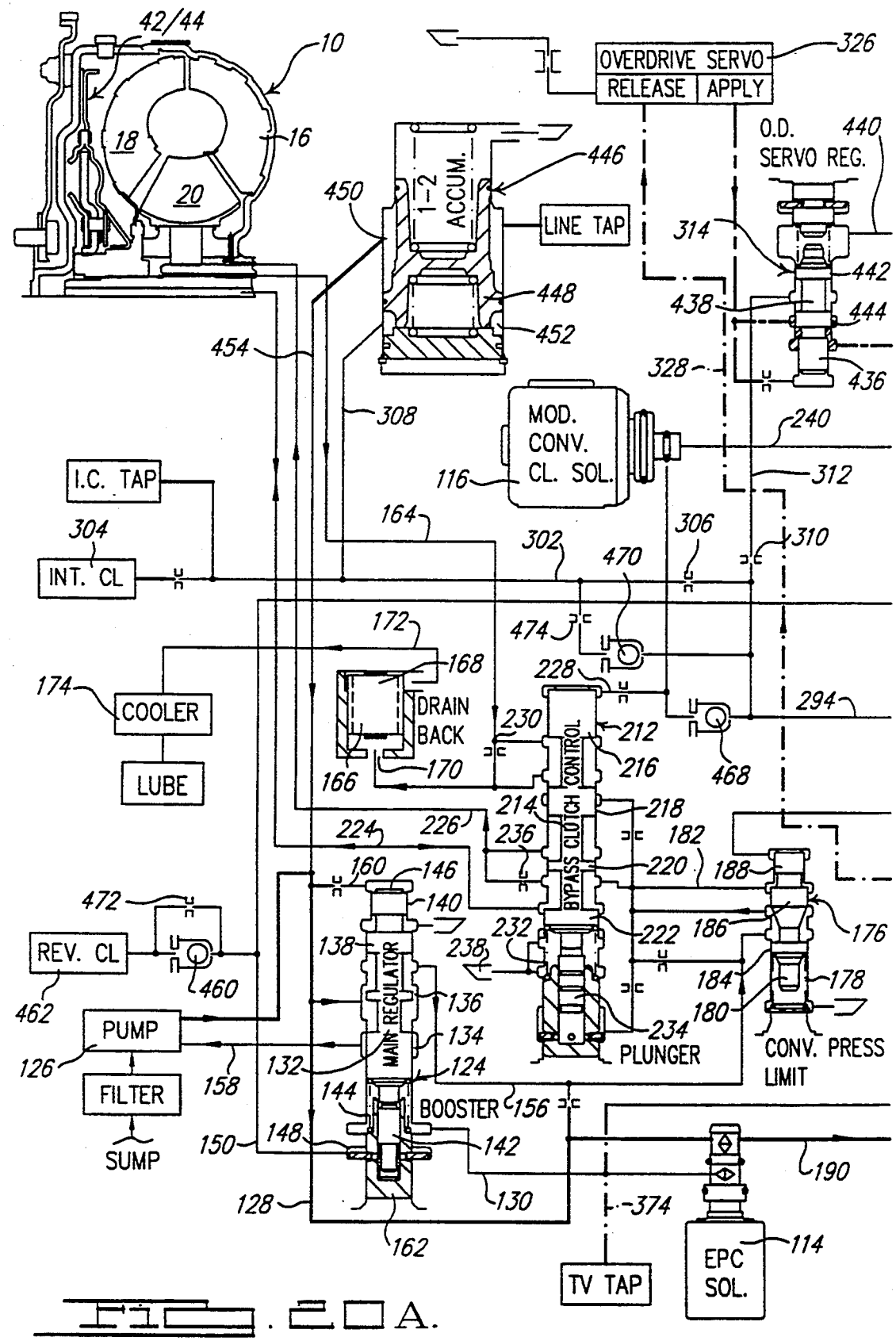
FIGS. 20A and 20B show a schematic valve diagram with the valve elements in the positions they assume during a 4–3 part throttle downshift in the overdrive operating mode.
Figure 20B:
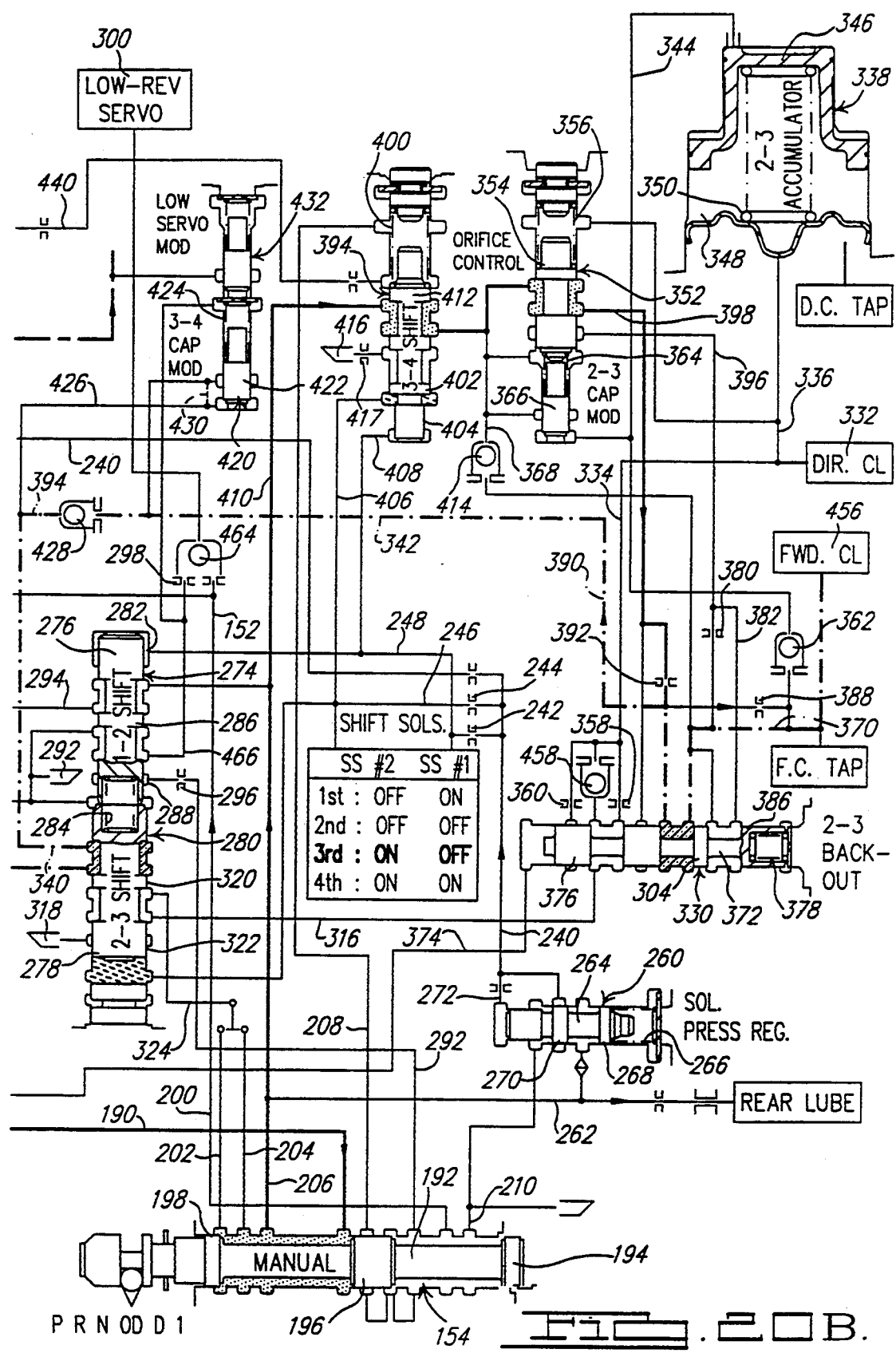

FIGS. 20A and 20B show the valve elements in the positions they assume when the manual lever is in the overdrive position and a 4–3 downshift is occurring with part throttle. The overdrive servo regulator valve 314 cushions a 4–3 downshift with part throttle. The overdrive servo regulator valve is a simple regulator valve that modifies the pressure delivered to the apply side of the overdrive servo. The magnitude of the modification depends upon the spring force for the regulator valve spool 438.

Figure 21A:
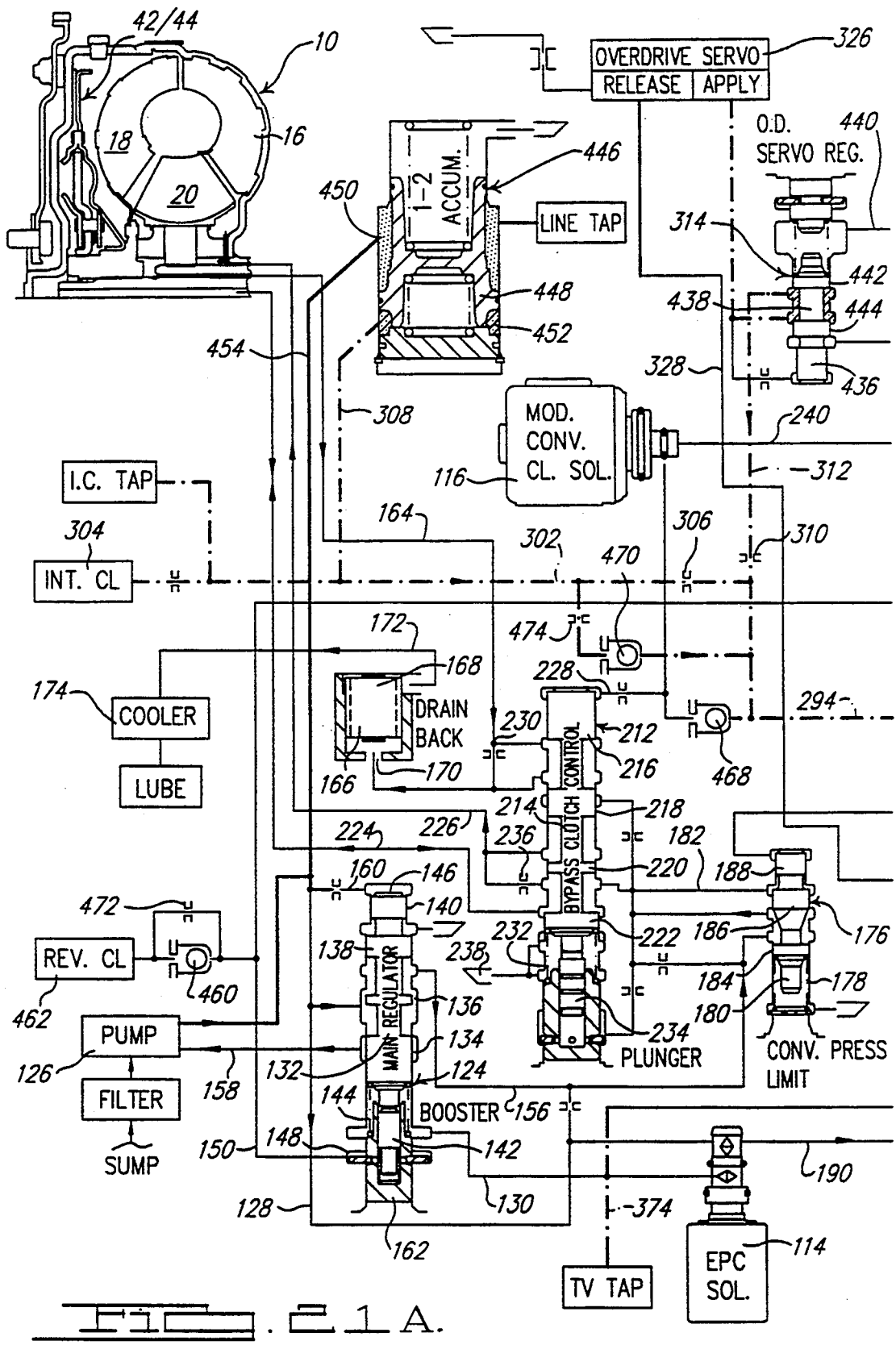
FIGS. 21A and 21B show a schematic valve diagram with the valve elements in the positions they assume during a 2–1 closed throttle downshift in the overdrive operating mode.
Figure 21B:
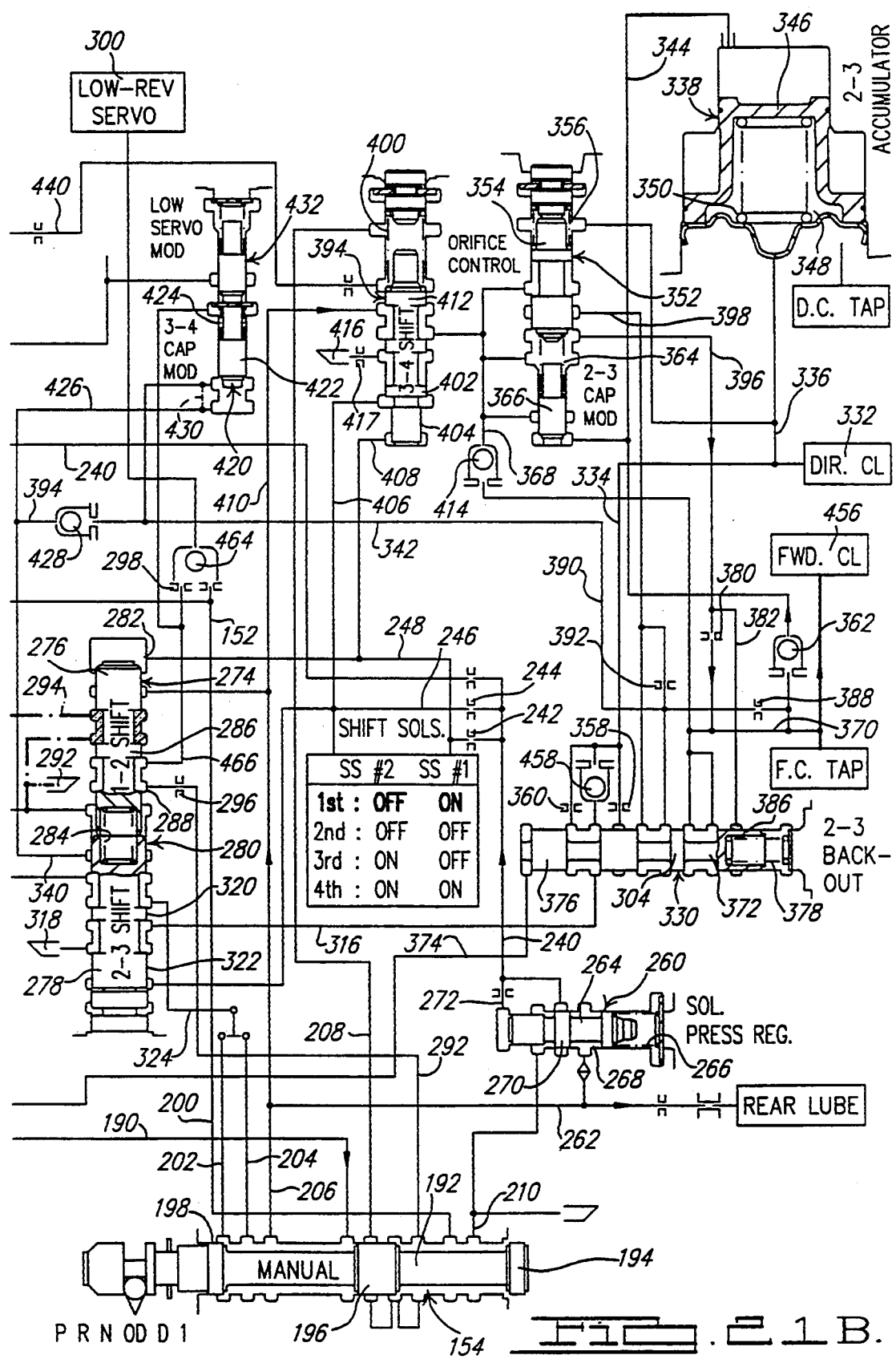

FIGS. 21A and 21B show a valve diagram with the valves in the positions they assume when the transmission is in the overdrive range and a 2–1 downshift is occurring with closed throttle. At this time, shift solenoid SS2 is off and shift solenoid SS1 is on. Thus, the 1–2 shift valve is forced downward. That keeps the 2–3 shift valve downward also. Since both sides of the overdrive servo are pressurized, the servo is released. The backout valve is shifted in a left-hand direction, and forward clutch pressure is distributed through the backout valve to the forward clutch through orifice 380.

Figure 22B:
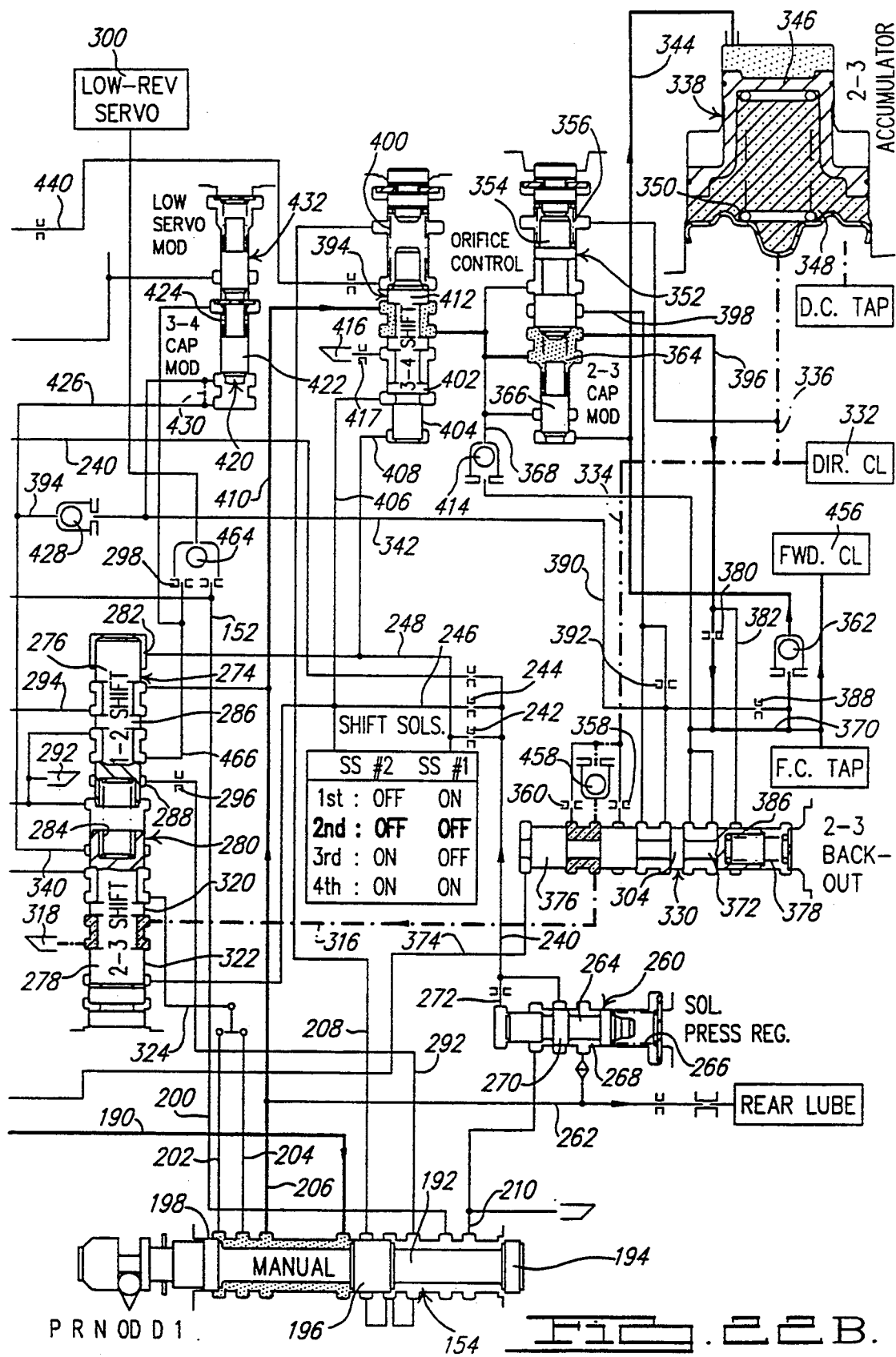

FIGS. 22A and 22B show a valve diagram with the valve elements in the positions they assume when the manual valve is in the overdrive range position and a 3–2 downshift is occurring with closed throttle. Manual valve pressure is distributed through the 3–4 shift valve, which assumes its downward position. Pressure then is distributed through the orifice control valve and to the forward clutch through the orifice 380. The direct clutch is exhausted, as is the lower chamber of the 2–3 accumulator, through passage 316, through the 2–3 shift valve and through exhaust orifice 318.

The EPC Solenoid Valve

FIG. 25 shows electronic pressure control solenoid valve 114. It includes a variable force solenoid actuator (VFS) and a movable valve spool 480 with two spaced valve lands 482 and 484. The valve spool is situated in valve chamber 485 and is biased in an upward direction by valve spring 486. Line pressure port 487, which receives regulated line pressure in passage 190 from the main regulator valve, communicates with solenoid valve output pressure line 130 through the space between the lands 482 and 484 and through output port 489. Land 484 controls the degree of communication between passage ports 487 and 489. Pressure in port 487 is transmitted to the upper side of land 482 through orifice 491 and through central passage 493.

Solenoid windings 488 of the variable force solenoid actuator surround solenoid armature 490. A valve spring 492 is located in a central opening of the armature and biases the armature in a downward direction. It is seated on the spring seat 494 secured to the solenoid housing. The armature is surrounded by flux washer 495.

When the solenoid windings are energized, the armature is moved upward against the force of pilot spring 492. This decreases the seating force of the poppet valve (on the bottom of the armature) against the poppet seat port 497 adjacent the bottom of the armature. This then decreases the restriction of port 497 and results in a shifting movement of the valve spool 480, thereby restricting communication between passages 190 and 130 and increasing the degree of communication between passage port 489 and an exhaust port shown at 498. Port 498 is in direct communication with the upper side of port 497. Land 484 registers with port 487 communicating with passage 190 and land 482 registers with the exhaust port 498.

A minimum current in the solenoid, which is commanded by the processor, will result in a maximum pressure output signal in passage 130. A maximum current in the solenoid will result in a minimum signal pressure in passage 130. This results in a reduction in line pressure.

Modulated Converter Clutch Solenoid Valve

FIG. 26 shows the modulated converter clutch control solenoid valve 118. It receives a regulated input pressure from the solenoid regulator valve through passage 240. It distributes a variable output pressure to the converter bypass clutch control valve-through passage 228.

The solenoid valve 118 includes a housing 498 which receives ball valve element 500 located in valve chamber 502 formed in the housing 498.

Unlike the electronic pressure control solenoid valve of FIG. 25, which is a variable force solenoid with an integral valve spool, the modulated converter clutch control solenoid of FIG. 26 is a pulse-width modulated (PWM) solenoid having an armature 504 that engages ball valve 500. Ball valve 500 seats on a valve seat 506. The armature 504, when it is actuated in a downward direction, unseats the ball valve element thus providing controlled communication between passages 228 and 240. Passage 228 communicates with the upper side of the ball valve control orifice.

The solenoid is capable of operating at zero duty cycle when the ball valve is closed, which causes the bypass clutch to be off. When it is operated with 100% duty cycle, the ball valve is fully open and the pressure in passage 228 equals the pressure in passage 240. Controlled slip of the clutch is achieved when the duty cycle is between 0 and 100%.

Solenoid windings 508 surround the armature 504. When the windings are energized, the armature 504 moves downwardly thereby causing armature extension 510 to unseat the valve 500. The extension 500 is movably positioned in valve guide sleeve 512. Electrical connector 514 provides the connection between the voltage source and the solenoid windings.

FIG. 23 is a chart that summarizes the engagement and the release patterns for effecting ratio changes as the shift solenoids SS1 and SS2 are turned on and off. A separate chart section is provided for each manual valve position; i.e., OD, D, manual low and reverse. It should be noted that it is necessary only to change the state of a single solenoid in order to effect a ratio change between adjacent ratios during operation in any of the drive ranges selected by the manual valve. For example, when the manual valve is in the overdrive position, a ratio change from the first ratio to the second ratio is achieved merely by changing the state of shift solenoid SS1 from on to off. The state of solenoid SS2 remains unchanged. Similarly, a ratio change from the second ratio to the third ratio or from the third ratio to the second ratio is effected merely by changing the state of solenoid SS2 while the state of solenoid SS1 remains unchanged. Ratio changes between the third ratio and the fourth ratio are obtained merely by changing the state of solenoid SS1 while the state of solenoid SS2 remains unchanged. This characteristic makes it unnecessary to synchronize the actuation or deactivation of one solenoid with respect to the activation or deactivation of the other solenoid. This simplifies the calibration of the transmission and improves the reliability of the control system.

FIG. 24 shows the shift schedules for a preferred embodiment of the transmission. The shift schedules, which are stored in ROM, are illustrated in the chart of FIG. 24 by plotting throttle opening for the engine versus vehicle speed for each ratio change. A separate chart is shown for upshifts and downshifts between the first and second ratios, for the upshifts and downshifts between the second and third ratios and the upshifts and downshifts between the third and fourth ratios.

The information of FIG. 24 is stored in the ROM portion of the microprocessor memory and is fetched from memory in response to the throttle position and vehicle speed signals received by the microprocessor. For any given vehicle speed and throttle opening, a shift will be indicated in accordance with the schedule of FIG. 24. The processor then will develop an output signal that is distributed to the shift solenoids SS1 and SS2 to effect the appropriate ratio change to satisfy the correct vehicle speed and throttle opening.

It should be noted that during fourth ratio operation, both solenoids SS1 and SS2 are on. Thus, leakage is avoided through the shift solenoids during the majority of the operating time when the transmission is in the fourth ratio. Further, as previously discussed, the ratio changes between adjacent ratios requires only activation or deactivation of a single shift solenoid, thus eliminating the need for providing synchronous operation of the shift solenoids. The response time that results from this is very short and the shift valve movement is precise. As soon as the shift command is issued, an immediate response of the shift valve to the change of state of the shift solenoid will occur. For example, on a 4-3 downshift, when the shift solenoid SS1 goes off, fluid flow immediately passes from the shift solenoid pressure passage 408 through the shift solenoid SS1. The orifice 242 associated with the shift solenoid SS1 has limited flow capability. That limited flow capability will not delay a shift of the 3-4 shift valve in a downward direction. The same is true for orifice 244 on a 3-2 downshift when the shift solenoid SS2 is turned off. The exhaust of fluid from passage 246 will not be delayed because of the limited flow capability of orifice 244.

The response time is most important in a 4-3 downshift and a 3-2 downshift and the circuitry is fastest in those shifts. The solenoids have ample capacity to displace fluid to exhaust.

On every downshift, except the 2-1 downshift, the strategy commands the associated shift solenoid to be turned off. This results in a rapid fall-off of the solenoid pressure and a quick response of the shift valve movement.

The 3-4 shift valve is hydraulically connected directly to the manual valve. Thus, when the manual valve is moved from the OD position, line pressure is sent through passage 108 directly to the top of the 3-4 shift valve spool 412. This forces the 3-4 shift valve to assume its downshift position regardless of the solenoid state and regardless of whether pressure exists in passages 408 or 406. Since this is the case, the forward clutch will be being pressurized in all instances when the manual valve is pulled out of the OD position to another forward motion position because the resulting downshift movement of the 3-4 shift valve element 412 will directly connect line pressure passage 410 to the forward clutch through passage 370. The forward clutch is an important clutch to be maintained in an applied condition in the event of a failure since it is needed for first, second and third ratios.

When the 3-4 shift valve is forced to its downshift position as the manual valve is pulled from the OD position, the pressure made available to the 3-4 shift valve through passage 108 is distributed also to the top of the overdrive servo regulator valve through passage 440 as explained. This will insure that the overdrive servo apply pressure will be at a maximum valve. Thus, the regulating action of the overdrive servo regulator is overruled under these conditions.

Control Circuit Components

Shown in FIG. 22C is an exploded view of the cast valve body and associated components. The main valve body, shown at 516, comprises multiple cavities and valve bores for accommodating the valve elements described with reference to FIG. 4. It is a die casting with channels that conduct oil from one location in the valve system to the other. The channels are cast within the valve body during a die casting operation.

The valve body is covered with a cover plate 518 on one side thereof and by another cover plate 522 on the opposite side thereof. A gasket 532 is situated between the cover plate 522 and the surface of the main transmission casting to which the valve body is secured. A second gasket 530 is between cover plate 518 and the valve body 516. A transmission oil pan 524 covers the assembly and is bolted to the main transmission housing.

Dowel bolts 526 and 528 align and cover plate 518 and its gasket 530 to the valve body 516 and, during assembly, align gasket 520 and plate 522 to valve body 516. The dowel bolts also align the main control assembly to the housing casting.

In FIG. 22D there is shown a plan view of the subassembly after the cover plate 518 is bolted to the main valve body 516 by the dowel bolts 526 and 528.

FIG. 22F is a side view of the subassembly of FIG. 22D. It shows the main valve body 516 and cover plates 518 and 522. Gasket 530 is seen located between the cover plate 518 and the valve body 516. Similarly, gasket 520 is seen located between the cover plate 522 and the valve body 516.

When the dowel bolts are assembled, a dowel pin extension of the bolts protrudes through dowel openings in the cover plate 522 and in the gasket 520. In the case of bolt 528, which is shown in FIG. 22E, the dowel pin extension is indicated at 534. These dowel pin extensions are adapted to be received in dowel openings formed in the lower portion of the transmission housing against which the cast valve body 516 is assembled.

The dowel bolt 528 is illustrated in detail in FIG. 22E. It includes a threaded shank 536, which is threadably received in a threaded opening formed in the cast valve body. The bolt head 538 clamps the cover plate 518 and the gasket 530 on one side of the valve body. The dowel pin extension 534 is adapted to be received in dowel openings formed in the gasket 520 and the cover plate 522 located on the opposite side of the valve body.

The dowel opening in cover plate 518 shown in FIG. 22D through which the associated dowel pin extension extends is elongated in the direction of the major axis of the valve body. The opening in the direction of the major axis is greater than the diameter of the dowel pin extension and the width of the opening in the direction of the minor axis of the valve body, except for tolerance, is equal to the diameter of the dowel pin extension. On the other hand, the opening for the dowel pin extension for dowel bolt 528 is round and, except for tolerance, is equal in diameter to the diameter of the dowel pin extension.

The elongated opening for the dowel bolt 526 accommodates axial stack-up tolerances while permitting precise registry of the valve plate 518 at a precise location with respect to the valve body 516. Further, the dowel pin extensions 534 of the dowel bolts permit precise registry of the cover plate 522 and the gasket 520 to the valve body with respect to the pressure passages and also to the fluid conduits formed in the portion of the main transmission housing to which the valve body is assembled.

The shank portion 540 of the dowel pin 528 is provided with a diameter that, except for tolerances, matches the diameter of the cover plate of the valve assembly through which it extends.

Bypass Clutch Control

The modulated converter bypass clutch solenoid establishes a controlled slip in the converter as explained previously. To assist in the description of the improved bypass clutch strategy of the present invention, a known bypass clutch described in U.S. Pat. No. 5,029,087 now will be made. For a complete description of this known control strategy, reference may be made to U.S. Pat. No. 5,029,087. For purposes of the present description, however, reference will be made only to FIGS. 28 and 29 to explain, in general terms, the control strategy for achieving the necessary slip to accommodate the particular operating conditions that are detected by the engine and driveline sensors. This involves a determination of the desired slip indicated in the chart of FIG. 29 and comparing it to the actual slip that is measured by the sensors.

As explained previously, the actual slip is equal to the engine speed minus the turbine speed. The turbine speed, however, must be computed since there is no turbine speed sensor for the presently described embodiment of the invention. This is done by the processor by measuring output shaft speed and by correcting the output shaft speed by the gear ratio that happens to be present at any given instant. The difference between the desired slip and the actual slip is indicated as an error E for each of the times indicated in FIG. 29; for example, time T0, T1 and T2. This error is calculated during each background loop of the microprocessor.

As seen from FIG. 29, the error progressively decreases as the target valve for slip is approached. This target value is a value stored in the ROM portion of the microprocessor memory. Its value is fetched from memory in accordance with the normalized turbine speed that is computed as explained above, and with the normalized throttle position.

Figure 28:
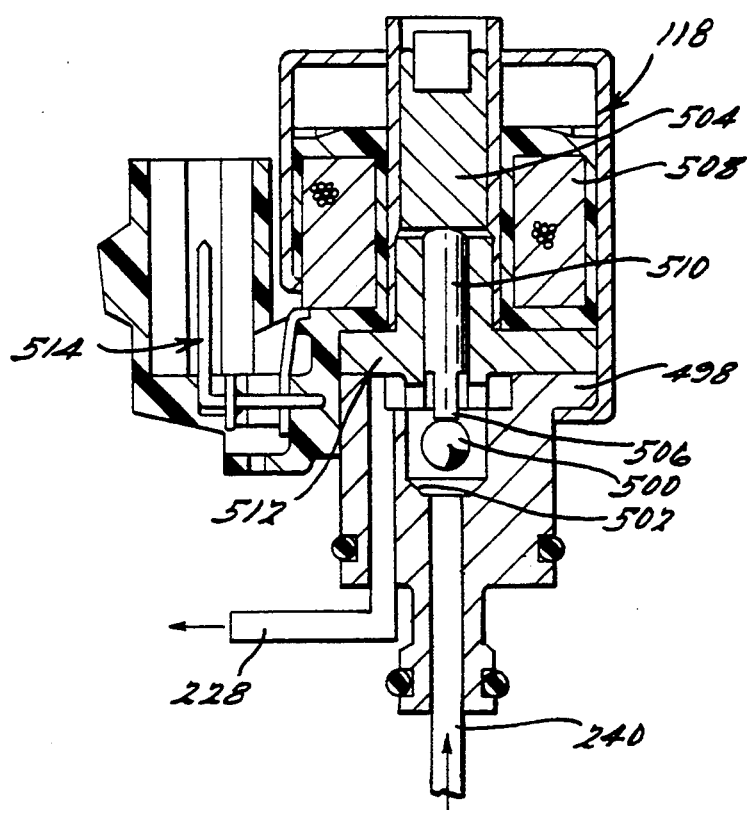
FIG. 28 is a flow chart showing a portion of the electronic control strategy for a prior art bypass clutch design.

The control strategy for determining desired slip is illustrated in the flow chart of FIG. 28. During the process of determining desired slip, the processor will sequence through the various stages of FIG. 28 following the setting of the desired slip equal to the absolute value for the converter slip. This is done as indicated at action block 542 of FIG. 28. The processor then determines which gear ratio is in place. If the gear ratio is greater than third gear, a command is issued to look at the table in memory where target slip is stored. This is done at step 545. The inquiry with respect to whether the gear ratio is greater than three is made at step 546. That target value, after having been placed in the target slip register, is used for purposes of determining desired slip. The desired slip is obtained using the equation:

Desired slip = Actual slip − (PCDEC "x") times (Actual slip − Target slip), where PCDEC "x" is the value that appears at 548, 550 or 552 in FIG. 28.

Referring again to FIG. 29, a plot is made of slip versus time. Curve 554 is a plot showing the actual slip versus time and plot 556 shows the desired slip versus time. Plot 556 is a result of the calculation described above using the three error values described previously; i.e. the error (E_T0) currently measured by the slip controller, the error (E_T1) determined in the previous background loop and the error (E_T2) determined in the second previous background loop. These error values are indicated in FIG. 29.

In FIG. 29, the target slip is indicated by the symbol T. The value of that target slip, as mentioned previously, is determined by the throttle angle and turbine speed that exist for any particular gear ratio. As mentioned previously, that information is obtained from a table in memory.

As seen in FIG. 29, the desired slip is calculated for each background loop so that the value of the absolute slip approaches asymptotically the value of the target slip T.

The procedure used to calculate desired slip is graphically illustrated in the flow chart in FIG. 28. The routine begins as mentioned previously at stage 542 where the value of the absolute slip is determined based upon the actual slip value. Having established an absolute slip value, the routine proceeds to stage 546 where as mentioned previously an inquiry is made with respect to the gear ratio that is determined by the gear ratio sensor. If the gear ratio is greater than the third ratio, the sequence proceeds to stage 544. If the ratio is the fourth ratio at that time, the appropriate stored value of the target slip is read from memory. On the other hand, if the gear ratio is that gear ratio corresponding to third gear, another target value is read at stage 545. That occurs if the inquiry at stage 546 is negative. In either case, the routine will proceed to stage 547, where an inquiry is made with respect to the gear ratio in place.

If the gear ratio is that gear ratio corresponding to fourth gear, the slip reduction factor PCDEC4 is stored in the temporary storage register as shown at stage 548. If the inquiry at stage 547 is negative, the routine proceeds to stage 549 where another inquiry is made to determine whether the gear ratio is that gear ratio corresponding to third gear. If the answer to that inquiry is positive, slip reduction factor PCDEC3 corresponding to that gear ratio is fetched from memory and stored in the temporary storage register as shown at stage 550. If the inquiry at stage 549 is negative, the routine proceeds to stage 551 where a determination is made as to whether the gear ratio is that gear ratio corresponding to second gear. If the answer to that inquiry is positive, a temporary holding register receives still another slip reduction factor PCDEC2 from memory. That stage is indicated at 552. If the inquiry at 551 is negative, the routine proceeds to stage 553 which causes the temporary holding register to receive a new data item (PCDEC1) from memory.

The routine then passes to the final stage 554 where a desired slip calculation takes place using the temporary register data in the formula previously described. In other words, desired slip is equal to the absolute slip minus a portion of the difference between the absolute slip and the target slip for the particular background loop in place. At the end of each background loop, the previous error $E_2$ is set equal to $E_1$ and the previous error $E_1$ is set equal to the current error $E_0$. This updates the information for each background loop so that a new error can be calculated for the next loop.

After the error is determined, the duty cycle is determined using the desired converter slip calculated in stage 554.

If the clutch is in the unlock mode, the duty cycle is zero. If the clutch is in the stroke mode, the duty cycle is adjusted as a function of the throttle position to provide insufficient hydraulic pressure to cause the clutch to continue to be disengaged, but such that any additional pressure will cause the clutch to engage. Thus, the clutch is maintained at a so-called incipient engaged (stroked) condition.

During the engage mode, however, the duty cycle calculation, using a closed loop technique, provides an incremental gain PID controller with information to adjust the pulse width modulated duty cycle to obtain the desired slip. This procedure starts with the absolute PID formulas:

Duty cycle output
$new = K_p(E_0) - K_d(E_0 - E_1)/T_o + K_i(E_0*T_o + E_1*T_1 \ldots + E_n*T_n)$ Duty cycle output
$old = K_p(E_1) + K_d(E_1 - E_2)/T_1 + K_i(E_1*T_{-1} + E_2*T_2 \ldots + E_n*T_n)$ In the equations above $E_0$ is the current error, $E_1$ is the previous error and $E_2$ is the second previous error. $T_0$ is the time of the current control loop between the current and the previous error readings, T1 is the time of the previous control loop between the previous and the second previous error readings. $T_2$ is the time between two successive earlier error readings. The constant $K_p$ is a proportional gain constant, the constant $K_d$ is a derivative gain constant and the constant $K_i$ a integral gain constant. The output change equals the output-new formula minus the output-old formula. That value is computed in accordance with the following formula:

Output-change
formula $= K_p(E_0 - E_1) + K_d[(E_0 - E_1)/T_0 + (E_2 - E_1)/T_1] - K_i*E_0T_0$ As mentioned previously, there are advantages in causing the desired slip for the bypass clutch to approach its target value quickly consistent with the ability of the bypass clutch to reduce or eliminate noise, vibration and harshness in the driveline, particularly inertia torque disturbances due to transient torque fluctuations. For this purpose, the desired slip determination for the present invention is different than the desired slip calculation described above with reference to the control strategy of U.S. Pat. No. 5,029,087. This will be explained first with reference to FIG. 26B, where slip is plotted against time in a manner similar to the plot of FIG. 29. It should be noted from FIG. 26B, however, that the desired slip, which is represented by the line shown at 556, is set equal to the absolute slip or actual slip at point 558. The absolute slip or actual slip is represented by the curve shown at 560. This corresponds to the curve 554 of FIG. 29.

The absolute slip, as mentioned earlier, is determined by the processor and is equal to the difference between the sensed engine speed and the turbine speed. The turbine speed, as mentioned earlier, is a speed determined by the processor by measuring output shaft speed and multiplying that output shaft speed value by the gear ratio that is in place at the instant the speed is measured. The transmission of FIGS. 1 and 2 does not have a turbine speed sensor, so this speed calculation must take place to achieve an accurate indication of converter slip.

The difference between the absolute slip and the desired slip during each background pass is indicated as an error. The error during a background pass or loop n is identified as error $E\_T_2$, which corresponds to error $E\_T_2$ of FIG. 29. The error for the next background pass or loop $n+1$ is identified as error $E\_T_1$, as in the case of FIG. 29. The error for the current background pass or loop $n+2$ is identified as $E\_T_0$, as in the case of FIG. 29. A duty cycle is calculated in the manner previously described corresponding to each of these computed errors during each control loop. This results in the decay of the absolute slip toward a target value T, seen in FIG. 29.

The desired slip is a computed value resulting in a ramped relationship as shown at 556. It intersects the target value T at point 562, seen in FIG. 26B. The ramped relationship shown at 556 is determined by a slip rate modifier or constant multiplied by the initial desired slip value indicated at 558. The magnitude of that modifier depends upon the gear ratio that is in place. For an understanding of this relationships reference now will be made to FIG. 26A which shows the control strategy flow chart for the desired slip determination. This is a PID closed loop clutch control.

Figure 26A:
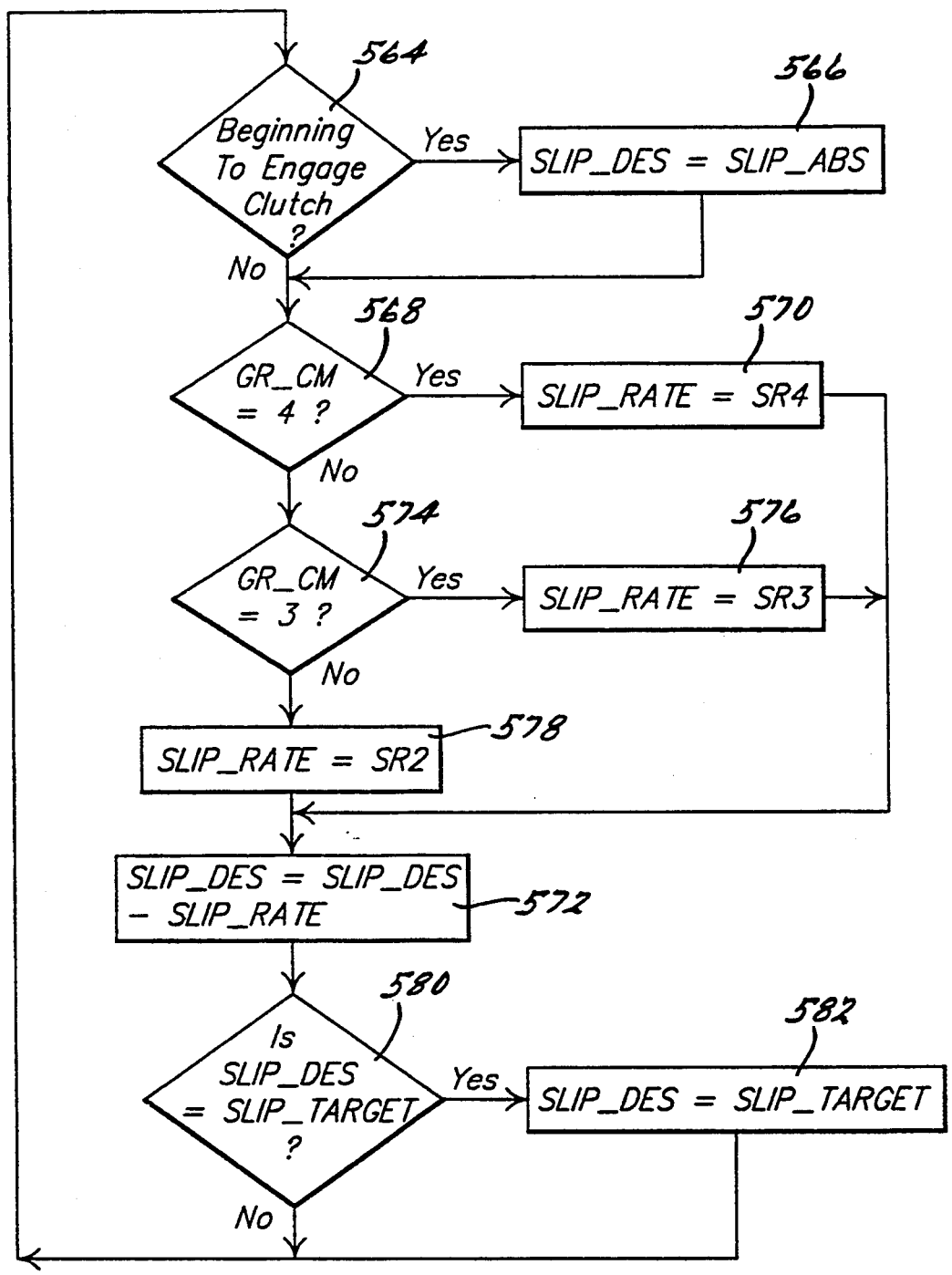
FIG. 26A is a flow diagram of the electronic control strategy for the torque converter bypass clutch during PID closed loop clutch control.

In FIG. 26A, the beginning of the slip desired determination strategy begins with an inquiry made at step 564. If the engage flag in the clutch control routine is on, the beginning of a clutch engagement is indicated. If the inquiry indicates that the clutch has begun to engage, the slip desired is set equal to the absolute slip as indicated at action block 566. After the slip desired is set equal to the absolute slip, as indicated at 558 in FIG. 26B, the routine will proceed to inquire at step 568 whether the gear ratio that has been commanded is fourth ratio. If the fourth gear ratio has been commanded, the routine will proceed to action block 570, where a slip rate factor for ramping the desired slip relationship is fetched from memory. This factor is called SR4 in FIG. 26A. The routine then will proceed to calculate a desired slip. The routine then proceeds to step 572 as earlier indicated.

Figure 26B:
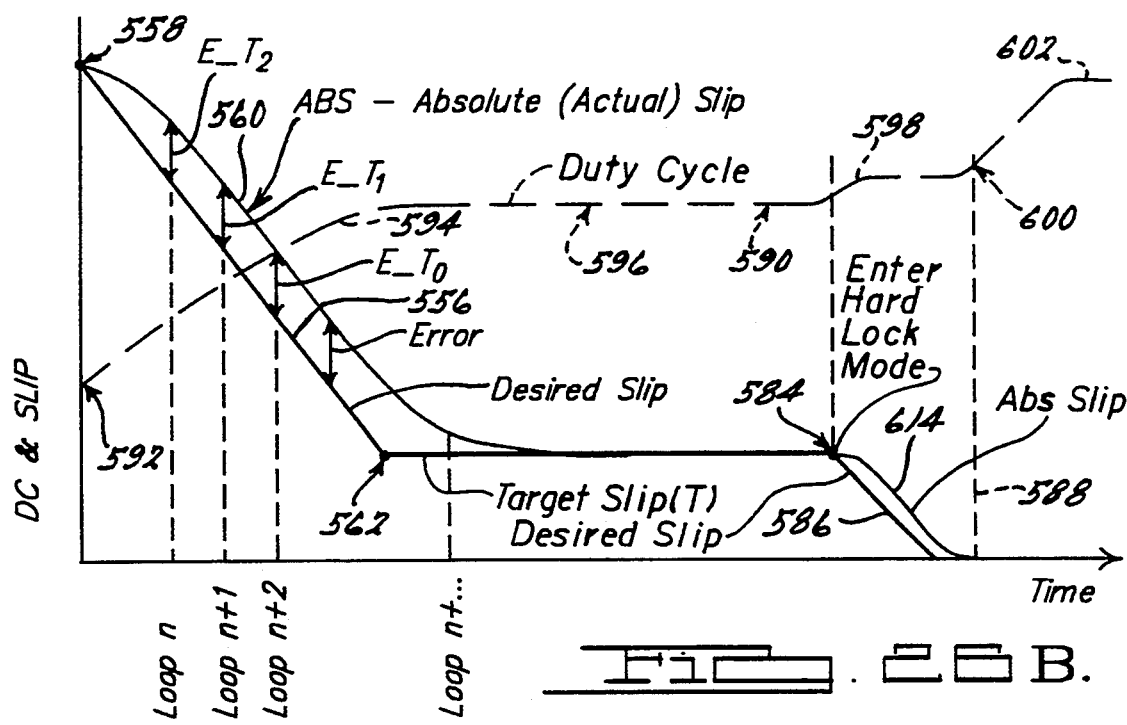
FIG. 26B is a chart showing the relationship between absolute slip, desired slip and target slip for the bypass clutch.

If the answer to the inquiry at step 574 is negative, the slip rate then is determined at action block 578 where a slip rate value SR2 is obtained. That value is consistent with the ramp that is appropriate for second gear ratio. There is no slip rate called out for the first ratio since the routine of FIG. 26B is not carried out for the first ratio. The converter acts only as an open converter during first ratio operation.

If the routine proceeds to action block 572, the desired slip is calculated by subtracting the desired slip value determined at action block 566 and subtracting the slip rate value located at either action block 570, action block 576, or action block 578, depending upon the gear ratio that is in place.

The routine then proceeds to action block 580 where an inquiry is made to determine whether the desired slip value has become equal to the target value T. That would indicate that the intersection point 562 of FIG. 26B has been reached. If the inquiry at 580 results in an affirmative answer, the desired slip at action block 582 is determined to be equal to target slip and no further decay in the desired slip is allowed. The routine then proceeds back to the beginning and the routine is repeated in the next background loop.

When the driveline variables have stabilized, a point will be reached at time value 584, shown in FIG. 26B, where a command is issued to enter a so-called "hardlock" operating mode. The need for maintaining a target slip is not deemed to be necessary after driveline stability is achieved.

When the processor detects that point 584 has been reached, the desired slip then will be ramped down as indicated at 586 in FIG. 26B. A ramp value appropriate for the hardlock condition is fetched from memory at that point and is used to establish the ramp slope for the line 586. The magnitude of the target slip T at the point 584 is multiplied by the hardlock modifier. The absolute slip after the hardlock mode has been initiated in this fashion is different than the desired slip line 586. As in the case described earlier with respect to absolute slip curve 560 and desired slip curve 556, the processor will determine during each background loop the difference between the absolute slip and the desired slip. The duty cycle then is determined for each background loop in the manner previously described. When the absolute slip reaches the target value at point 588, the clutch will be fully locked. This signals the processor to increase the magnitude of the duty cycle to 100%, thus causing the clutch to be fully engaged.

Shown at 590 in FIG. 26B is a duty cycle plot over time during the engagement routine for the bypass clutch. The duty cycle value for point 558 on the desired slip and absolute slip curves is indicated at 592. The magnitude of the duty cycle will gradually be increased for each error reading. This is done in the manner previously described. Thus, the duty cycle will increase as shown at 594 in FIG. 26B and will become relatively constant as shown at 596 after the absolute slip reaches the target value T.

When the hardlock mode is entered at point 584 in FIG. 26B, the processor will command a higher duty cycle as shown at 598. As in the case of the computation of duty cycle corresponding to absolute slip curve 560 and the desired slip relationship shown at 556, a duty cycle calculation is made for each error detected during each background pass, while the desired slip is ramping as shown at 586. This is done in the manner previously described with respect to ramp portion 556. The result of this duty cycle calculation is a decrease in the absolute slip until a zero slip value is reached at 588.

When the point 588 is reached, the processor commands an increase in the duty cycle as shown at 600 in FIG. 26B until a 100% duty cycle is reached as shown at 602.

FIG. 26E shows the electronic control strategy for the hardlock mode in flow diagram form. At the beginning of the hardlock mode, upon entering stage 584, the processor, as it continuously monitors speed ratio, will determine whether a target slip of zero has been reached. This is done at step 604. If the processor detects that the slip target has not been reached, the routine will proceed directly to action block 606 where the closed-loop PID control is continued. In the next background loop, the test for target slip again is made at step 604. If the inquiry at step 604 finally is positive, an inquiry then is made at step 608 to determine whether a shift is taking place. If a shift indeed is taking place, the routine will proceed to action block 610 where entry into the hardlock mode is inhibited. If a shift is not taking place, the routine will proceed to action block 612 where the slip is controlled, as described previously with reference to the absolute slip curve 614 in FIG. 26B and with reference to desired curve ramp 586. That would indicate that the point 588 has not yet been reached.

An inquiry then is made at step 616 to determine whether the absolute slip has finally stabilized at the zero slip line. If it has not, the routine then will return as shown in FIG. 26E to action block 612, where the closed loop PID control continues.

If the slip finally has stabilized at zero, the routine proceeds to action block 618 and fetches from memory a multiplier for the duty cycle so that the duty cycle is increased to 100% as indicated at 602.

Figure 26C:
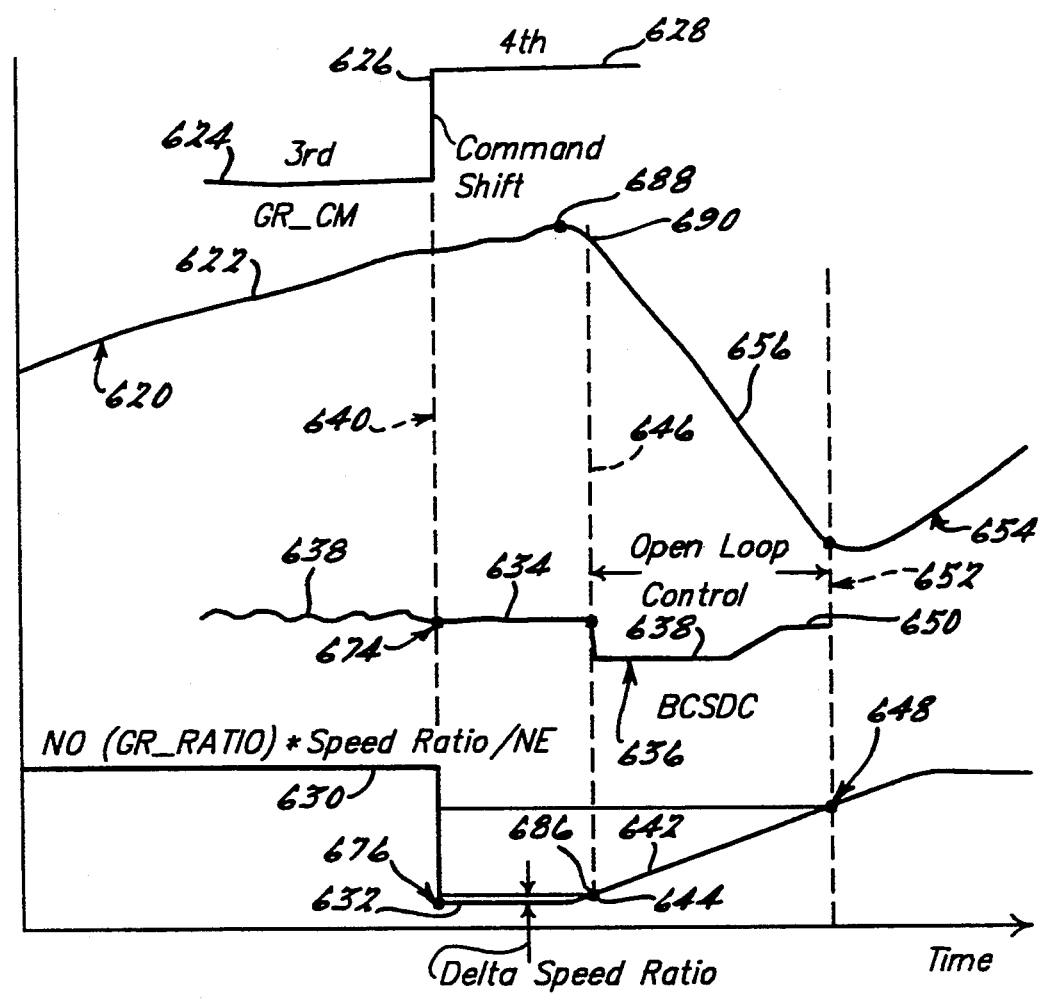
FIG. 26C is a chart that illustrates the relationship between duty cycle for the electronic modulated converter clutch control solenoid valve, engine speed and speed ratio during a ratio shift.
Figure 28D:
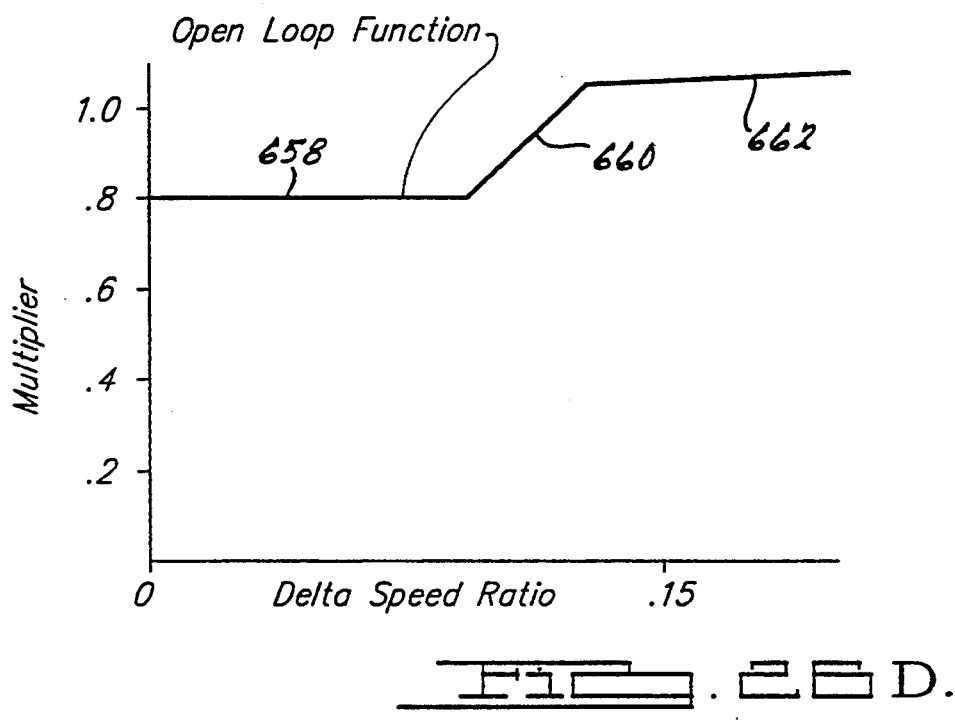
Figure 28E:
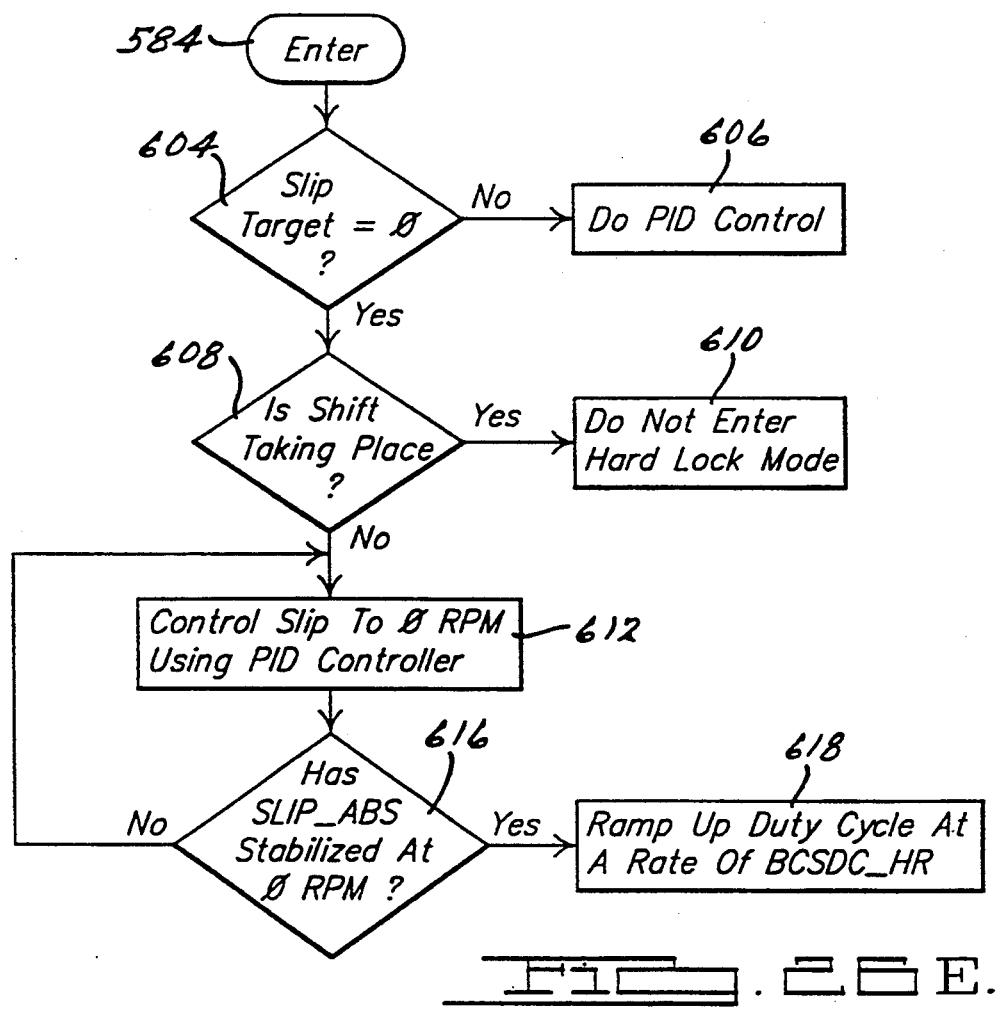
Figure 28:
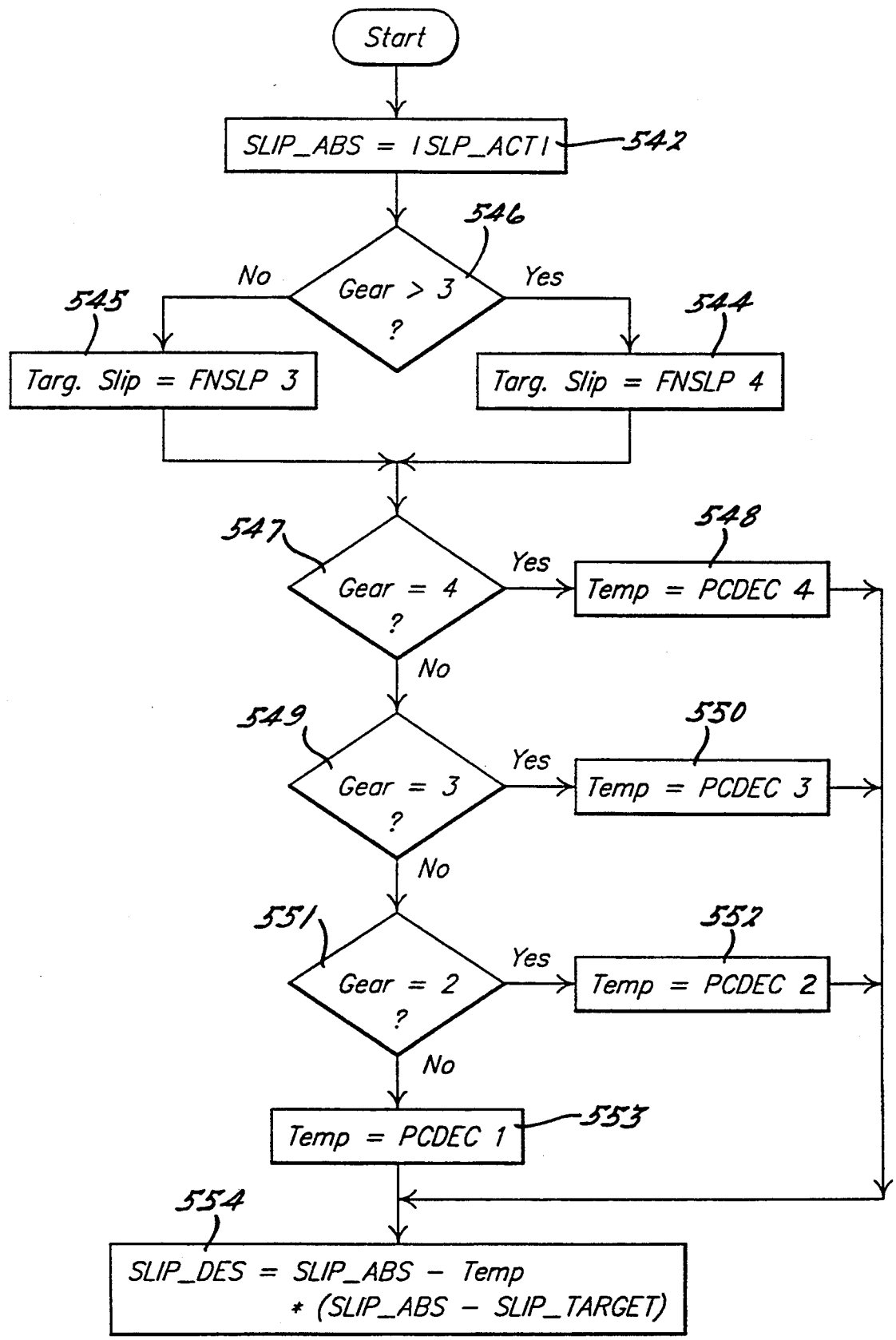

The behavior of the clutch during shifts can be described best with reference to FIG. 26C. As mentioned earlier, the transmission described here does not include a turbine speed sensor. Thus, it is necessary to determine the turbine speed by taking into consideration the gear ratio that is in place at the instant a slip measurement is made. In the plot of FIG. 26C, engine speed is plotted as shown at 620. During the period of acceleration of the vehicle, the engine speed rises. If it is assumed that the vehicle is in third gear, the vehicle speed will increase gradually as indicated by the rising portion 622 of the speed curve 620. The gear command value is designated at 624. At time 626, a command is made to shift the transmission from third ratio to fourth ratio.

As indicated by shift command line 628, the speed ratio across the converter continuously is monitored. The speed ratio value at a time prior to the commanding of the shift at 626 is indicated at 630. The speed ratio in the particular case of a transmission that does not have a turbine speed sensor is determined by multiplying the output shaft speed by the gear ratio in place, divided by engine speed. When a shift from the third ratio to the fourth ratio is commanded at time 626, the speed ratio that is monitored drops from a value shown at 630 to a value shown at 632 in FIG. 26C. At that time, the duty cycle is frozen or conditioned for an unchanging output as indicated at 634. The duty cycle for the modulated converter clutch solenoid valve is plotted as shown at 636. At a time prior to the commanding of the shift at time 626, the duty cycle fluctuates as shown by the wavy line 638. The duty cycle remains constant, however, in the freeze zone 634.

The shift actually will begin at a time 640 following the command at 626. The beginning of the shift is indicated when a delta speed ratio 642 is detected by the speed sensors. Actually, the beginning of the Shift will occur slightly in advance of point 644 in FIG. 26C. The achievement of the delta speed ratio will confirm that a shift actually has begun. After that confirmation is made, the open-loop control technique described earlier will begin at time 646.

The beginning of the open-loop control coincides with a flag that instructs the pointer for the microprocessor to fetch from memory a multiplier for the duty cycle. That multiplier is a value less than unity. When the duty cycle value 634 is multiplied by the multiplier, the effective duty cycle decreases as shown at 638.

The speed ratio, which as mentioned earlier, is continuously monitored, will detect an increased delta speed ratio. When that delta speed ratio is large enough to indicate that the shift is ended, as shown at point 648 in FIG. 26C, the duty cycle is increased to a value substantially the same as the value that existed at 634. This is indicated at 650.

At time 652, following the completion of the shift, the controller will return to the closed-loop PID control and initialize again the PID closed-loop control strategy discussed earlier. Following the completion of the shift, the engine speed again rises in normal fashion as vehicle acceleration continues. This is shown at 654. Between the time at 640 when the shift begins and the time at 652 when the shift ends, the engine speed decreases at indicated at 656.

Shown in FIG. 26D is a chart of data showing data stored in memory which refers to the open loop function that begins at 640 in FIG. 26C which is the time the shift ends at 652 in FIG. 26C. The delta speed ratio, which is obtained by continuously monitoring the engine speed and the output shaft speed, is plotted on the horizontal axis and duty cycle multipliers are plotted on the vertical axis in FIG. 26D. At the beginning of the open loop control, the multiplier, in the example shown in FIG. 26D, is about 0.8. This is shown by the horizontal line 658. Later in the open loop control, as determined by expiration of a calibrated timer, the duty cycle is increased as shown in FIG. 26C, as higher multipliers are pulled from the ROM portion of the memory. This is shown at 660 in FIG. 26D. Finally, when the delta speed ratio reaches the point corresponding to point 648 in FIG. 26C, the multiplier is at a maximum value, as shown at 662 in FIG. 26D.

Figure 30:
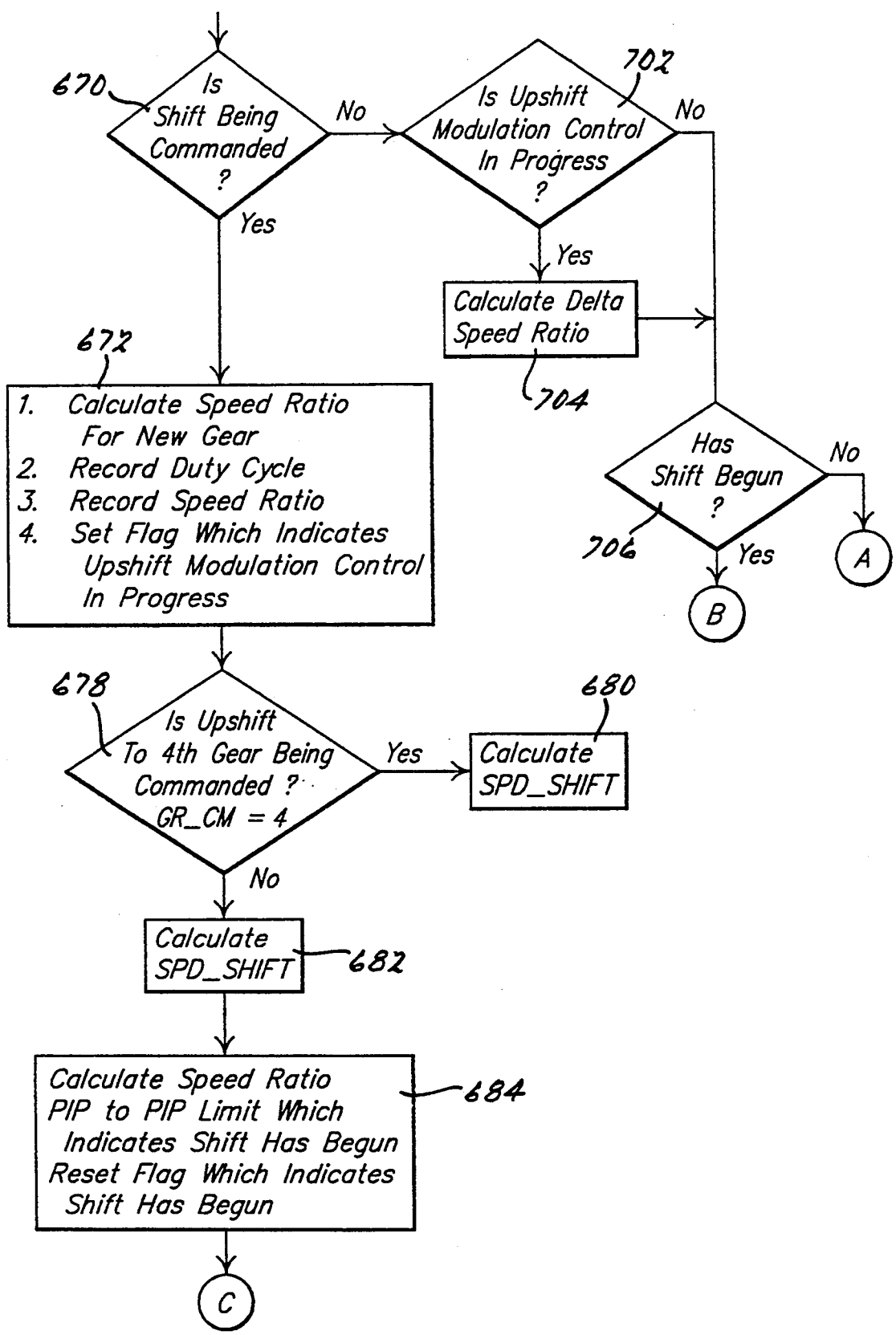
FIGS. 30 and 30A show a flow chart for the electronic control shift modulation logic for the bypass clutch of the present invention when the control system for the transmission is undergoing a ratio change.
Figure 30A:
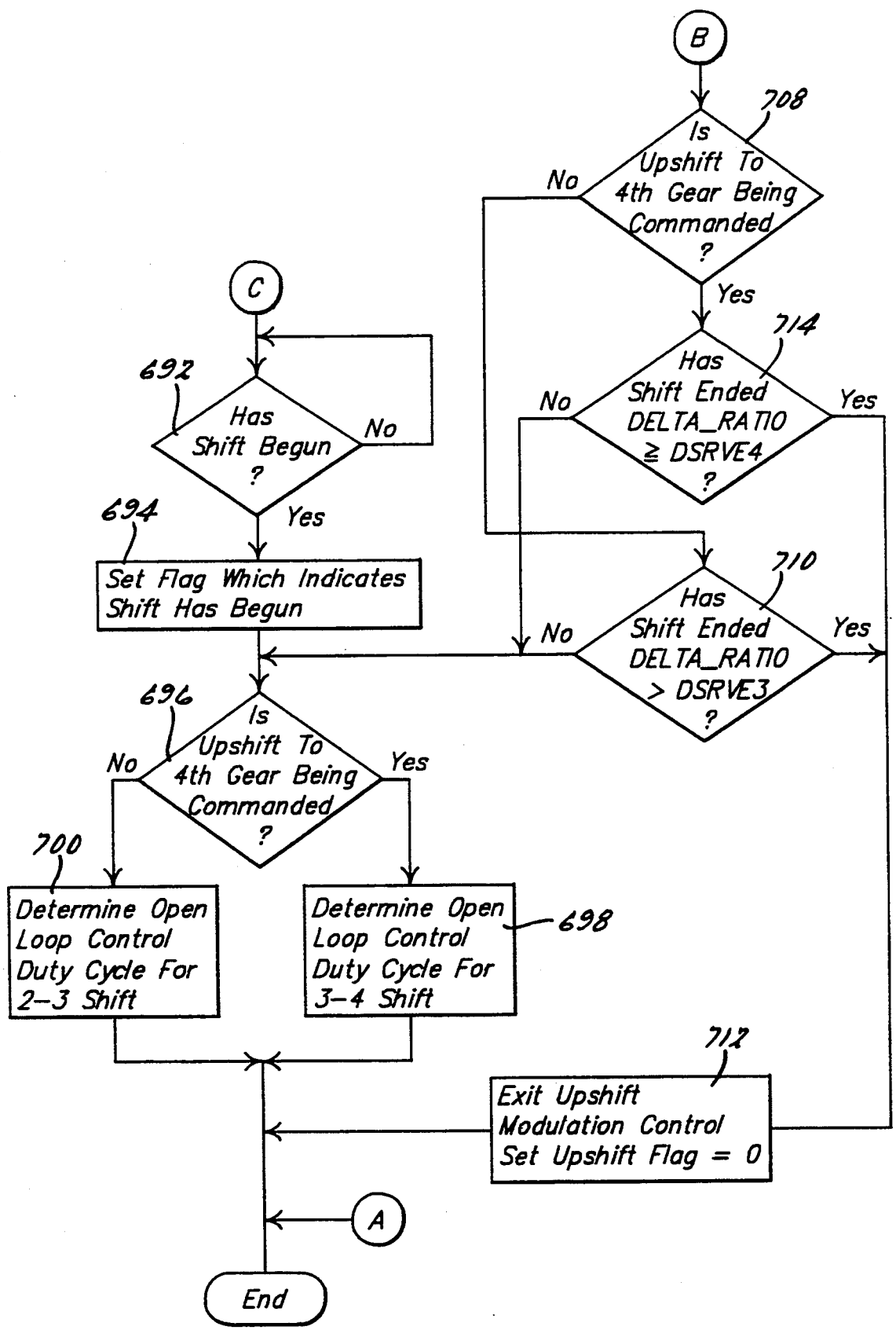

Shown in FIGS. 30 and 30A is a flow chart showing the shift modulation logic that occurs during a shift interval. This further explains the behavior of the clutch during the shift, which is graphically illustrated in FIG. 26C.

The logic of FIGS. 30 and 30A comprises a series of logic steps that are carried out by the processor during a background control loop. At the beginning of the control loop, the processor will determine at step 670 whether a shift has been commanded. In the case of the shift diagrammatically represented by the plot of FIG. 26C, the shift begins, as explained previously, at time 626. The shift in the case of FIG. 26C is a 3–4 upshift. After the command of the shift, the shift will occur later at time 640.

If it is determined at step 670 that a shift has been commanded, the processor will set a shift command flag and then proceed to step 672. The processor at step 672 will initiate four calculations, separately identified in FIG. 30 by numerals 1, 2, 3 and 4. In calculation 1 of step 672, the processor will calculate the speed ratio for the new gear. This is done by multiplying the filtered engine speed by the gear ratio that has been commanded divided by the engine speed at the instant the shift is commanded. In calculation 2 of step 672, the processor will record the duty cycle that exists at the time of the shift command. This is the duty cycle indicated at point 674 of FIG. 26C. Calculation 3 of step 672 calls for the processor to record, in temporary storage memory (RAM), the speed ratio at the instant the shift is commanded. This is the speed ratio indicated at point 676 of FIG. 26C. In calculation 4 of step 672, the processor will set a flag that indicates that the upshift modulation control is in progress.

The next step in the routine, as indicated at step 678, involves an inquiry as to whether the upshift that has been commanded is an upshift to the fourth ratio as in the case of FIG. 26C. If in fact the upshift commanded is a shift to the fourth ratio, the routine then will proceed to action block 680 of FIG. 30 where a calculation is made to determine the speed ratio that must exist to provide an indication that the shift is complete. This value, after being calculated, is stored in RAM for future reference. If in fact the inquiry at step 678 is negative, the routine will proceed to action block 682 where a similar calculation is made to determine the speed ratio that would indicated that the upshift is complete.

If the upshift is not a shift to fourth, then the upshift, as seen in action block 682, is an upshift to third. In the calculations at step 680 or at step 682, use is made of calibration constants that are fetched from memory depending upon the gear ratio that is involved in the upshift. A different constant is established for each gear ratio. In either case, the speed ratio that would indicate that the shift has begun equals the speed ratio that exists at the beginning of the shift; namely, the speed ratio at point 676 in FIG. 26C in the case of a 3–4 upshift, times the calibration constant appropriate for that upshift.

Following the calculation at step 682, the routine will proceed to step 684 where a calculation is made of the speed ratio that would indicate that the shift has begun. This is done by assuming that the speed ratio is at the value at point 676. That value is determined by the software to be the new speed ratio, even though the shift has not yet occurred. Simultaneously, the duty cycle has been frozen, as indicated at 634 in FIG. 26C, beginning at point 674. Since the duty cycle is frozen and since the speed ratio is assumed to be that ratio indicated at point 676 in FIG. 26C, the only variable that can effect a change in speed ratio is a change in engine speed. This is indicated in FIG. 26C where the engine speed changes from the value at 688 to the value at 690. When the value at 690 is reached, a delta speed ratio, indicated in FIG. 26C, will equal a delta speed ratio stored in memory, which is a calibration constant.

As a result of the calculation of the speed ratio at point 686, the processor will reset the flag, which will indicate that the shift has begun. The routine then will proceed to make an inquiry at step 692 of FIG. 30A as to whether the shift actually has begun. If it has not actually begun, the routine will return, as shown at 694, to the beginning and the inquiry is repeated. This occurs during a one millisecond repeater or interrupt loop. This is a foreground control loop that is carried out during the longer background loop, which may be about 40 milliseconds. The inquiry at 692 will be made repetitively until a confirmation is reached that the shift has begun. The routine then will proceed to action block 694, which sets the flag to indicate that the shift has begun.

The next step in the routine occurs at 696 of FIG. 30A where a confirmation is made as to whether the upshift to fourth gear has been commanded. If it has, the duty cycle is calculated at action block 698 by calling from memory a multiplier constant from a table stored in memory corresponding to FIG. 26D where the delta speed ratio is plotted against a multiplier value. Initially, the multiplier may be about 0.8 as indicated in FIG. 26D. This results in a reduction in the duty cycle as shown at 636 in FIG. 26C. The magnitude of the duty cycle in the open loop control portion of the shift is determined by the multiplier value since the duty cycle is calculated by multiplying the duty cycle at the start of the shift by the multiplier value. As indicated in FIG. 26D, the multiplier will increase as shown at 660. This results in an increase in the duty cycle as shown in FIG. 26C, until a duty cycle shown at 650 is reached.

If the inquiry at 696 is negative, that would indicate that a 2–3 upshift has been commanded rather than a 3–4 upshift. In that case, the routine will proceed to action block 700, rather than to action block 698. There a calculation occurs for a 2–3 upshift to determine the appropriate value for a duty cycle for open loop control. The magnitude of the multiplier for calculating the open loop duty cycle is different in the case of a 2–3 upshift than for a 3–4 upshift.

The shift is complete when the delta speed ratio is large enough to indicate the end of the shift, as shown at point 648 of FIG. 26C.

As indicated earlier, an inquiry is made at step 670 as to whether the shift is being commanded. If it is commanded, the four calculations indicated in action block 672 are carried out. This provides a "snapshot" of the variables that exist at the instant a shift is commanded. If the inquiry at 670 is negative, an inquiry is made at step 702 of FIG. 30 to determine whether the upshift modulation control is in progress. If it is, the routine will proceed to action block 704, where the delta speed ratio is calculated. The routine then will return to step 706 where an inquiry is made to determine whether the shift has begun by checking the state of the flag that was set at step 694. If that flag has not been set, the routine then will proceed to the next control module at the end of the routine in FIG. 30A. If the shift has in fact begun, the routine will make an inquiry at step 708 to determine whether the shift that has been commanded is an upshift to the fourth ratio. If it is not, the routine then will proceed to step 710 to determine whether the shift has ended. That is, it is determined whether the delta speed ratio is greater than the value indicated at points 648 of FIG. 26C. If it is greater than that value at point 648, the routine then will proceed to the exit at 712, where the upshift modulation control ends.

If the inquiry at step 708 is positive, again a test is made, as shown at 714, as to whether the shift has ended. This is done by determining whether the delta speed ratio is greater than the value indicated at 648. If that value is reached, the routine ends as discussed above. If it has not been reached, the routine then will return to the step 696 previously described where an inquiry again is made as to whether the upshift to the fourth gear is being commanded. If it is, the open loop control duty cycle is calculated as described previously. If it is not, a corresponding determination of open loop duty cycle for a 2–3 upshift is carried out at step 700 as previously described.

During tip-in or tip-out operation of the transmission, which occurs during a rapid advancement or a rapid relaxation of the engine throttle, a special tip-in, tip-out logic is used to decrement the bypass clutch duty cycle while the tip-in or tip-out is present. When the processor detects that a tip-in or a tip-out condition is in place, the PID control or the hardlock mode is temporarily suspended.

When the tip-in or tip-out condition is completed, a timer in the processor is used to control when the normal closed loop control function is resumed. The time that is calibrated for the closed loop control or the hardlock mode to return can be chosen as desired by appropriately calibrating the timer.

If the temperature sensor 110 of FIG. 3A indicates that the operating temperature is greater than a desired predetermined level, the processor will command a duty cycle of 100%. This is a so-called "hot-lock" converter bypass clutch operating mode. This overrules the duty cycle calculation, described above, that is appropriate for the modulated converter clutch slipping mode. The duty cycle calculation is overruled when the temperature reaches its maximum limit. The result of that procedure is a duty cycle output that causes the clutch to be fully engaged whenever the maximum permissible temperature level is being sensed by temperature sensor 110 seen in FIG. 3A.

Having described a preferred embodiment of the invention, what is claimed and desired to be secured by U.S. Letters Patent is:

1. In a bypass clutch for a hydrokinetic torque converter for an automatic transmission and engine;
   a clutch member connected to said engine, a converter having a friction surface adapted to cooperate frictionally with said clutch member;
   a fluid pressure operated means for controlling the clutching capacity of said bypass clutch whereby clutch slip may be effected for a variety of engine and transmission conditions;
   electronically operated valve means for controlling the pressure applied to said fluid pressure operated means, said valve means being connected to and being responsive to an electronic processor adapted for control functions in repetitive control loops and having control logic that responds during each control loop to changes in operating conditions of said transmission and engine;
   means for determining a target slip for each set of said operating conditions;
   means for determining the actual slip of said bypass clutch;
   means for determining a desired slip in a clutch slipping mode at the beginning of clutch engagement by multiplying said actual slip during each control loop of said processor by a factor less than unity whereby said desired slip decreases until it equals said target slip, said actual slip thereby being made equal to target slip, and means for establishing a hardlock mode after said actual slip equals target slip whereby the torque flow path through said converter is bypassed.

2. A bypass clutch as set forth in claim 1 wherein said means for establishing a hardlock mode comprises establishing a new desired slip relationship at the instant hardlock mode begins by modifying actual slip at that instant to a calculated amount less than actual slip, said actual slip thereby decaying until actual slip is zero.

3. The combination as set forth in claim 1 wherein said transmission has gearing with multiple gear ratios, said turbine being connected to driven portions of said gearing, means for detecting the driven speed of said driven portion, means for continuously monitoring speed ratio of said converter as a function of gear ratio, said detected driven speed and said engine speed;
   the monitored speed ratio decreasing upon a command of a shift to a higher speed gear ratio, means for detecting a delta speed ratio following said shift command to provide an indication of the time a ratio change begins following said shift command;

means for modifying said clutching capacity to effect a decrease in clutch capacity and an increase in actual slip driving said ratio change; and means responsive to the attainment of an increase in said delta speed ratio that is sufficient to indicate the end of said ratio change whereby said clutching capacity controlling means resumes its clutch control.

4. In a friction bypass clutch for a hydrokinetic torque converter comprising an impeller, a turbine and an impeller shell enclosing said impeller and said turbine, an engine being connected to said impeller shell;

a clutch plate within said impeller shell connected to said turbine, said clutch plate defining with said shell a control pressure chamber;

control passage means communicating with said control pressure chamber for distributing a clutch capacity determining control pressure to said chamber, bypass clutch control valve means communicating with said control pressure means, bypass clutch solenoid valve means communicating with said clutch control valve means;

electronic processor means for establishing a voltage signal for said solenoid valve means including means for sensing engine torque, means for sensing vehicle speed, means for computing turbine speed from said vehicle speed, means for establishing a target slip based upon the engine torque and turbine speed values, means for measuring the actual slip of said clutch, means for determining desired slip by reducing actual slip by a predetermined amount until it equals said target slip, means for determining slip error equal to the difference between actual slip and desired slip, and means for establishing a control signal that is established as a function of a first factor proportional to slip error and to a second factor that is determined by a derivative of said error;

means for subjecting said solenoid valve means to the control signal of said control signal establishing means; and means for establishing a hardlock mode after said actual slip equals target slip whereby the torque flow path through said converter is bypassed.

5. The combination as set forth in claim 4 wherein said means for establishing a hardlock mode comprises establishing a new desired slip relationship at the instant hardlock mode begins by modifying actual slip at that instant to a calculated amount less than actual slip, said actual slip thereby decaying until actual slip is zero.

6. The combination as set forth in claim 4 wherein said means for establishing a hardlock mode comprises establishing a new desired slip relationship at the instant hardlock mode begins by modifying actual slip at that instant to a calculated amount less than actual slip, said actual slip thereby decaying until actual slip is zero.

7. The combination as set forth in claim 6 wherein said means for establishing a hardlock mode comprises establishing a new desired slip relationship at the instant hardlock mode begins by modifying actual slip at that instant to a calculated amount less than actual slip, said actual slip thereby decaying until actual slip is zero.

8. The combination as set forth in claim 4 wherein the assembly comprises a driving member, a driven member, each member having a friction surface thereon engageable by the other;

fluid pressure operated clutch actuator means for frictionally connecting said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one of said members;

said processor including means for storing a target slip for said clutch assembly for each set of values of said operating conditions, means for measuring actual slip by determining speed ratio of the speeds of said members and means for determining a calculated desired slip of said clutch assembly that is less than the actual slip at successive time intervals during clutch actuation whereby a slip decay occurs until said target slip is reached, said desired slip being equal to actual slip multiplied by a modifier, and means for establishing a hardlock mode after said actual slip reaches said target slip whereby said clutch assembly is fully engaged.

9. The combination as set forth in claim 4 wherein said transmission has gearing with multiple gear ratios, said turbine being connected to driven portions of said gearing, means for detecting the driven speed of said driven portion, means for continuously monitoring speed ratio of said converter as a function of gear ratio, said detected driven speed and said engine speed;

the monitored speed ratio decreasing upon a command of a shift to a higher speed gear ratio, means for detecting a delta speed ratio following said shift command to provide an indication of the time a ratio change begins following said shift command;

means for modifying said clutching capacity to effect a decrease in clutch capacity and an increase in actual slip driving said ratio change; and means responsive to the attainment of an increase in said delta speed ratio that is sufficient to indicate the end of said ratio change whereby said clutching capacity controlling means resumes its clutch control.

10. A fluid pressure operated clutch assembly comprising:

a driving member, a driven member, each member having a friction surface thereon engageable by the other;

fluid pressure operated clutch actuator means for frictionally connecting said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one of said members;

said processor including means for storing a target slip for said clutch assembly for each set of values of said operating conditions, means for measuring actual slip by determining speed ratio of the speeds of said members and means for determining a calculated desired slip of said clutch assembly that is less than the actual slip at successive time intervals during clutch actuation whereby a slip decay occurs until said target slip is reached, said desired slip being equal to actual slip multiplied by a modifier, and means for establishing a hardlock mode after said actual slip reaches said target slip whereby said clutch assembly is fully engaged.

11. The transmission as set forth in claim 4 wherein said transmission has gearing with multiple gear ratios, said turbine being connected to driven portions of said gearing, means for detecting the driven speed of said driven portion, means for continuously monitoring the speed ratio of said converter as a function of gear ratio, said detected driven speed and said engine speed;

the monitored speed ratio decreasing upon a command of a shift to a higher speed gear ratio, means for detecting a delta speed ratio following said shift command to provide an indication of the time a ratio change begins following said shift command;

means for modifying said clutching capacity to effect a decrease in clutch capacity and an increase in actual slip during said ratio change; and means responsive to the attainment of an increase in said delta speed ratio that is sufficient to indicate the end of said ratio change whereby said clutching capacity controlling means resumes its clutch control.

12. A torque converter bypass clutch assembly comprising a clutch plate, an impeller housing enclosing a turbine and an impeller, said clutch plate defining with said impeller housing a control pressure chamber, said plate being actuated by fluid pressure within said impeller housing with the pressure in said pressure chamber opposing the fluid pressure actuating said plate;

valve means for controlling said control pressure in accordance with variations in impeller torque and turbine speed whereby a controlled slip of said clutch is achieved;

means for establishing a stroke mode pressure to actuate said clutch to a pre-engaged condition whereby further pressure increase will cause clutch engagement;

means for determining a target slip of said clutch for each set of turbine speed and impeller torque values;

means for determining a desired slip;

means for effecting a decay in the actual slip of said clutch toward said target slip during operation of said clutch assembly in an engage mode, said decay being a function of slip error between said actual slip and said desired slip; and means for establishing a hardlock mode after said target slip is reached whereby said clutch assembly is fully engaged.

13. The combination as set forth in claim 12 wherein the assembly comprises a clutch plate, an impeller housing enclosing a turbine and an impeller, said clutch plate defining with said impeller housing a control pressure chamber, said plate being actuated by fluid pressure within said impeller housing with the pressure in said pressure chamber opposing the fluid pressure actuating said plate;

valve means for controlling said control pressure in accordance with variations in impeller torque and turbine speed whereby a controlled slip of said clutch is achieved;

means for establishing a stroke mode pressure to actuate said clutch to a pre-engaged condition whereby further pressure increase will cause clutch engagement;

means for determining a target slip of said clutch for each set of turbine speed and impeller torque values;

means for determining a desired slip;

means for effecting a decay in the actual slip of said clutch toward said target slip during operation of said clutch assembly in an engage mode; and means for establishing a hardlock mode after said target slip is reached whereby said clutch assembly is fully engaged.

14. The control system as set forth in claim 12 wherein said transmission has gearing with multiple gear ratios, said turbine being connected to driven portions of said gearing, means for detecting the driven speed of said driven portion, means for continuously monitoring speed ratio of said converter as a function of gear ratio, said detected driven speed and said engine speed;

the monitored speed ratio decreasing upon a command of a shift to a higher speed gear ratio, means for detecting a delta speed ratio following said shift command to provide an indication of the time a ratio change begins following said shift command;

means for modifying said clutching capacity to effect a decrease in clutch capacity and an increase in actual slip during said ratio change; and means responsive to the attainment of an increase in said delta speed ratio that is sufficient to indicate the end of said ratio change whereby said clutching capacity controlling means resumes its clutch control.

* * * * *